United States Patent

Yoshioka et al.

[11] Patent Number: 6,075,899
[45] Date of Patent: Jun. 13, 2000

[54] IMAGE DECODER AND IMAGE MEMORY OVERCOMING VARIOUS KINDS OF DELAYING FACTORS CAUSED BY HARDWARE SPECIFICATIONS SPECIFIC TO IMAGE MEMORY BY IMPROVING STORING SYSTEM AND READING-OUT SYSTEM

[75] Inventors: Kosuke Yoshioka; Makoto Hirai; Tokuzo Kiyohara; Kozo Kimura, all of Osaka, Japan

[73] Assignee: Matsushita Electric Industrial Co., Ltd., Osaka, Japan

[21] Appl. No.: 09/066,308

[22] PCT Filed: Aug. 29, 1997

[86] PCT No.: PCT/JP97/02995

§ 371 Date: Apr. 27, 1998

§ 102(e) Date: Apr. 27, 1998

[87] PCT Pub. No.: WO98/09444

PCT Pub. Date: Mar. 5, 1998

[30] Foreign Application Priority Data

Aug. 29, 1996 [JP] Japan .................................. 8-228850

[51] Int. Cl.[7] ........................................................ G06K 9/46
[52] U.S. Cl. ................................................ 382/233; 382/305
[58] Field of Search .................................... 382/233, 107, 382/236, 305, 166, 299; 348/401, 402, 409, 413, 416, 419, 420; 358/428, 430

[56] References Cited

U.S. PATENT DOCUMENTS

| 5,905,821 | 5/1999 | Nonoshita et al. | 382/299 |
| 5,960,115 | 9/1999 | Kao et al. | 382/233 |
| 5,963,678 | 5/1999 | Nozawa | 382/233 |

FOREIGN PATENT DOCUMENTS

| 8077345 | 3/1996 | Japan . |
| 8186826 | 7/1996 | Japan . |
| 8280025 | 10/1996 | Japan . |

*Primary Examiner*—Bhavesh Mehta
*Attorney, Agent, or Firm*—Price Gess & Ubell

[57] ABSTRACT

An image memory stores a one-screen image by dividing the one-screen image into a plurality of image blocks which are each m pixels wide by n pixels high. The image memory has an array-like storage region storing s*t first chrominance components that compose one image block and s*t second chrominance components that compose the same image block in serial areas between a start area specified by a row address and a first column address and an end area specified by the same row address and a second column address (see FIG. 10). The storage region also stores m*n luminance components that compose the same image block in serial areas between a different start area specified by a different row address and a third column address and an end area are specified by the different row address and a fourth column address.

27 Claims, 50 Drawing Sheets

FIG. 2B

| | 0th PAGE | 1st PAGE | 2nd PAGE | | 150th PAGE | 151st PAGE | 152nd PAGE | 153rd PAGE | | 200th PAGE | 201st PAGE | 202nd PAGE | 203rd PAGE |
|---|---|---|---|---|---|---|---|---|---|---|---|---|---|
| | Y(0,0)~(0,15) | Y(16,0)~(16,15) | | | | | | | | | | | |
| | ~(15,0)~(15,15) | ~(31,0)~(31,15) | | | | | | | | | | | |
| | Y(32,0)~(47,0) | Y(48,0)~(63,0) | | | | | | | | | | | |
| | ~(32,15)~(47,15) | ~(48,15)~(63,15) | | | | | | | | | | | |
| | Y(64,0)~(79,0) | Y(80,0)~(95,0) | | | | | | | | | | | |
| | ~(64,15)~(79,15) | ~(80,15)~(95,15) | | | | | | | | | | | |
| | Cb(0,0)~(7,7) | Cb(8,0)~(15,7) | Cb(16,0)~(23,7) | Cb(24,0)~(31,7) | | | | | | | | | |
| | Cb(0,8)~(7,15) | Cb(8,8)~(15,15) | Cb(16,8)~(23,15) | Cb(24,8)~(31,15) | | | | | | | | | |
| | Cb(0,16)~(7,23) | Cb(8,16)~(15,23) | Cb(16,16)~(23,23) | Cb(24,16)~(31,23) | | | | | | | | | |
| | Cb(0,24)~(7,31) | Cb(8,24)~(15,31) | Cb(16,24)~(23,31) | Cb(24,24)~(31,31) | | | | | | | | | |
| | Cr(0,0)~(7,7) | Cr(8,0)~(15,7) | Cr(16,0)~(23,7) | Cr(24,0)~(31,7) | | | | | | | | | |
| | Cr(0,8)~(7,15) | Cr(8,8)~(15,15) | Cr(16,8)~(23,15) | Cr(24,8)~(31,15) | | | | | | | | | |
| | Cr(0,16)~(7,23) | Cr(8,16)~(15,23) | Cr(16,16)~(23,23) | Cr(24,16)~(31,23) | | | | | | | | | |
| | Cr(0,24)~(7,31) | Cr(8,24)~(15,31) | Cr(16,24)~(23,31) | Cr(24,24)~(31,31) | | | | | | | | | |

256 COLUMNS

256 ROWS

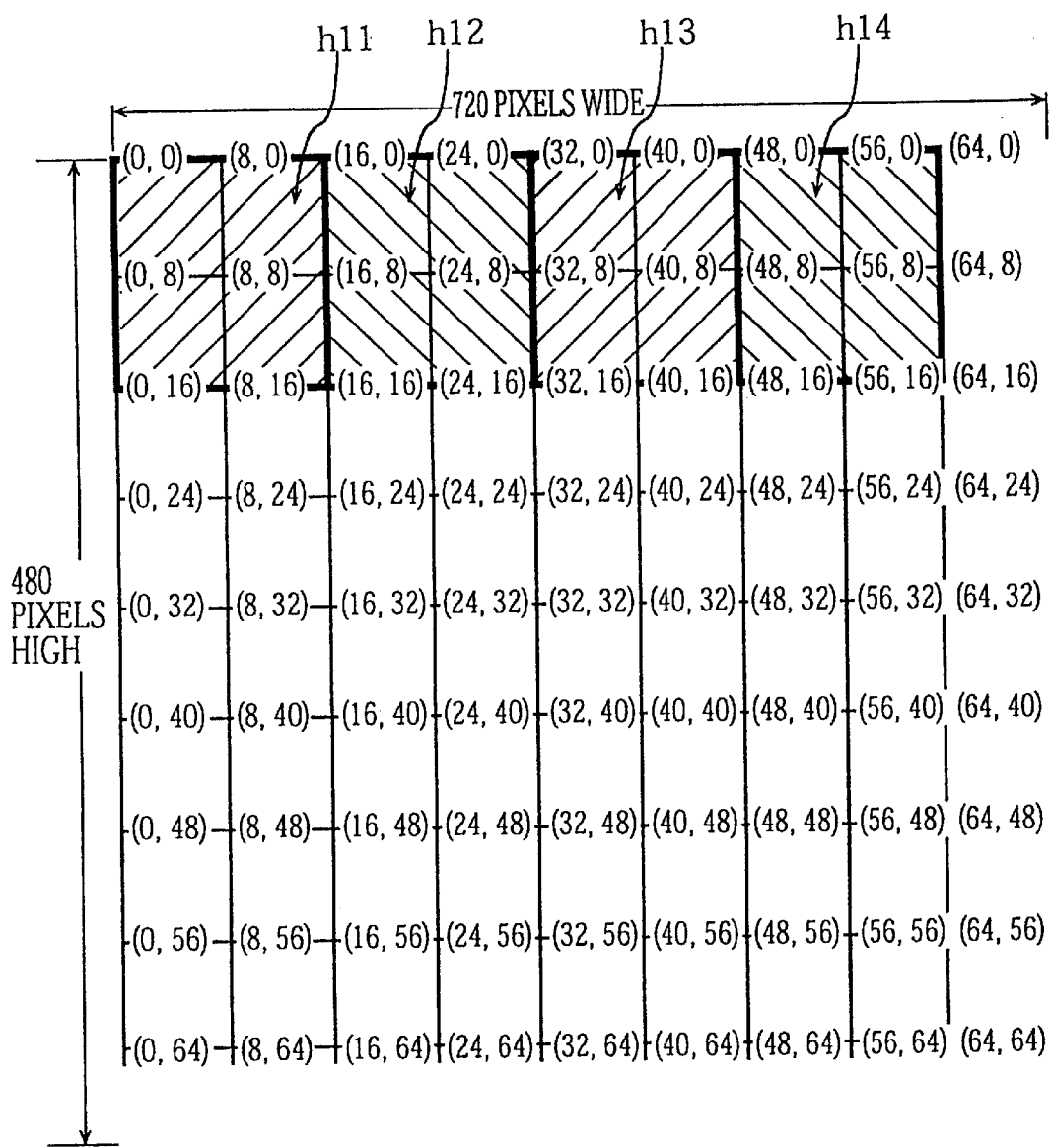

FIG. 7A

| ROW_ADDRESS | BANK 0 | BANK 1 |
|---|---|---|
| 00000000 | MacroBlock(0, 0)~(15, 31) | MacroBlock(16, 0)~(31, 31) |
| 00000001 | MacroBlock(32, 0)~(47, 31) | MacroBlock(48, 0)~(63, 31) |
| 00000010 | MacroBlock(64, 0)~(79, 31) | MacroBlock(80, 0)~(95, 31) |
| 00000011 | MacroBlock(96, 0)~(111, 31) | MacroBlock(112, 0)~(127, 31) |
| 00000100 | MacroBlock(128, 0)~(143, 31) | MacroBlock(144, 0)~(159, 31) |
| ⋮ | ⋮ | ⋮ |
| 00010100 | MacroBlock(640, 0)~(655, 31) | MacroBlock(656, 0)~(671, 31) |
| 00010101 | MacroBlock(672, 0)~(687, 31) | MacroBlock(688, 0)~(703, 31) |
| 00010110 | MacroBlock(704, 0)~(719, 31) | MacroBlock(0, 32)~(15, 63) |
| 00010111 | MacroBlock(16, 32)~(31, 63) | MacroBlock(32, 32)~(47, 63) |
| 00011000 | MacroBlock(48, 32)~(63, 63) | MacroBlock(64, 32)~(79, 63) |
| 00011001 | MacroBlock(80, 32)~(95, 63) | MacroBlock(96, 32)~(111, 63) |
| 00011010 | MacroBlock(112, 32)~(127, 63) | MacroBlock(128, 32)~(143, 63) |
| 00011011 | MacroBlock(144, 32)~(159, 63) | MacroBlock(160, 32)~(175, 63) |
| 000101010 | MacroBlock(656, 32)~(671, 63) | MacroBlock(672, 32)~(687, 63) |
| 000101011 | MacroBlock(688, 32)~(703, 63) | MacroBlock(704, 32)~(719, 63) |

FIG. 7B

| ROW_ADDRESS | BANK 0 | BANK 1 |
|---|---|---|
| 10000000 | CbCr_MB(0, 0)~(7, 31) | CbCr_MB(8, 0)~(15, 31) |
| 10000001 | CbCr_MB(16, 0)~(23, 31) | CbCr_MB(24, 0)~(31, 31) |
| 10000010 | CbCr_MB(32, 0)~(39, 31) | CbCr_MB(40, 0)~(47, 31) |
| 10000011 | CbCr_MB(48, 0)~(55, 31) | CbCr_MB(56, 0)~(63, 31) |
| 10000100 | CbCr_MB(64, 0)~(71, 31) | CbCr_MB(72, 0)~(79, 31) |
| ⋮ | ⋮ | ⋮ |
| 10010100 | CbCr_MB(320, 0)~(327, 31) | CbCr_MB(328, 0)~(335, 31) |
| 10010101 | CbCr_MB(336, 0)~(343, 31) | CbCr_MB(344, 0)~(351, 31) |
| 10010110 | CbCr_MB(352, 0)~(359, 31) | CbCr_MB(0, 32)~(7, 63) |
| 10011000 | CbCr_MB(8, 32)~(15, 63) | CbCr_MB(16, 32)~(23, 63) |
| 10011001 | CbCr_MB(24, 32)~(31, 63) | CbCr_MB(32, 32)~(39, 63) |
| 10011010 | CbCr_MB(40, 32)~(47, 63) | CbCr_MB(48, 32)~(55, 63) |
| 10011011 | CbCr_MB(56, 32)~(63, 63) | CbCr_MB(64, 32)~(71, 63) |
| 10011100 | CbCr_MB(72, 32)~(79, 63) | |

FIG. 9

| COLUMN_ADDRESS<br>=000000_0000<br>Y(0, 0) | COLUMN_ADDRESS<br>=000000_0001<br>Y(1, 0) | COLUMN_ADDRESS<br>=000000_0010<br>Y(2, 0) | COLUMN_ADDRESS<br>=000000_0011<br>Y(3, 0) |
|---|---|---|---|
| COLUMN_ADDRESS<br>=000000_0100<br>Y(4, 0) | COLUMN_ADDRESS<br>=000000_0101<br>Y(5, 0) | COLUMN_ADDRESS<br>=000000_0110<br>Y(6, 0) | COLUMN_ADDRESS<br>=000000_0111<br>Y(7, 0) |
| COLUMN_ADDRESS<br>=000000_1000<br>Y(8, 0) | COLUMN_ADDRESS<br>=000000_1001<br>Y(9, 0) | COLUMN_ADDRESS<br>=000000_1010<br>Y(10, 0) | COLUMN_ADDRESS<br>=000000_1011<br>Y(11, 0) |
| COLUMN_ADDRESS<br>=000000_1100<br>Y(12, 0) | COLUMN_ADDRESS<br>=000000_1101<br>Y(13, 0) | COLUMN_ADDRESS<br>=000000_1110<br>Y(14, 0) | COLUMN_ADDRESS<br>=000000_1111<br>Y(15, 0) |
| COLUMN_ADDRESS<br>=000001_0000<br>Y(0, 1) | COLUMN_ADDRESS<br>=000001_0001<br>Y(1, 1) | COLUMN_ADDRESS<br>=000001_0010<br>Y(2, 1) | COLUMN_ADDRESS<br>=000001_0011<br>Y(3, 1) |
| COLUMN_ADDRESS<br>=000001_0100<br>Y(4, 1) | COLUMN_ADDRESS<br>=000001_0101<br>Y(5, 1) | COLUMN_ADDRESS<br>=000001_0110<br>Y(6, 1) | COLUMN_ADDRESS<br>=000001_011<br>Y(7, 1) |
| COLUMN_ADDRESS<br>=000001_1000<br>Y(8, 1) | COLUMN_ADDRESS<br>=000001_1001<br>Y(9, 1) | COLUMN_ADDRESS<br>=000001_1010<br>Y(10, 1) | COLUMN_ADDRESS<br>=000001_1011<br>Y(11, 1) |
| COLUMN_ADDRESS<br>=000001_1100<br>Y(12, 1) | COLUMN_ADDRESS<br>=000001_1101<br>Y(13, 1) | COLUMN_ADDRESS<br>=000001_1110<br>Y(14, 1) | COLUMN_ADDRESS<br>=000001_1111<br>Y(15, 1) |
| ⋮ | ⋮ | ⋮ | ⋮ |
| COLUMN_ADDRESS<br>=111111_0000<br>Y(0, 31) | COLUMN_ADDRESS<br>=111111_0001<br>Y(1, 31) | COLUMN_ADDRESS<br>=111111_0010<br>Y(2, 31) | COLUMN_ADDRESS<br>=111111_0011<br>Y(3, 31) |
| COLUMN_ADDRESS<br>=111111_0100<br>Y(4, 31) | COLUMN_ADDRESS<br>=111111_0101<br>Y(5, 31) | COLUMN_ADDRESS<br>=111111_0110<br>Y(6, 31) | COLUMN_ADDRESS<br>=111111_0111<br>Y(7, 31) |
| COLUMN_ADDRESS<br>=111111_1000<br>Y(8, 31) | COLUMN_ADDRESS<br>=111111_1001<br>Y(9, 31) | COLUMN_ADDRESS<br>=111111_1010<br>Y(10, 31) | COLUMN_ADDRESS<br>=111111_1011<br>Y(11, 31) |
| COLUMN_ADDRESS<br>=111111_1100<br>Y(12, 31) | COLUMN_ADDRESS<br>=111111_1101<br>Y(13, 31) | COLUMN_ADDRESS<br>=111111_1110<br>Y(14, 31) | COLUMN_ADDRESS<br>=111111_1111<br>Y(15, 31) |

FIG. 10

ROW_ADDRESS=1000_00000        BANK 0

| COLUMN_ADDRESS =000000_0000 Cb(0, 0) | COLUMN_ADDRESS =000000_0001 Cr(0, 0) | COLUMN_ADDRESS =000000_0010 Cb(1, 0) | COLUMN_ADDRESS =000000_0011 Cr(1, 0) |
|---|---|---|---|
| COLUMN_ADDRESS =000000_0100 Cb(2, 0) | COLUMN_ADDRESS =000000_0101 Cr(2, 0) | COLUMN_ADDRESS =000000_0110 Cb(3, 0) | COLUMN_ADDRESS =000000_0111 Cr(3, 0) |
| COLUMN_ADDRESS =000000_1000 Cb(4, 0) | COLUMN_ADDRESS =000000_1001 Cr(4, 0) | COLUMN_ADDRESS =000000_1010 Cb(5, 0) | COLUMN_ADDRESS =000000_1011 Cr(5, 0) |
| COLUMN_ADDRESS =000000_1100 Cb(6, 0) | COLUMN_ADDRESS =000000_1101 Cr(6, 0) | COLUMN_ADDRESS =000000_1110 Cb(7, 0) | COLUMN_ADDRESS =000000_1111 Cr(7, 0) |
| COLUMN_ADDRESS =000001_0000 Cb(0, 1) | COLUMN_ADDRESS =000001_0001 Cr(0, 1) | COLUMN_ADDRESS =000001_0010 Cb(1, 1) | COLUMN_ADDRESS =000001_0011 Cr(1, 1) |
| COLUMN_ADDRESS =000001_0100 Cb(2, 1) | COLUMN_ADDRESS =000001_0101 Cr(2, 1) | COLUMN_ADDRESS =000001_0110 Cb(3, 1) | COLUMN_ADDRESS =000001_0111 Cr(3, 1) |
| COLUMN_ADDRESS =000001_1000 Cb(4, 1) | COLUMN_ADDRESS =000001_1001 Cr(4, 1) | COLUMN_ADDRESS =000001_1010 Cb(5, 1) | COLUMN_ADDRESS =000001_1011 Cr(5, 1) |
| COLUMN_ADDRESS =000001_1100 Cb(6, 1) | COLUMN_ADDRESS =000001_1101 Cr(6, 1) | COLUMN_ADDRESS =000001_1110 Cb(7, 1) | COLUMN_ADDRESS =000001_1111 Cr(7, 1) |
| ⋮ | ⋮ | ⋮ | ⋮ |
| COLUMN_ADDRESS =111111_0000 Cb(0, 31) | COLUMN_ADDRESS =111111_0001 Cr(0, 31) | COLUMN_ADDRESS =111111_0010 Cb(1, 31) | COLUMN_ADDRESS =111111_0011 Cr(1, 31) |
| COLUMN_ADDRESS =111111_0100 Cb(2, 31) | COLUMN_ADDRESS =111111_0101 Cr(2, 31) | COLUMN_ADDRESS =111111_0110 Cb(3, 31) | COLUMN_ADDRESS =111111_0111 Cr(3, 31) |
| COLUMN_ADDRESS =111111_1000 Cb(4, 31) | COLUMN_ADDRESS =111111_1001 Cr(4, 31) | COLUMN_ADDRESS =111111_1010 Cb(5, 31) | COLUMN_ADDRESS =111111_1011 Cr(5, 31) |
| COLUMN_ADDRESS =1Y01(0, 8)  Y01(1, 8) Cb(6, 31) | COLUMN_ADDRESS Y01(2, 8)  Y01(3, 8) Cr(6, 31) | COLUMN_ADDRESS · · · Y01(14, 8) Cb(7, 31) | COLUMN_ADDRESS Y01(15, 8) Y01(16, 8) Cr(7, 31) |

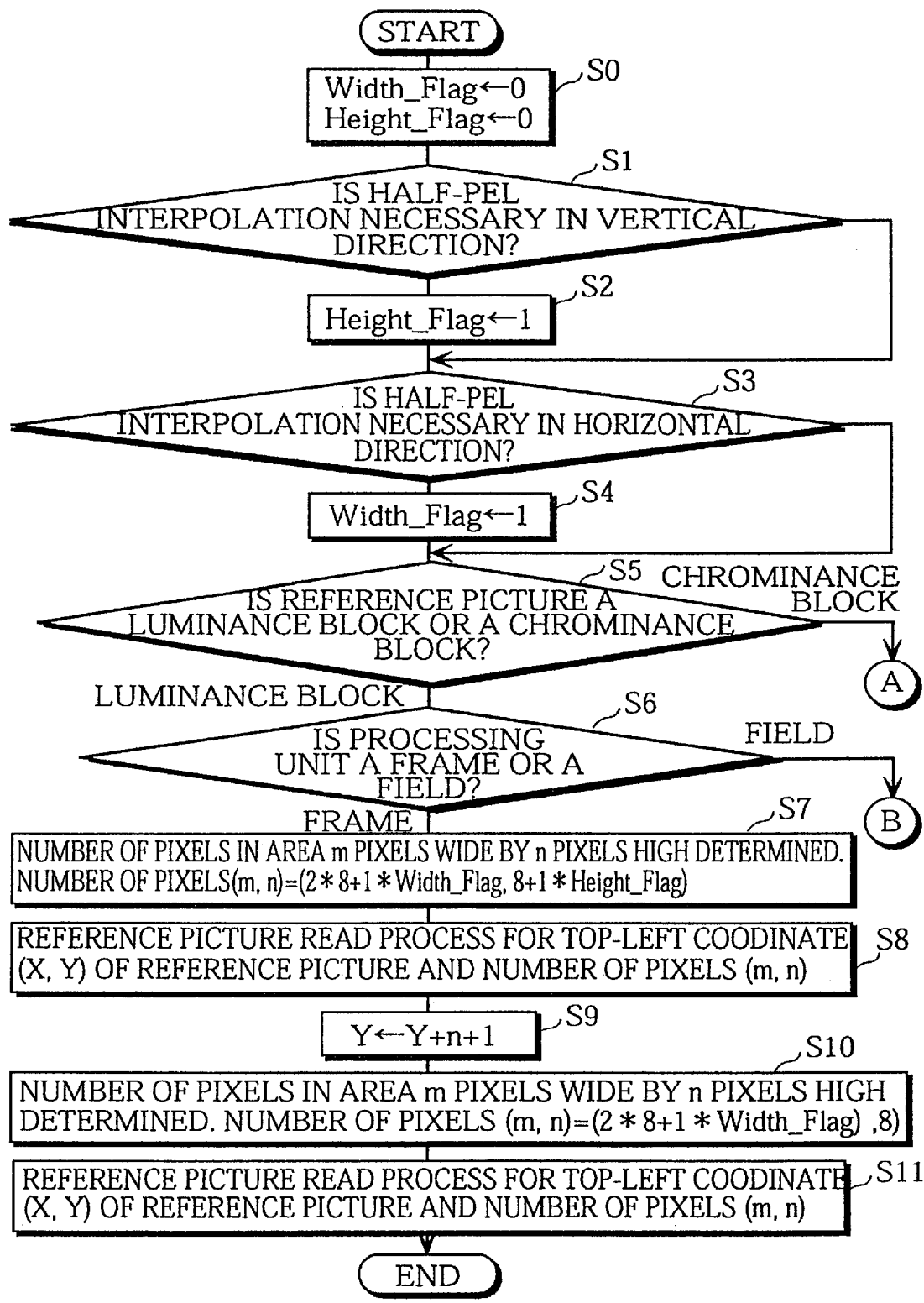

FIG. 12B
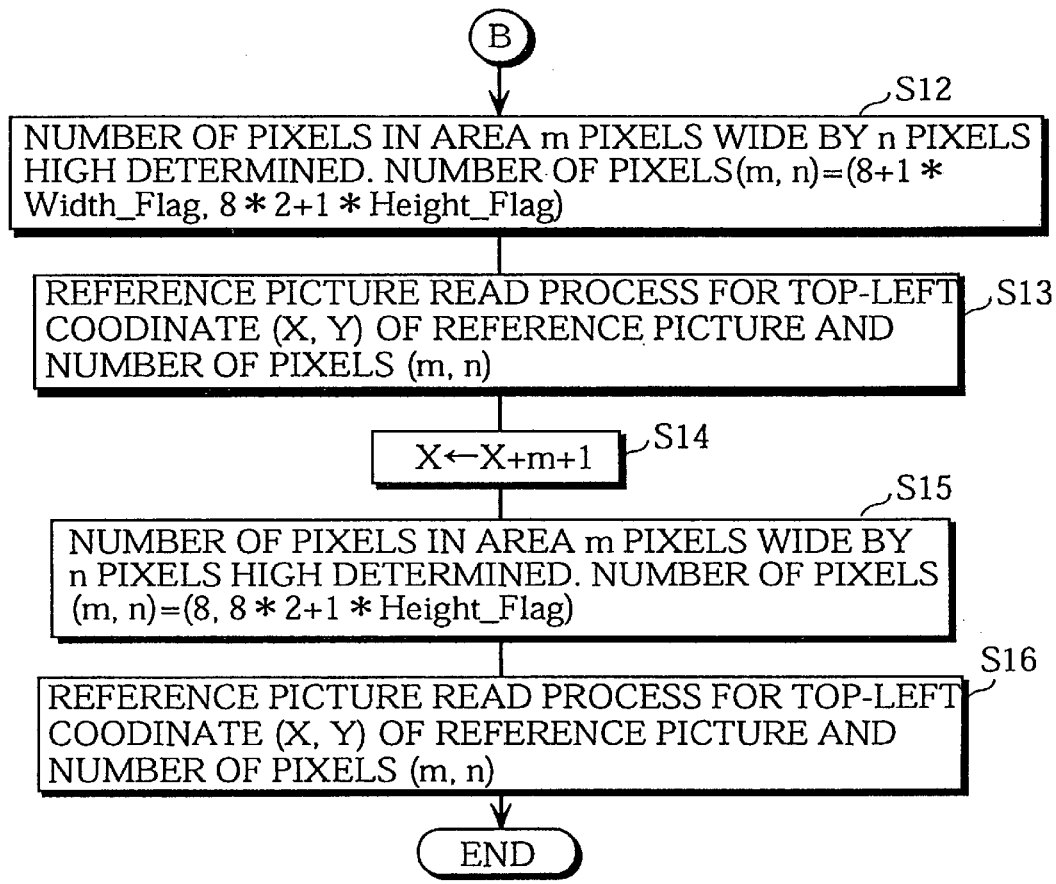
CHROMINANCE
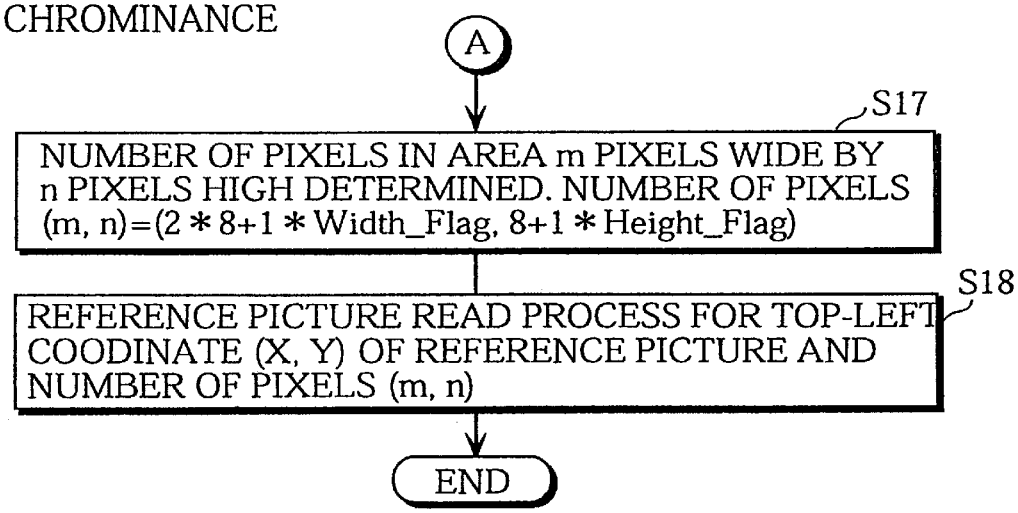

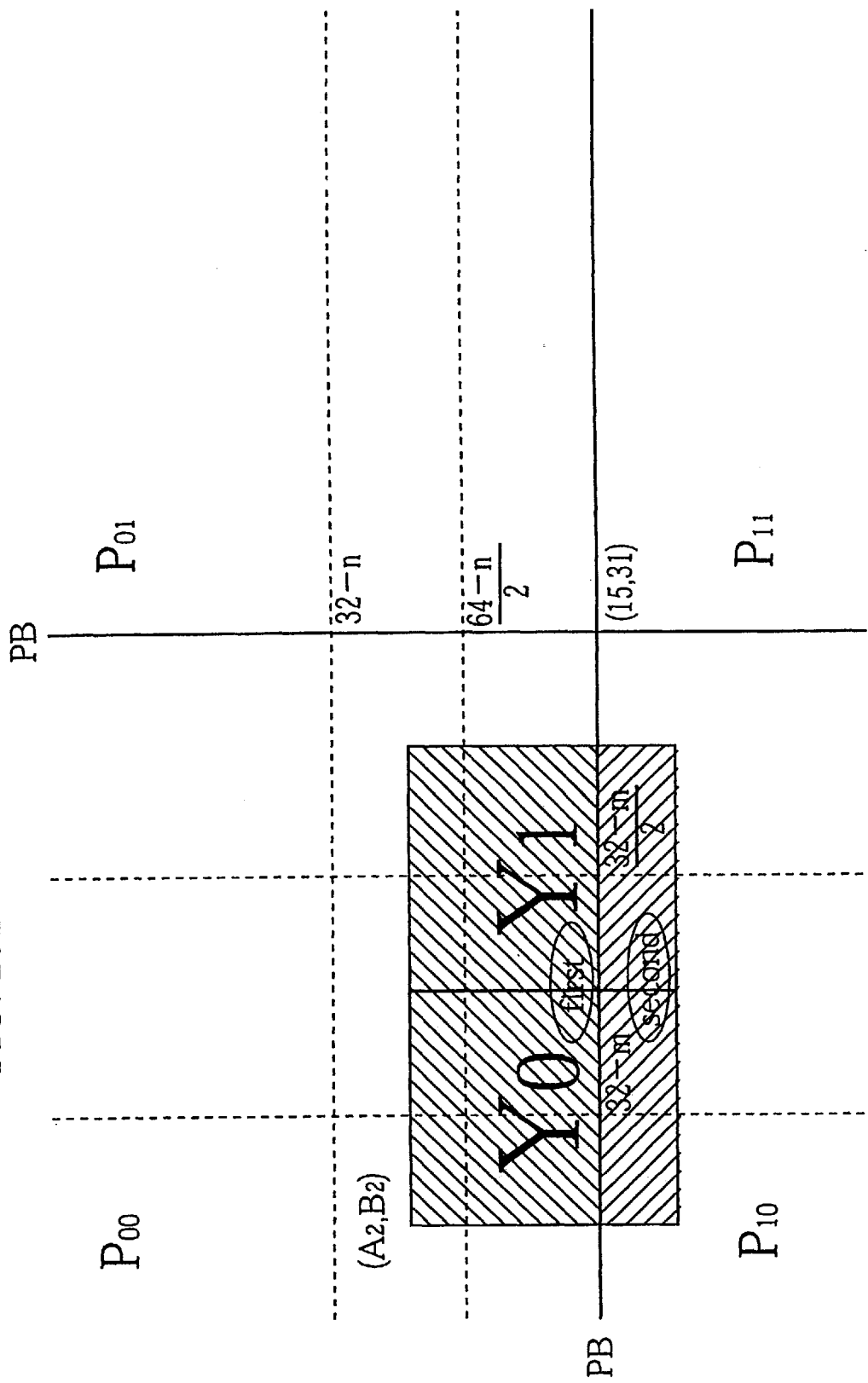

FIG. 21A

| | x=0 | x=1 | x=2 | x=3 | ----- | x=z |
|---|---|---|---|---|---|---|
| y=0 | 4BYTE | 4BYTE | 4BYTE | 4BYTE | ----- | 4BYTE |
| y=1 | 4BYTE | 4BYTE | 4BYTE | 4BYTE | ----- | 4BYTE |
| y=2 | 4BYTE | 4BYTE | 4BYTE | 4BYTE | ----- | 4BYTE |
| y=3 | 4BYTE | 4BYTE | 4BYTE | 4BYTE | ----- | 4BYTE |
| y=4 | 4BYTE | 4BYTE | 4BYTE | 4BYTE | ----- | 4BYTE |

FIG. 21B

| | | |
|---|---|---|
| y=0 | P00(A, B) ······P00(A+s00, B) | P01(0, B) ······P01(s01, B) |
| y=1 | P00(A, B+1) ······P00(A+s00, B+1) | P01(0, B+1) ······P01(s01, B+1) |
| y=2 | P00(A, B+2) ······P00(A+s00, B+2) | P01(0, B+2) ······P01(s01, B+2) |
| y=3 | P00(A, B+3) ······P00(A+s00, B+3) | P01(0, B+3) ······P01(s01, B+3) |
| ⋮ | ⋮ | ⋮ |
| y=t00 | P00(A, B+t00) ······P00(A+s00, B+t00) | P01(0, B+t00) ······P01(s01, B+t00) |
| y=t00+1 | P10(A, 1) ······P10(A+s00, 0) | P11(0, 0) ······P11(0+s11, 0) |
| y=t00+2 | P10(A, 0+1) ······P10(A+s00, 0+1) | P11(0, 0+1) ······P11(0+s11, 0+1) |
| y=t00+3 | P10(A, 0+2) ······P10(A+s00, 0+2) | P11(0, 0+2) ······P11(0+s11, 0+2) |
| y=t00+4 | P10(A, 0+3) ······P10(A+s00, 0+3) | P11(0, 0+3) ······P11(0+s11, 0+3) |
| ⋮ | ⋮ | ⋮ |
| y=t00+t10 | P10(A, 0+t10) ······P10(A+s00, t10) | P11(0, 0+t11) ······P11(s11, t11) |

FIG. 22

| | 0_BYTE | 1_BYTE | 2_BYTE | 3_BYTE |
|---|---|---|---|---|
| linear_address =0000 | P00(A, B) | P00(A+1, B) | P00(A+2, B) | P00(A+3, B) |
| linear_address =0001 | P00(A+4, B) | P00(A+5, B) | P00(A+6, B) | P00(A+7, B) |
| linear_address =0002 | P01(0, B) | P01(1, B) | P01(2, B) | P01(3, B) |
| linear_address =0003 | P01(4, B) | P01(5, B) | P01(6, B) | P01(7, B) |
| linear_address =0004 | | | | |
| linear_address =0005 | P00(A, B+1) | P00(A+1, B+1) | P00(A+2, B+1) | P00(A+3, B+1) |
| linear_address =0006 | P00(A+4, B+1) | P00(A+5, B+1) | P00(A+6, B+1) | P00(A+7, B+1) |
| linear_address =0007 | P01(0, B+1) | P01(1, B+1) | P01(2, B+1) | P01(3, B+1) |
| linear_address =0008 | P01(4, B+1) | P01(5, B+1) | P01(6, B+1) | P01(7, B+1) |
| linear_address =0009 | P01(8, B+1) | P01(9, B+1) | | |

FIG. 25A

Y01 READ (9 PIXELS HIGH BY 17 PIXELS WIDE)

Y23 READ (8 PIXELS HIGH BY 17 PIXELS WIDE)

Y02 READ (17 PIXELS HIGH BY 9 PIXELS WIDE)

Y13 READ (17 PIXELS HIGH BY 8 PIXELS WIDE)

Y01 READ (9 PIXELS HIGH BY 17 PIXELS WIDE)

| Y01(0,0) | Y01(1,0) | Y01(2,0) | Y01(3,0) | · · · | Y01(14,0) | Y01(15,0) | Y01(16,0) |
|---|---|---|---|---|---|---|---|
| Y01(0,1) | Y01(1,1) | Y01(2,1) | Y01(3,1) | · · · | Y01(14,1) | Y01(15,1) | Y01(16,1) |
| Y01(0,2) | Y01(1,2) | Y01(2,2) | Y01(3,2) | · · | Y01(14,2) | Y01(15,2) | Y01(16,2) |
| Y01(0,3) | Y01(1,3) | Y01(2,3) | Y01(3,3) | · · · | Y01(14,3) | Y01(15,3) | Y01(16,3) |
| Y01(0,4) | Y01(1,4) | Y01(2,4) | Y01(3,4) | · · · | Y01(14,4) | Y01(15,4) | Y01(16,4) |
| Y01(0,5) | Y01(1,5) | Y01(2,5) | Y01(3,5) | · · · | Y01(14,5) | Y01(15,5) | Y01(16,5) |
| Y01(0,6) | Y01(1,6) | Y01(2,6) | Y01(3,6) | · · · | Y01(14,6) | Y01(15,6) | Y01(16,6) |
| Y01(0,7) | Y01(1,7) | Y01(2,7) | Y01(3,7) | · · · | Y01(14,7) | Y01(15,7) | Y01(16,7) |
| Y01(0,8) | Y01(1,8) | Y01(2,8) | Y01(3,8) | · · · | Y01(14,8) | Y01(15,8) | Y01(16,8) |

Y23 READ (8 PIXELS HIGH BY 17 PIXELS WIDE)

| Y01(0,8) | Y01(1,8) | Y01(2,8) | Y01(3,8) | · · · | Y01(14,8) | Y01(15,8) | Y01(16,8) |
|---|---|---|---|---|---|---|---|
| Y23(0,0) | Y23(1,0) | Y23(2,0) | Y23(3,0) | · · · | Y23(14,0) | Y23(15,0) | Y23(16,0) |
| Y23(0,1) | Y23(1,1) | Y23(2,1) | Y23(3,1) | · · | Y23(14,1) | Y23(15,1) | Y23(16,1) |
| Y23(0,2) | Y23(1,2) | Y23(2,2) | Y23(3,2) | · · | Y23(14,2) | Y23(15,2) | Y23(16,2) |
| Y23(0,3) | Y23(1,3) | Y23(2,3) | Y23(3,3) | · · · | Y23(14,3) | Y23(15,3) | Y23(16,3) |
| Y23(0,4) | Y23(1,4) | Y23(2,4) | Y23(3,4) | · · · | Y23(14,4) | Y23(15,4) | Y23(16,4) |
| Y23(0,5) | Y23(1,5) | Y23(2,5) | Y23(3,5) | · · · | Y23(14,5) | Y23(15,5) | Y23(16,5) |
| Y23(0,6) | Y23(1,6) | Y23(2,6) | Y23(3,6) | · · · | Y23(14,6) | Y23(15,6) | Y23(16,6) |
| Y23(0,7) | Y23(1,7) | Y23(2,7) | Y23(3,7) | · · · | Y23(14,7) | Y23(15,7) | Y23(16,7) |

FIG. 28B

Y02 READ (9 PIXELS HIGH BY 17 PIXELS WIDE)

| Y02(0,0) | Y02(1,0) | Y02(2,0) | Y02(3,0) | ··· | Y02(6,0) | Y02(7,0) | Y02(8,0) |
| Y02(0,1) | Y02(1,1) | Y02(2,1) | Y02(3,1) | ··· | Y02(6,1) | Y02(7,1) | Y02(8,1) |
| Y02(0,2) | Y02(1,2) | Y02(2,2) | Y02(3,2) | ··· | Y02(6,2) | Y02(7,2) | Y02(8,2) |
| Y02(0,3) | Y02(1,3) | Y02(2,3) | Y02(3,3) | ··· | Y02(6,3) | Y02(7,3) | Y02(8,3) |
| Y02(0,4) | Y02(1,4) | Y02(2,4) | Y02(3,4) | ··· | Y02(6,4) | Y02(7,4) | Y02(8,4) |
| Y02(0,5) | Y02(1,5) | Y02(2,5) | Y02(3,5) | ··· | Y02(6,5) | Y02(7,5) | Y02(8,5) |
| Y02(0,6) | Y02(1,6) | Y02(2,6) | Y02(3,6) | ··· | Y02(6,6) | Y02(7,6) | Y02(8,6) |
| Y02(0,7) | Y02(1,7) | Y02(2,7) | Y02(3,7) | ··· | Y02(6,7) | Y02(7,7) | Y02(8,7) |
| Y02(0,8) | Y02(1,8) | Y02(2,8) | Y02(3,8) | ··· | Y02(6,8) | Y02(7,8) | Y02(8,8) |

⋮

Y02(0,14) Y02(1,14) Y02(2,14) Y02(3,14) ··· Y02(6,14) Y02(7,14) Y02(8,14)

Y02(0,15) Y02(1,15) Y02(2,15) Y02(3,15) ··· Y02(6,15) Y02(7,15) Y02(8,15)

Y02(0,16) Y02(1,16) Y02(2,16) Y02(3,16) ··· Y02(6,16) Y02(7,16) Y02(8,16)

Y13 READ (8 PIXELS HIGH BY 17 PIXELS WIDE)

| Y02(8,0) | Y13(0,0) | Y13(1,0) | Y13(2,0) | Y13(3,0) | ··· | Y13(6,0) | Y13(7,0) |
| Y02(8,1) | Y13(0,1) | Y13(1,1) | Y13(2,1) | Y13(3,1) | ··· | Y13(6,1) | Y13(7,1) |
| Y02(8,2) | Y13(0,2) | Y13(1,2) | Y13(2,2) | Y13(3,2) | ··· | Y13(6,2) | Y13(7,2) |
| Y02(8,3) | Y13(0,3) | Y13(1,3) | Y13(2,3) | Y13(3,3) | ··· | Y13(6,3) | Y13(7,3) |
| Y02(8,4) | Y13(0,4) | Y13(1,4) | Y13(2,4) | Y13(3,4) | ··· | Y13(6,4) | Y13(7,4) |
| Y02(8,5) | Y13(0,5) | Y13(1,5) | Y13(2,5) | Y13(3,5) | ··· | Y13(6,5) | Y13(7,5) |
| Y02(8,6) | Y13(0,6) | Y13(1,6) | Y13(2,6) | Y13(3,6) | ··· | Y13(6,6) | Y13(7,6) |
| Y02(8,7) | Y13(0,7) | Y13(1,7) | Y13(2,7) | Y13(3,7) | ··· | Y13(6,7) | Y13(7,7) |
| Y02(8,8) | Y13(0,8) | Y13(1,8) | Y13(2,8) | Y13(3,8) | ··· | Y13(6,8) | Y13(7,8) |

| COLUMN_ADDRESS =000000_0000 Y(0, 0) Y(1, 0) | COLUMN_ADDRESS =000000_0001 Y(2, 0) Y(3, 0) | COLUMN_ADDRESS =000000_0010 Y(4, 0) Y(5, 0) | COLUMN_ADDRESS =000000_0011 Y(6, 0) Y(7, 0) |
|---|---|---|---|
| COLUMN_ADDRESS =000000_0100 Y(8, 0) Y(9, 0) | COLUMN_ADDRESS =000000_0101 Y(10, 0) Y(11, 0) | COLUMN_ADDRESS =000000_0110 Y(12, 0) Y(13, 0) | COLUMN_ADDRESS =000000_0111 Y(14, 0) Y(15, 0) |
| COLUMN_ADDRESS =000000_1000 Y(0, 1) Y(1, 1) | COLUMN_ADDRESS =000000_1001 Y(2, 1) Y(3, 1) | COLUMN_ADDRESS =000000_1010 Y(4, 1) Y(5, 1) | COLUMN_ADDRESS =000000_1011 Y(6, 1) Y(7, 1) |
| COLUMN_ADDRESS =000000_1100 Y(8, 1) Y(9, 1) | COLUMN_ADDRESS =000000_1101 Y(10, 1) Y(11,1) | COLUMN_ADDRESS =000000_1110 Y(12, 1) Y(13, 1) | COLUMN_ADDRESS =000000_1111 Y(14, 1) Y(15,1) |
| COLUMN_ADDRESS =00001_0000 Y(0, 2) Y(1, 2) | COLUMN_ADDRESS =000001_0001 Y(2, 2) Y(3, 2) | COLUMN_ADDRESS =000001_0010 Y(4, 2) Y(5, 2) | COLUMN_ADDRESS =000001_0011 Y(6, 2) Y(7, 2) |
| COLUMN_ADDRESS =000001_0100 Y(8, 2) Y(9, 2) | COLUMN_ADDRESS =000001_0101 Y(10, 2) Y(11, 2) | COLUMN_ADDRESS =000001_0110 Y(12, 2) Y(13, 2) | COLUMN_ADDRESS =000001_0100 Y(14, 2) Y(15, 2) |

FIG. 29B

| COLUMN_ADDRESS =000000_0000 Cb(0, 0) Cb(0, 0) | COLUMN_ADDRESS =000000_0001 Cb(1, 0) Cr(1, 0) | COLUMN_ADDRESS =000000_0010 Cb(2, 0) Cr(2, 0) | COLUMN_ADDRESS =000000_0011 Cb(3, 0) Cr(3, 0) |
|---|---|---|---|
| COLUMN_ADDRESS =000000_0100 Cb(4, 0) Cr(4, 0) | COLUMN_ADDRESS =000000_0101 Cb(5, 0) Cr(5, 0) | COLUMN_ADDRESS =000000_0110 Cb(6, 0) Cr(6, 0) | COLUMN_ADDRESS =000000_0111 Cr(7, 0) Cr(7, 0) |
| COLUMN_ADDRESS =000000_1000 Cb(0, 1) Cr(0, 1) | COLUMN_ADDRESS =000000_1001 Cb(1, 1) Cr(1, 1) | COLUMN_ADDRESS =000000_1010 Cb(2, 1) Cr(2, 1) | COLUMN_ADDRESS =000000_1011 Cb(3, 1) Cr(3, 1) |
| COLUMN_ADDRESS =000000_1100 Cb(4, 1) Cr(4, 1) | COLUMN_ADDRESS =000000_1101 Cb(5, 1) Cr(5, 1) | COLUMN_ADDRESS =000000_1110 Cb(6, 1) Cr(6, 1) | COLUMN_ADDRESS =000000_1111 Cr(7, 1) Cr(7, 1) |
| COLUMN_ADDRESS =00001_0000 Cb(0, 2) Cr(0, 2) | COLUMN_ADDRESS =000001_0001 Cb(1, 2) Cr(1, 2) | COLUMN_ADDRESS =000001_0010 Cb(2, 2) Cr(2, 2) | COLUMN_ADDRESS =000001_0011 Cb(3, 2) Cr(3, 2) |
| COLUMN_ADDRESS =000001_0100 Cb(4, 2) Cr(4, 2) | COLUMN_ADDRESS =000001_0101 Cb(5, 2) Cr(5, 2) | COLUMN_ADDRESS =000001_0110 Cb(6, 2) Cr(6, 2) | COLUMN_ADDRESS =000001_0100 Cr(7, 2) Cr(7, 2) |

IMAGE DECODER AND IMAGE MEMORY OVERCOMING VARIOUS KINDS OF DELAYING FACTORS CAUSED BY HARDWARE SPECIFICATIONS SPECIFIC TO IMAGE MEMORY BY IMPROVING STORING SYSTEM AND READING-OUT SYSTEM

FIELD OF THE INVENTION

The present invention relates to an image decoding apparatus used for decoding both video and still images and to an image memory.

PRIOR ART

There is an ever-expanding demand for video decoding apparatuses which are used by a variety of multimedia appliances to decode compressed video data. Such compressed video data is produced by encoding video into digital data where only the differences between successive frames are included to reduce the total data size.

When decoding compressed video data, the images to be displayed are produced by combining images used as a reference for differential calculation (hereinafter, "reference pictures") with coded images (hereinafter, "differential pictures") for calculated differences between images.

MPEG (Motion Pictures Experts Group) methods use images called I-pictures ("Intra Pictures") as reference pictures. Such I-pictures are compressed image data, but are characterized by including luminance component data and chrominance component data for an entire frame. MPEG methods use P-pictures (Predictive Pictures) and B-pictures (Bidirectionally Predictive Pictures) as differential images. Of these, P-pictures are image data for calculated differences with a preceding frame, while B-pictures are image data for calculated differences with both a preceding and a succeeding frame.

B-pictures and P-pictures are generated so that the differences between frames are calculated in units called pixel blocks that are each composed of 16 horizontal pixels by 16 vertical pixels. Each pixel block is composed of a luminance block comprising 16*16 luminance components as shown in FIG. 1A and, as shown in FIG. 1B, a blue chrominance block ("Cb block") composed of 8*8 blue chrominance components and a red chrominance block ("Cr block") composed of 8*8 red chrominance components. The luminance block of 16*16 luminance components, and the red and blue chrominance blocks of 8*8 chrominance components are collectively called a "macro block", with this being a unit for image decoding.

Each macro block is encoded as follows. A discrete cosine transform ("DCT") is performed for the luminance block and the red and blue chrominance blocks and the spatial frequency components in the low frequency band are separated from the spatial frequency components in the high frequency band. The high frequency components are discarded and quantization is performed for the spatial frequency components located in the low frequency band.

When decoding an encoded macro block, inverse quantization and an inverse DCT are first performed, before motion compensation is performed based on motion vectors so that images can then be displayed. Motion vectors are information that indicates areas with the highest correlation based on a comparison of the preceding and succeeding frames. This is to say, motion vectors are information that shows how objects such as people move within the picture with respect to the preceding and succeeding frames, in units of blocks.

The motion compensation referred to here means the addition (blending) of the appropriate differences to the reference pictures displayed before or after the present frame to form one frame that is a display image.

The compression and decompression techniques for video images under MPEG standard which are referred to by the present application are as described above. These are explained in more detail in a variety of publications, such as the Japanese publication "Pointo Zukaishiki Saishin MPEG Kyokasho (Latest MPEG techniques—An Illustrated Reader) by ASCII Publishing Inc.

When decoding video data that has been compressed by coding the differences between frames, it is necessary to use a DRAM (Dynamic Random Access Memory) or an SDRAM (Synchronous Dynamic Random Access Memory). This is because it is necessary to accumulate a frame image to which the calculated differences are to be added when decoding the compressed video data. With its low cost and large capacity, SDRAM is well suited to this accumulation of images.

While a video decoding apparatus is accumulating images in an SDRAM, it also obtains the differences and motion vectors to be displayed in the next image (frame). After obtaining these motion vectors, the video decoding apparatus needs to cut out partial images, which are the same size as the differences and are positioned corresponding with these differences (these cut out partial images being called the "reference pictures") from the image stored in the SDRAM in accordance with the motion vectors, to add the differences to these cut out reference pictures, and then to rewrite the result back into the SDRAM to produce a next frame image in the SDRAM. By repeating such processing, a moving picture sequence can be displayed. The construction of the part of a conventional video decoding apparatus that relates to the SDRAM is shown in FIG. 2A.

The SDRAM 226 has a word region which is 256 rows by 256 columns in size. Of this, an area which is one row by 256 columns is called a "page".

The luminance components for the 720 horizontal components by 480 vertical components of an accumulated image are equally divided into units that are the same size as luminance blocks, with these divided units being stored in one page. Here, FIG. 2B shows how the image shown in FIG. 2C is stored in the SDRAM 226. The luminance components h11 that are composed of the 16 horizontal components by 16 vertical components shown as (0,0) to (15,15) in FIG. 2C and the luminance components h12 that are composed of the 16 horizontal components by 16 vertical components shown as (16,0) to (31,15) are stored in the $0^{TH}$ page in FIG. 2B, while luminance components h13 that are composed of the 16 horizontal components by 16 vertical components shown as (32,0) to (47,15) and the luminance components h14 that are composed of the 16 horizontal components by 16 vertical components shown as (48,0) to (63,15) are stored in the $1^{ST}$ page. In the same way, the 16 horizontal components by 16 vertical components shown as (64,0) to (79,15) and the 16 horizontal components by 16 vertical components shown as (80,0) to (90,15) are stored in the $2^{ND}$ page. Note here that in the present specification, the coordinates of each component are set so that the top-left vertex of an image is the origin, with the rightward direction being positive for the X axis and the downward direction being positive for the Y axis.

The blue chrominance components of the horizontal 360 components by vertical 240 components of the accumulated image are equally divided into units the size of Cb blocks and are stored on another page. The chrominance components for a one screen image shown in FIG. 2D are stored in the SDRAM 226 as shown in FIG. 2B. The 8 horizontal components by 8 vertical components shown as (0,0) to (7,7) in h21 in FIG. 2D, the 8 horizontal components by 8 vertical components shown as shown as (8,0) to (15,7) in h22, the 8 horizontal components by 8 vertical components shown as (16,0) to (23,7) in h23, and the 8 horizontal components by 8 vertical components shown as (24,0) to (31,7) in h24 are stored on the $150^{TH}$ page, as shown in FIG. 2B. Note that there is no particular basis for this page being numbered "150", with this merely being an example number.

The red chrominance components of the horizontal 360 components by vertical 240 components of the accumulated image are equally divided into units the size of Cr blocks and are stored on one page. Once again, the chrominance components for a one screen image shown in FIG. 2D are stored in the SDRAM 226 as shown in FIG. 2B. The 8 horizontal components by 8 vertical components for h21 shown as (0,0) to (7,7) in FIG. 2D, the 8 horizontal components by 8 vertical components for h22 shown as (8,0) to (15,7), the 8 horizontal components by 8 vertical components for h23 shown as (16,0) to (23,7), and the 8 horizontal components by 8 vertical components for h23 shown as (24,0) to (31,7) are stored on the $200^{TH}$ page, as shown in FIG. 2B. Note once again that there is no particular basis for this page being numbered "200", with this merely being an example number.

The read/write unit 227 writes the cut out reference pictures taken from the reference pictures stored in the SDRAM 226 into the buffer 228 using burst mode. Here, a write using a burst mode means that pixels that are stored in the SDRAM 226 are read by the specifying the row address and column address at which the read is to start, as well as the read length (burst length).

FIG. 3 is a timing chart that shows how a burst read is performed by the read/write unit 227.

At timing t1, the read/write unit 227 issues an active command, as well as sending a row address to the address pins in the SDRAM 226. Next, once time tRCD has elapsed, at timing t2 the read/write unit 227 issues a read command, as well as sending a column address to the address pins.

After the active command has been issued, a number of luminance components which is equal to the number set as the read length is outputted from the data pins of the SDRAM 226. Here, if the read length is set as four words, then luminance components for four pixels will be outputted from the data pins. Here, the reason the luminance components and chrominance components are stored on different pages in the SDRAM 226 is because these components will be read using burst reads.

The buffer 228 temporarily stores luminance blocks and chrominance blocks so that the differences can be blended with the reference picture read from the SDRAM 226, and so that half-pel (half-pixel) interpolation can be performed on the reference picture read from the SDRAM 226. As a minimum, this buffer needs to have sufficient storage capacity for storing a luminance block, which is to say sufficient capacity for storing 16 horizontal components by 16 vertical components of luminance components.

The half-pel interpolation referred to here is a recalculation process for the luminance components and chrominance components which is necessary for the cut out reference picture when the motion vectors show the areas where there is close correlation between the present frame and the preceding and following frames in half-pixel units.

Half-pel interpolation in the vertical axis refers to the generation of components for each line in a luminance block using an average value of a component on a given row and the component on the next row, while half-pel interpolation in the horizontal axis refers to the generation of components for each column in a luminance block using an average value of the component in a given column and the component in the next column. Half-pel interpolation in the vertical and horizontal directions refers to the generation of components for each column in a luminance block using an average value of a component in a given column, the component in the next column, the component on the next row and the component on the next row and next column.

When half-pel interpolation is performed in the vertical direction for the luminance block shown in FIG. 2C, average values are calculated using the luminance components (0,0) to (15,0) located within this luminance block and the luminance components (0,1) to (15,1) on the next row. As a result, the luminance component for the origin (0,0) is rewritten using a value calculated as half the sum of the luminance component (0,0) and the luminance component (0,1). Similarly, the luminance component for the coordinates (1,0) is rewritten using a value calculated as half the sum of the luminance component and the luminance component (1,1), the luminance component for the coordinates (2,0) is rewritten using a value calculated as half the sum of the luminance component (2,0) and the luminance component (2,1), and the luminance component for the coordinates (3,0) is rewritten using a value calculated as half the sum of the luminance component (3,0) and the luminance component (3,1).

When half-pel interpolation is performed in the horizontal direction for the luminance block shown in FIG. 2B, average values are calculated using the luminance components (0,0) to (0,15) located within this luminance block and the luminance components (1,0) to (1,15) in the next column. As a result, the luminance component for the origin (0,0) is rewritten using a value calculated as half the sum of the luminance component (0,0) and the luminance component (1,0). Similarly, the luminance component for the coordinates (0,1) is rewritten using a value calculated as half the sum of the luminance component (0,1) and the luminance component (1,1), the luminance component for the coordinates (0,2) is rewritten using a value calculated as half the sum of the luminance component (0,2) and the luminance component (1,2), and the luminance component for the coordinates (0,3) is rewritten using a value calculated as half the sum of the luminance component (0,3) and the luminance component (1,3).

When it is necessary to perform half-pel interpolation in the vertical direction, the calculation of an average value for a pixel value and a pixel value on a next row needs to be repeated for every row, while when it is necessary to perform half-pel interpolation in the horizontal direction, the calculation of an average value for a pixel value and a pixel value in a next column needs to be repeated for every column.

With the storage method for macro blocks described above, there are the following problems (1-1), (1-2), (2-1), and (2-2) with conventional methods.

(1-1) Regarding Increases in the Number of Burst Reads and Read Time due to the Storage Method of the SDRAM The three components composed of luminance components, blue chrominance components and red chrominance components are stored on separate pages, and since calculation needs to be performed for each of these pages, there is the problem that burst reads have to be performed a number of times which is proportionate to three times the number required to read the reference picture.

As one example, when displaying an image signal according to NTSC standard, thirty image frames need to be displayed every second (in PAL format, twenty-five frames are displayed per second), so that if reference pictures are read close to thirty times, luminance blocks, Cr blocks and Cb blocks will each have to be read in each of the thirty reads for a reference picture. As a result, burst reads will have to be performed for ninety times the number of macro blocks every second.

When performing a burst read for an SDRAM, there is a delay between the issuance of the row address to the issuance of the column address which corresponds to this time tRCD. Since the number of executions of burst reads is increased as described above, the effect of this delay tRCD is also increased, so that a significant delay is caused within the decoding process.

There is also the possibility that the number of read executions will be further increased due to the position of the reference picture. As one example, when the motion vectors indicate a region that is an integer multiple of 16 from the top left vertex of the image as a position where there is high correlation with the reference picture, and the reference picture is neatly positioned within a single luminance block, the luminance components of the 16 horizontal pixels by 16 vertical pixels at the position indicated as described above can be read using a single burst read. However, when the motion vectors indicate an area that is a non-integer multiple from the top left vertex of the image, it becomes necessary to separately read the pixels stored on a plurality of pages. This is also the case for the red chrominance components and the blue chrominance components, so that when the motion vectors indicate an area which is a non-integer multiple of 8 pixels, it becomes necessary to separately read the red chrominance components and blue chrominance components stored on a plurality of pages.

As described above, when the area indicated by the motion vectors is a non-integer multiple of 8 pixels or 16 pixels, there will be an increase in the required number of burst reads. To reduce the delay to the decoding process caused by this, it has been conventionally necessary to set the operation clock at a high frequency as so have the image decoding apparatus operate at high speed. This has a major drawback, however, in that there is a great increase in power consumption.

(1-2) Increases in the Delay when the Reference Picture is Divided and Stored in a Plurality of Memory Arrays The storage areas in the SDRAM that are in matrix form are called memory arrays. A plurality of memory arrays are provided in the SDRAM, with such arrays having a large storage capacity. If a plurality of memory arrays are provided, bank addresses will be separately mapped to each of the memory arrays, with it being possible to divide images and store them across a plurality of memory arrays.

If images are divided and stored across a plurality of memory arrays, it will be necessary to read the luminance components and the chrominance components of the reference picture from the plurality of memory arrays when cutting out an area of a reference picture. When reading the luminance components and the chrominance components of the reference picture from the plurality of memory arrays, there can be cases when the read commands issued for the memory arrays are not accepted.

The phenomenon described above can occur when one of the plurality of memory arrays has not been activated. This is to say, when reading the luminance components and chrominance components from the plurality of memory arrays, it is necessary for all of the memory arrays that store the luminance components and the chrominance components for the reference picture to be activated.

The activation of memory arrays requires an activation time of three clocks, so that the read of the reference picture will be unavoidably delayed by the time represented by these three clocks. When images are divided and stored across a plurality of memory arrays, there are the dual problems that read commends will not be accepted due to one or more memory arrays not being activated and that the read process will be delayed by the time taken to activate such memory arrays.

(2-1) Insufficient Buffer Capacity Problems that occur when a Half-Pixel is Indicated during Half-pel interpolation The reason that luminance components for 16 horizontal pixels by 16 vertical pixels and chrominance components for 8 horizontal pixels by 8 vertical pixels are collectively stored in the buffer 228 is that this enables the repeated calculation of average values in half-pel interpolation to proceed smoothly. When luminance components and chrominance components need to be read in order for an average value to be calculated, the half-pel interpolation needs to be suspended until the read is complete. In order to avoid such suspensions, the buffer 228 needs to have a storage capacity which is sufficient for at least the luminance components of 16 horizontal pixels by 16 vertical pixels and the chrominance components of 8 horizontal pixels by 8 vertical pixels.

However, even if the buffer 228 can store 16 horizontal pixels by 16 vertical pixels, when performing half-pel interpolation in the vertical direction on the luminance components (0,15) to (15,15) located on the final row of the luminance block, it is necessary to use the luminance components (0,16) to (15,16) located on the next row to calculate the average values, meaning that the luminance components (0,16) to (15,16) need to be written into the buffer 228. This means the read performed for this extra row creates a delay for the decoding process. In the same way, when performing a half-pel interpolation in the horizontal direction for the luminance components (15,0) to (15,15) in the final column of the luminance block, average values need to be calculated for the luminance components (15,0) to (15,15) and the luminance components (16,0) to (16,15) in the next column. As a result, a delay is caused by writing the luminance components (16,0) to (16,15) in the next column into the buffer 228.

Here, even if the size of the buffer 228 is increased, there will still be a delay when reading the final row or column of luminance components, so that despite having to bear the increase in production cost due to the increase in the scale of the buffer 228, the problem of the delays in the decoding process is still not completely eradicated. This is to say, according to conventional techniques the scale of the buffer 228 is increased to make the half-pel interpolation processing proceed more smoothly, which means that a large increase in production cost has to be borne just to make the half-pel interpolation processing proceed a little more smoothly.

(2-2) Insufficient Buffer Capacity Problems that Occur When an Odd Pixel is Indicated by a Motion Vector The word length of the SDRAM is 2 bytes, so that when the luminance component, blue chrominance component, and red chrominance component of each pixel is expressed using 1 byte, one word in the SDRAM can be used to store the luminance components, blue chrominance components, or red chrominance components for two pixels. On the other hand, when the motion vectors indicate an odd-numbered pixel as a position which has high correlation with a preceding or succeeding frame, since one word is the smallest unit for a read operation, it is necessary to read one pixel too many. As one example, when the seventeen pixels from the third pixel to the nineteenth pixel are indicated as the reference picture, it will be necessary to read eighteen pixels from the second pixel to the nineteenth pixel.

When a read operation is performed for 18 pixels, the buffer 228 will not be able to store two columns of luminance components. If the user wants to also have these two columns stored in the buffer, it will be necessary to increase the scale of the buffer. Since it is necessary to store one extra column in the horizontal direction, the scale of the buffer will have to be expanded to 18 pixels in the horizontal direction by 16 pixels in the vertical direction.

DISCLOSURE OF THE INVENTION

The first object of the present invention is to provide an image decoding apparatus and an image memory that enables motion compensation to be performed using a low-speed operation clock by reducing the number of reads and read times for reads of luminance components and chrominance components performed on an SDRAM.

The second object of the present invention is to provide an image decoding apparatus that can minimize the delays caused by bank switching when it is necessary to read a reference picture from a page located in a different memory array.

The third object of the present invention is to provide an image decoding apparatus that can smoothly perform half-pel interpolation on a reference picture even when using a buffer whose capacity is smaller than the size of a luminance block.

The fourth object of the present invention is to provide an image decoding apparatus that can read a reference picture located at a position which is an odd-numbered pixel into a buffer, even when the buffer has a capacity that is smaller than the size of a luminance block.

The first object of the present invention can be achieved by an image decoding apparatus equipped with an image memory that stores a one-screen image by dividing the one-screen image into a plurality of image blocks which are each m pixels wide by n pixels high (where m,n are integers that are equal to or greater than 1), the image memory having an array-like storage region storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the same row address and a second column address, and storing m*n luminance components that compose the same one of the image blocks in a second set of serial areas from a different start area specified by a different row address and a third column address to an end area are specified by the different row address and a fourth column address, the image decoding apparatus including: a differential picture decoding unit for decoding a stream inputted from outside to obtain a differential picture and motion vectors; a memory access unit for reading all of the first chrominance components and all of the second chrominance components that compose a reference picture that is to be blended with the differential picture from the first serial areas and for reading all of the luminance components from the second serial areas; and a blending unit for blending the first chrominance components, the second chrominance components, and the luminance components read from the serial areas with the differential picture.

With the stated construction, the blue chrominance components and the red chrominance components which are included in a pixel block are stored between a start address and an end address that are specified using the same row address, so that by indicating a read length starting from the start address, a burst read where the stored content of the memory is read in a burst can be performed. This means that the blue chrominance components and red chrominance components included in a pixel block can be read in a single read operation. If the blue chrominance components and the red chrominance components are read in a single operation, when combined with the single read performed for the luminance components, this means that a total of only two read operations are performed for a single pixel block.

With the above operation, the number of required burst reads is reduced to a number which is proportionate to double the number of macroblocks. In particular, when the read operation of reference pictures is repeated thirty times for the thirty frames in one second, a remarkable reduction can be made in the total read time.

As a result, it is no longer necessary to use a high speed operation clock and have the image decoding apparatus operate at high speed, meaning that power consumption by the image decoding apparatus can be suppressed.

The second object of the present invention can be achieved by an image decoding apparatus equipped with a plurality of memory arrays where an address is specified using a row address, a column address, and a bank address, each memory array storing a one-screen image by dividing the one-screen image into a plurality of image blocks which are each m pixels wide by n pixels high (where m,n are integers that are equal to or greater than 1), each memory array storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the row address and a second column address, and storing m*n luminance components that compose the same one of the image blocks in a second set of serial areas from a different start area specified by a different row address and a third column address to an end area specified by the different row address and a fourth column address, the image decoding apparatus including: a differential picture decoding unit for decoding a stream inputted from outside to obtain a differential picture and motion vectors; an overlapping part determining unit for calculating, when a reference picture to be blended with the differential picture overlaps a plurality of pixel blocks, vertex coordinates of an overlapping part in each pixel block; an order determining unit for determining a read order of the overlapping parts by comparing horizontal widths and vertical heights of the overlapping parts; a memory access unit for reading the luminance components and chrominance components of the overlapping parts from the serial areas in the memory arrays in accordance with the determined read order; and a blend unit for blending the first chrominance components, the second chrominance components and the luminance components read from the plurality of serial areas with the differential picture.

With the stated construction, when it is necessary to separately read reference images from a plurality of memory arrays, the read order will be determined in accordance with the dimensions of the overlapping parts, so that while the luminance components are being read from one of the memory arrays, an activation command can be executed in parallel for one of the other memory arrays. If the memory arrays can be efficiently activated in parallel, delays to the decoding process due to the activation of memory arrays can be avoided and a storage method where images are divided up and stored across a plurality of memory arrays can be actively used in an image decoding apparatus.

The third object of the present invention can be achieved by an image decoding apparatus equipped with an image memory that stores a one-screen image by dividing the one-screen image into a plurality of image blocks which are each m pixels wide by n pixels high (where m,n are integers that are equal to or greater than 1), the image memory having an array-like storage region storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the same row address and a second column address, and storing m*n luminance components that compose the same one of the image blocks in a second set of serial areas from a different start area specified by a different row address and a third column address to an end area specified by the different row address and a fourth column address, the image decoding apparatus including: a differential picture decoding unit for decoding a stream inputted from outside to obtain a differential picture and motion vectors; a first read unit for reading, from the image memory, luminance components composing half a pixel block that corresponds to a reference picture that is to be blended with the differential picture, and reading one row and/or one column of luminance components that are adjacent to the luminance components in the read half pixel block; an image block buffer for storing the read luminance components; a half-pel interpolation unit for performing half-pel interpolation on the luminance components of the stored half pixel block in each required direction; a second read unit for reading, from the image memory, all luminance components composing a remaining half of the pixel block that corresponds to the reference picture that is to be blended with the differential picture, wherein the image block buffer includes an overwriting unit for overwriting, when luminance components and chrominance components of a pixel block have been outputted, luminance components of a latter half of the pixel block into an area of the image block buffer that is occupied by previous luminance components so that only a final row and/or column of the luminance components that are adjacent will be left in the image block buffer, and wherein the half-pel interpolation unit performs half-pel interpolation on the luminance components of the latter half of the pixel block in each required direction, using the final row and/or column of the luminance components that is left in the image block buffer.

With the stated construction, even when an extra row and column of luminance components and chrominance components are required for half-pel interpolation, the luminance components and chrominance components can each be read in a total of two read operations, with the read area being set at one row and one column larger. As a result, even when the buffer has a capacity that is insufficient for storing one luminance block, enough luminance components for the performance of half-pel interpolation can still be stored in the buffer.

The fourth object of the present invention can be achieved by an image decoding apparatus where a start region specified by a row address and one column address stores two luminance components for coordinates that are adjacent in a pixel block, the image decoding apparatus including: a coordinate value judging unit for judging whether an X coordinate of a top left vertex of the reference picture is an odd-numbered coordinate; and an appending unit for appending the first read area and the second read area with a margin when the coordinate value judging unit has judged that the X coordinate of the top left vertex of the reference picture is an odd-numbered coordinate, wherein a first determination unit and a second determination unit determine the read address and read length based on the first read area and the second read area which have been appended with a margin, wherein an output unit in the image memory outputs the luminance components and the chrominance components for each of the first read area and the second read area of the reference picture, and wherein the image block buffer stores the luminance components and the chrominance components that compose the reference picture and have been outputted by the output unit of the image memory.

The image block buffer is characterized by storing the luminance components and chrominance components that compose the reference picture outputted by the output unit of the image memory. With the above image decoding apparatus, even when the read area is increased by one row or one column to read luminance components and chrominance components positioned with odd-numbered coordinates, the luminance components and chrominance components will each be read using two operations where the read area is increased by one row and one column. Accordingly, if the buffer has sufficient capacity for one pixel block, it will be able to store enough luminance components and chrominance components for performing half-pel interpolation.

BRIEF DESCRIPTION OF THE DRAWINGS

FIG. 2B shows how the luminance components and chrominance components are stored on each page.

FIG. 2C shows where the luminance components stored on each page are located in an image.

FIG. 7A shows how luminance components are stored on each page.

FIG. 7B shows how blue chrominance components and red chrominance components are stored on each page.

FIG. 9 shows how luminance components are stored on each page.

FIG. 10 shows how blue chrominance components and red chrominance components are stored on each page.

FIG. 12A is a flowchart showing the read area determination process performed by the compensation control unit 10.

FIG. 12B is also a flowchart showing the read area determination process performed by the compensation control unit 10.

FIGS. 20A to 20I show how the horizontal 16 components by vertical 32 components stored in each page intersect the reference picture.

FIG. 21A shows the internal regions of the buffer A12.

FIG. 21B shows how the overlapping parts read from the pages from the top left page P00 to the bottom right page P11 are stored in the internal regions of the buffer A12.

FIG. 22 shows how the luminance components of the overlapping parts are stored in the internal regions in the buffer A12 whose linear addresses are four bytes long.

FIG. 25A shows the stored content of the buffer A12 when the luminance components of the Y01 block have been written.

FIG. 25B shows the stored content of the buffer A12 when the luminance components of the Y23 block have been written.

FIG. 26A shows the stored content of the buffer A12 when the luminance components of the Y02 block have been written.

FIG. 26B shows the stored content of the buffer A12 when the luminance components of the Y13 block have been written.

FIG. 28A shows how half-pel interpolation is performed for the luminance components of the Y01 block and the Y23 block.

FIG. 28B shows how half-pel interpolation is performed for the luminance components of the Y02 block and the Y13 block.

FIG. 29A shows how the luminance components are stored on each page in the second embodiment.

FIG. 29B shows how the blue chrominance components and red chrominance components are stored on each page in the second embodiment.

PREFERRED EMBODIMENTS OF THE PRESENT INVENTION

Figure 1A:
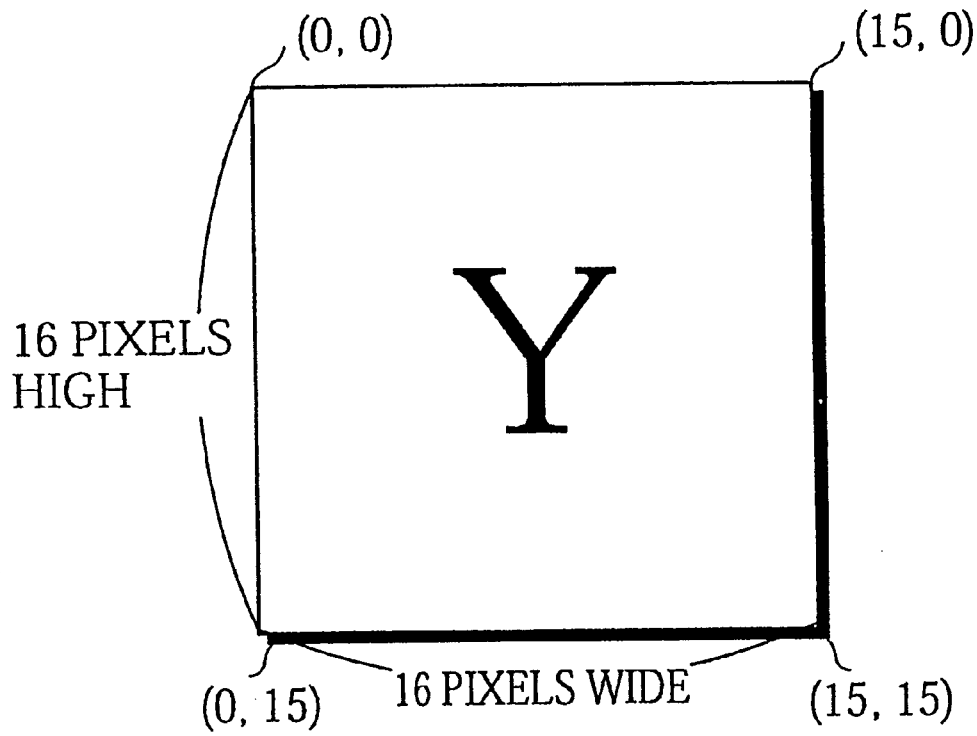
FIG. 1A shows a luminance block that is composed of 16 horizontal components by 16 vertical components.
Figure 1B:
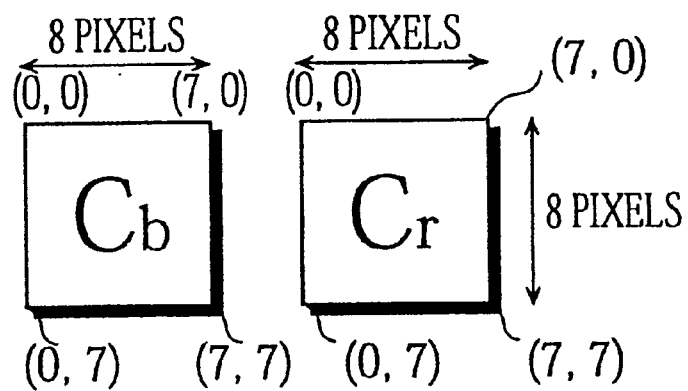
FIG. 1B shows a blue chrominance block and a red chrominance block which are each composed of 8 horizontal components by 8 vertical components.
Figure 2A:
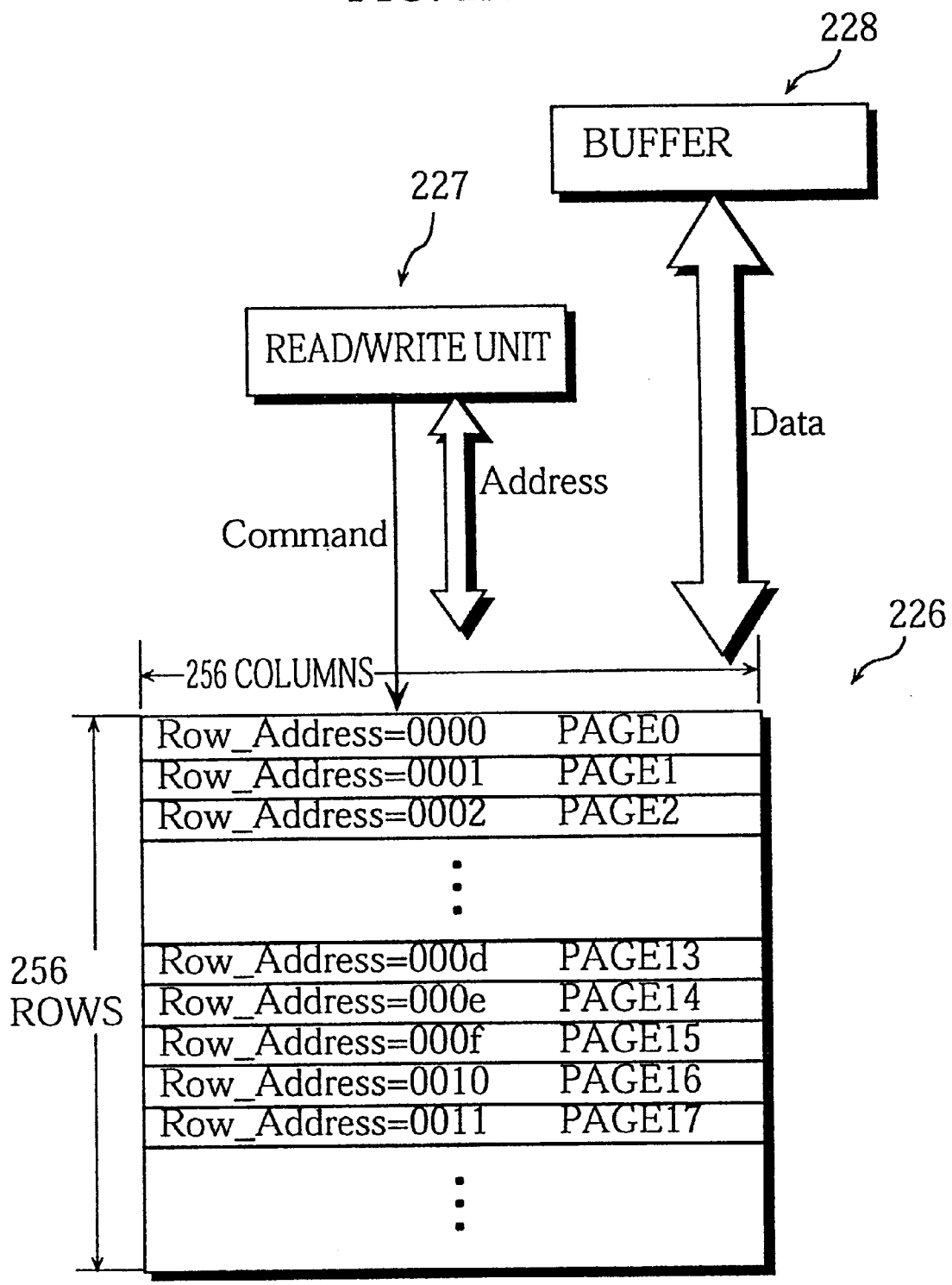
FIG. 2A shows the part of a conventional image decoding apparatus that relates to the SDRAM.
Figure 2D:
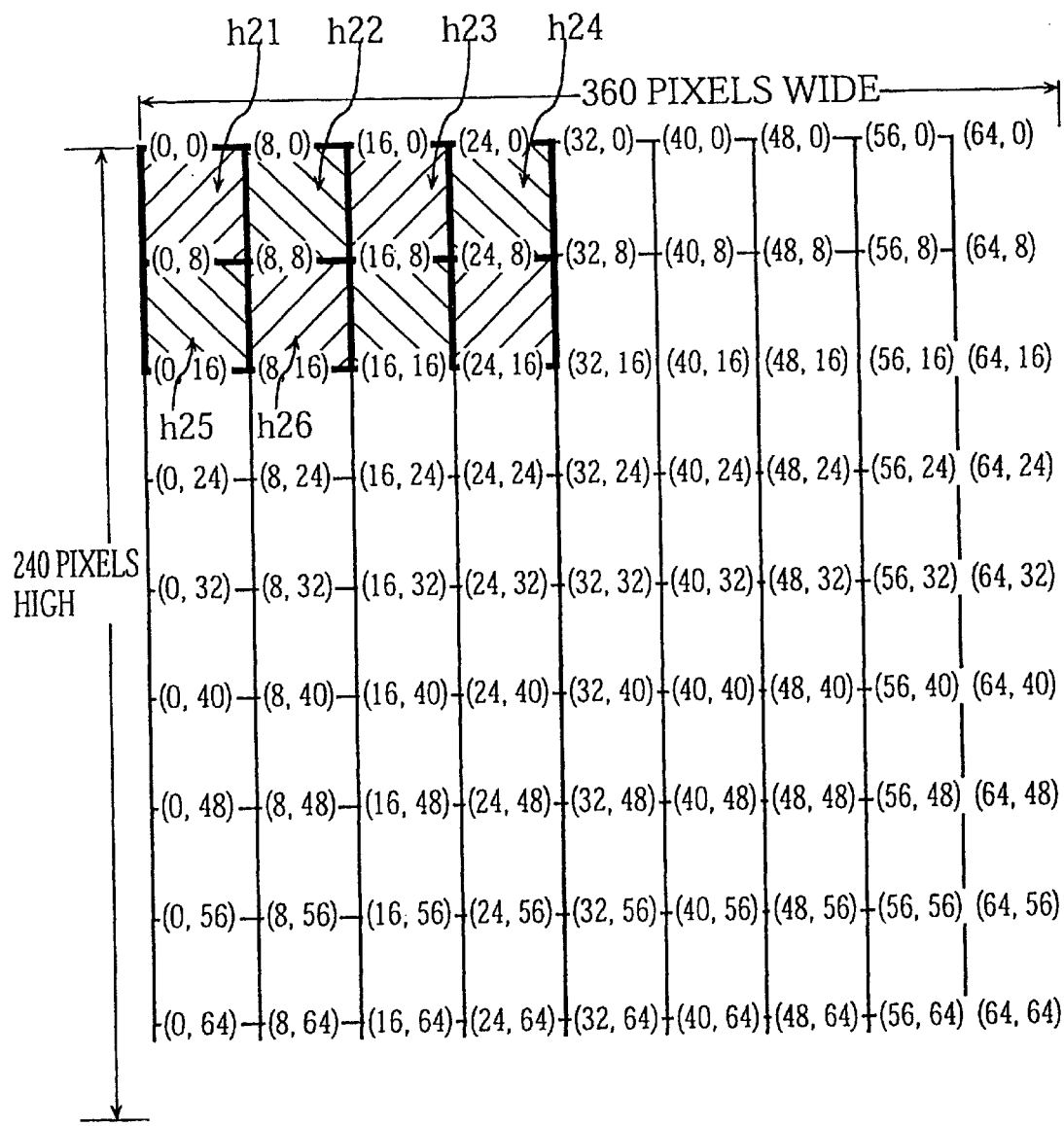
FIG. 2D shows where the red chrominance components and the blue chrominance components on each page are located in an image.
Figure 3:
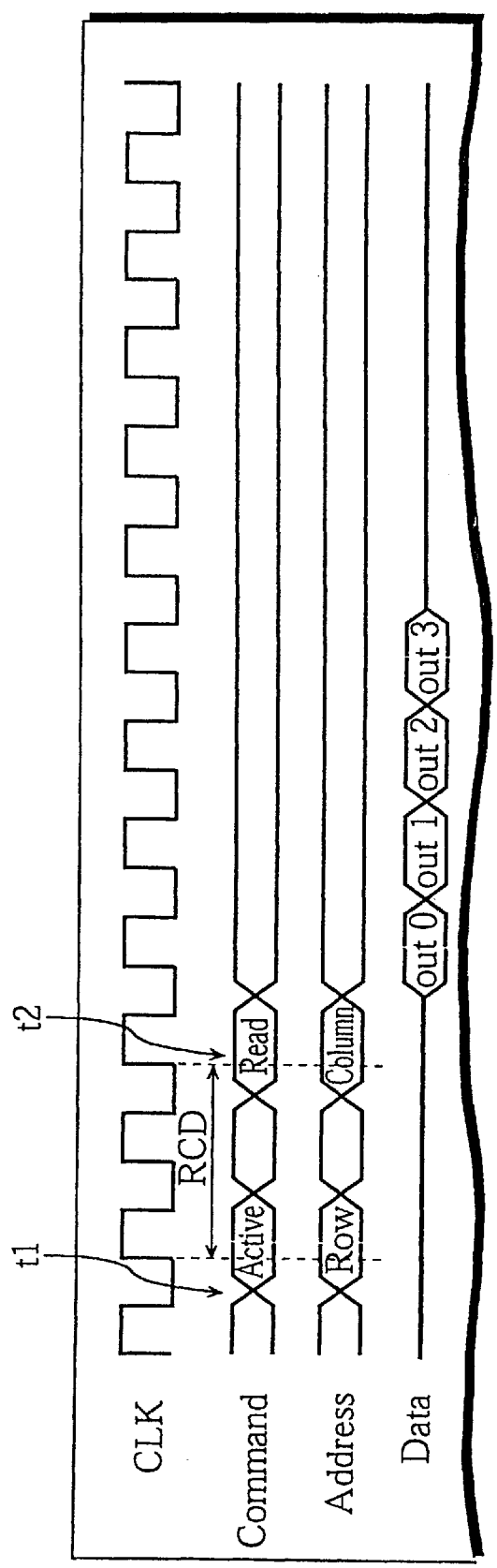
FIG. 3 is a timing chart showing a read process by a conventional image decoding apparatus.

Before describing the image decoding apparatuses that are the embodiments of the present invention, the following explanation will first focus on the three fundamental principles (a), (b), and (c) which are proposed by the present image decoding apparatuses. The following explanation will also indicate the parts of the embodiments that best illustrate these principles to enable better understanding of these fundamental principles.

(a) Improvements to the Storage Method for Luminance Components and Chrominance Components In order to reduce the time taken by read operations performed on the SDRAM, blue chrominance blocks and red chrominance blocks are stored on the same page, and by performing burst reads that specify a row address, a column address and a read length, all of the red chrominance components and the blue chrominance components can be read in one operation. Please refer to (Section 1.1.1 Storage Method for Memory Array 51 and Memory Array 52) to see how luminance components and chrominance components are stored in a plurality of memory arrays.

(b) Reads are Performed for Images that are Stored by being Distributed among a Plurality of Memory Arrays When it is necessary to read the luminance components and the chrominance components of a reference picture from a plurality of memory arrays, it becomes necessary to active the memory arrays independently. By preventing the occurrence of delays due to such individual activation of memory arrays, the present image decoding apparatus decides the order in which reads are performed for the memory arrays and then reads the luminance components and the chrominance components from the plurality of memory arrays according to the decided order. Please refer to Section 1.4.8 to 1.4.11 for further information on this read order.

(c) Rationalization of Half-pel Interpolation by Improving the Reading of the SDRAM and the Writing of the Buffer When a half-pel interpolation is performed in a horizontal direction for the luminance components, instead of trying to write 16 horizontal components by 16 vertical components into the buffer, a set of luminance components which is 17 horizontal components by 8 vertical components, which is to say almost half the size, is written into the buffer. By transferring a set of luminance components which is 17 horizontal components by 8 vertical components into the buffer, each luminance component can be rewritten using an average value of itself and a luminance component in a next column. When half-pel interpolation is being performed for the luminance components on the $16^{th}$ row, the next set of set of luminance components which is 16 horizontal components by 8 vertical components is written into the buffer with the luminance components on the $17^{th}$ row being left unchanged. By doing so, the set of luminance components which is 16 horizontal components by 8 vertical components that has been newly written into the buffer can be rewritten using the average values for these luminance components and the luminance components on the remaining $17^{th}$ row. By performing half-pel interpolation in this way, the luminance components on the remaining $17^{th}$ row can be effectively used, meaning that half-pel interpolation can be smoothly executed.

Please refer to Section 1.3 for information as to how the size of the read region is determined. Also refer to Section 1.3.2 for information as to whether the read region is expanded depending on whether half-pel interpolation is required. Finally, for information as to how the remaining one row of luminance components are used in the half-pel interpolation, please refer to Sections 1.17 and 1.18.

The following is an explanation of the embodiments of the image decoding apparatus of the present invention, with reference to the drawings.

First Embodiment

Section 1—Overall View of the Image Decoding Apparatus

Figure 4A:
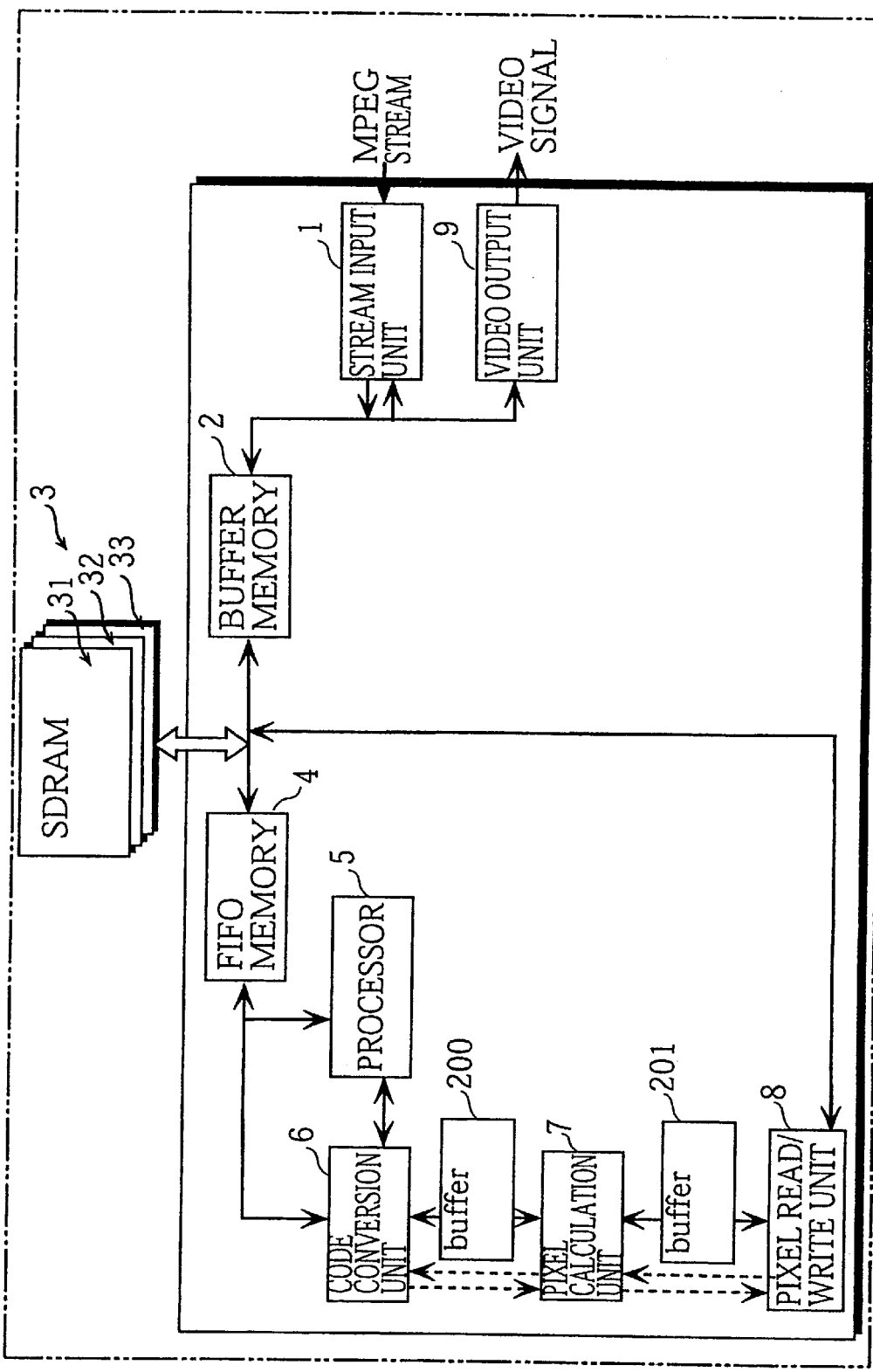
FIG. 4A shows the overall construction of an image decoding apparatus.
Figure 6A:
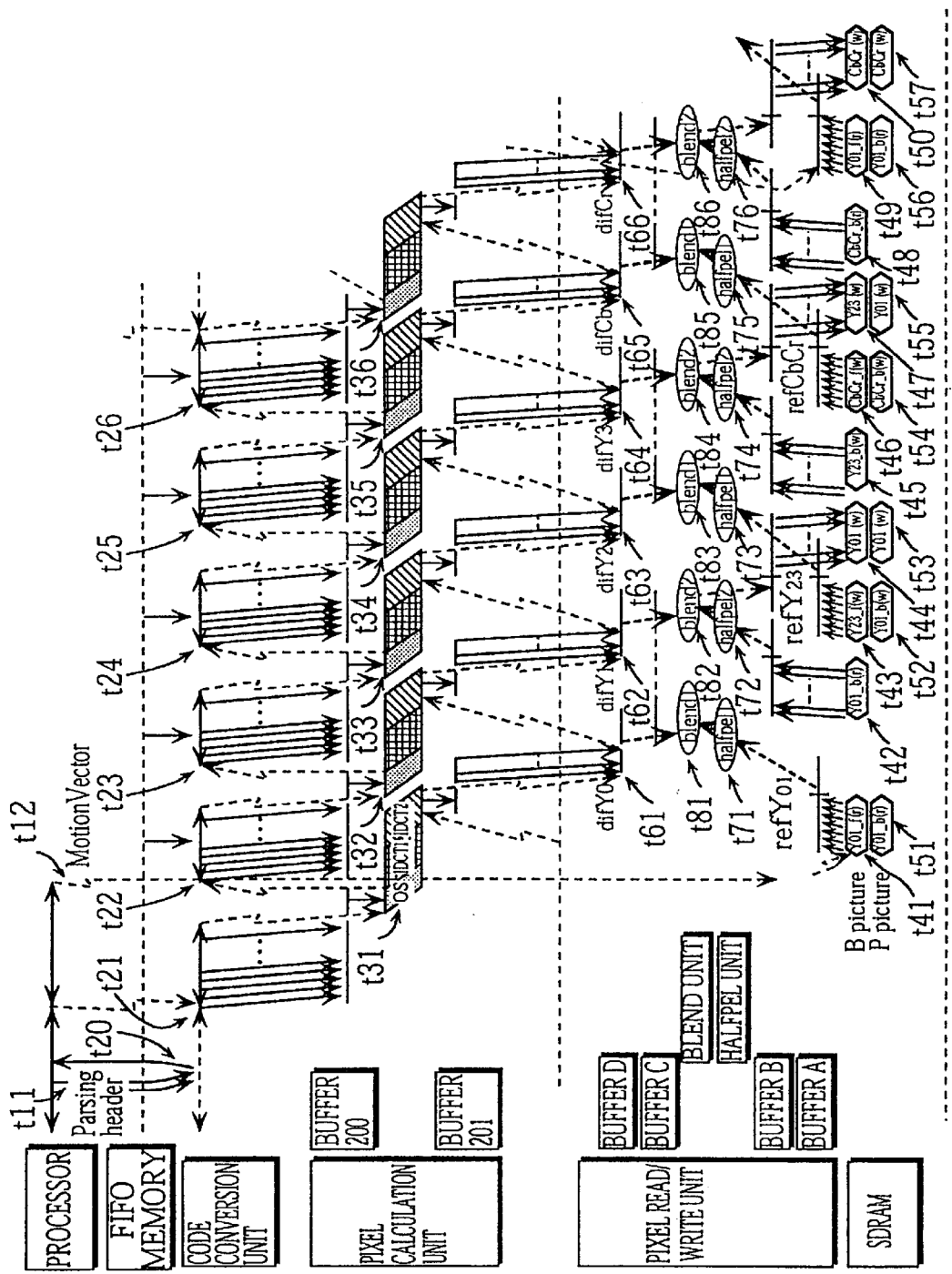
FIG. 6A is a timing chart for the entire image decoding apparatus.

FIG. 4A is a block diagram showing the entire construction of the image decoding apparatus in the first embodiment of the present invention. FIG. 6A, meanwhile, is a timing chart where the FIFO memory 4, the processor 5, the code encoder 6, and the image read/write unit 8 are arranged in the vertical axis and a time series for the processing of these components is shown in the horizontal axis. The following description will refer to FIG. 4A and FIG. 6A when referring to the overall construction of the image decoding apparatus.

As shown in FIG. 4A, the image decoding apparatus is composed of a stream input unit 1, a buffer memory 2, a memory module 3, a FIFO memory 4, a processor 5, a code encoder 6, a pixel calculation unit 7, an image read/write unit 8, a video output unit 9, a buffer 200, and a buffer 201.

The stream input unit 1 converts an MPEG data stream that has been serially inputted from outside into parallel data (hereinafter referred to as "MPEG data"), and transfers the converted MPEG data to the buffer memory 2 under the control of the processor 5.

The buffer memory 2 is a buffer that temporarily stores MPEG data which has been transferred from the stream input unit 1.

The memory module 3 is composed of a plurality of SDRAM (Synchronous Dynamic Random Access Memory) chips, and includes an SDRAM 31 for storing an image which has previously been displayed, an SDRAM 32 for storing images that should be displayed in the future, and an SDRAM 33 for storing images that are obtained by motion compensation. These three chips SDRAM 31 to SDRAM 33 have the same configuration.

The FIFO memory 4 stores compressed image data that has been transferred from the stream input unit 1 under the control of the processor 5 in first in-first out format.

The processor 5 controls read operations for the compressed image data stored in the FIFO memory 4 as well as executing a part of the decode processing performed for the compressed image data. Representative examples of this part of the decode processing for the compressed image data are the analysis of headers in the MPEG stream, the calculation of motion vectors, and the control of the compressed image decode processing.

The code encoder 6 subjects the compressed image data read from the FIFO memory 4 to variable length code decoding (hereinafter referred to as "VLD"), and so obtains six sets of spatial frequency component data, header information, and motion vectors. These sets of spatial frequency components each correspond to a block of 8 horizontal pixels by 8 vertical pixels. As shown by the timing t20 in FIG. 6A, the code encoder 6 transfers the information, out of the decoded data, which relates to the header information and the motion vectors to the processor 5, and transfers the six sets of spatial frequency components via the buffer 200 to the pixel calculation unit 7 in six separate operations shown at timing t21, timing t22, timing t23, timing t24, timing t25, and timing t26. The sets of spatial frequency components transferred in this way are each composed of 8 vertical pixels by 8 horizontal pixels.

The buffer 200 stores the spatial frequency components for 8 vertical pixels by 8 horizontal pixels that have been transferred by the code encoder 6.

Figure 13A:
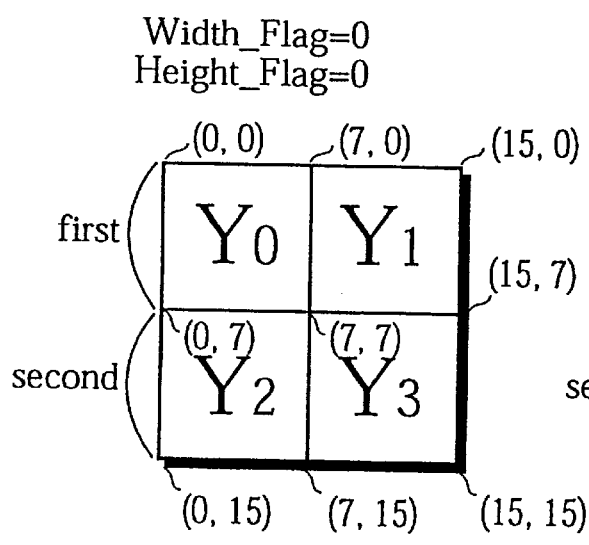
FIGS. 13A to 13D show how the Y01 block and the Y23 block are enlarged by the compensation control unit 10.

The pixel calculation unit 7 performs the processing for inverse quantization and an inverse discrete cosine transform (hereinafter referred to as a "DCT") for one block of spatial frequency components that have been transferred from the code encoder 6 via the buffer 200. Once this processing has been performed on a set of spatial frequency components, the spatial frequency components for one luminance block are converted into a dif_Y0 block, a dif_Y1 block, a dif_Y2 block, a dif_Y3 block, a dif_Cb block, and a dif_Cr block, and are then transferred to the image read/write unit 8 via the buffer 201. The dif_Y0 block to dif_Y3 block referred to here are obtained by dividing a block of 16 vertical components by 16 horizontal components into four blocks of 8 horizontal components by 8 vertical components. Once a luminance block composed of 16 horizontal pixels by 16 vertical pixels has been equally divided into four, the dif_Y0 block, dif_Y1 block, dif_Y2 block, and dif_Y3 block are produced as shown in FIG. 13A. Here, "dif_" means difference.

As shown by the timing chart in FIG. 6A, at timing t3 1 the pixel calculation unit 7 subjects the spatial frequency components that were outputted to the buffer at timing t21 to inverse quantization (hereinafter referred to as "IQ") and an inverse DCT (hereinafter referred to as "IDCT"). By doing so, these spatial frequency components are converted into the dif_Y0 block which is then transferred to the buffer 201.

The image read/write unit 8 performs motion compensation on the processing result of the pixel calculation unit 7 in block units. This is to say, for P pictures and B pictures, the image read/write unit 8 cuts out a rectangular area from the reference frames in the memory module 3 whose decoding is complete and combines the Y0 block, Y1 block, Y2 block, Y3 block, Cb block, and Cr block to decode the original block image, based on the motion vectors. The processing result of this image reading unit 8 is then stored in one of SDRAMs in the memory module 3. When the differential picture is an I picture, however, it is not necessary to perform addition with a reference picture, so that the decoded image can be simply stored in the memory module 3. Based on these images written into the memory module 3, the video output unit 9 outputs a video signal.

Construction of the SDRAMs in the Memory Module 3

The following is an explanation of the SDRAM 31 as a representative example of the SDRAMs included in the memory module 3. The configuration of the SDRAM 31 is shown in FIG. 5.

Figure 5:
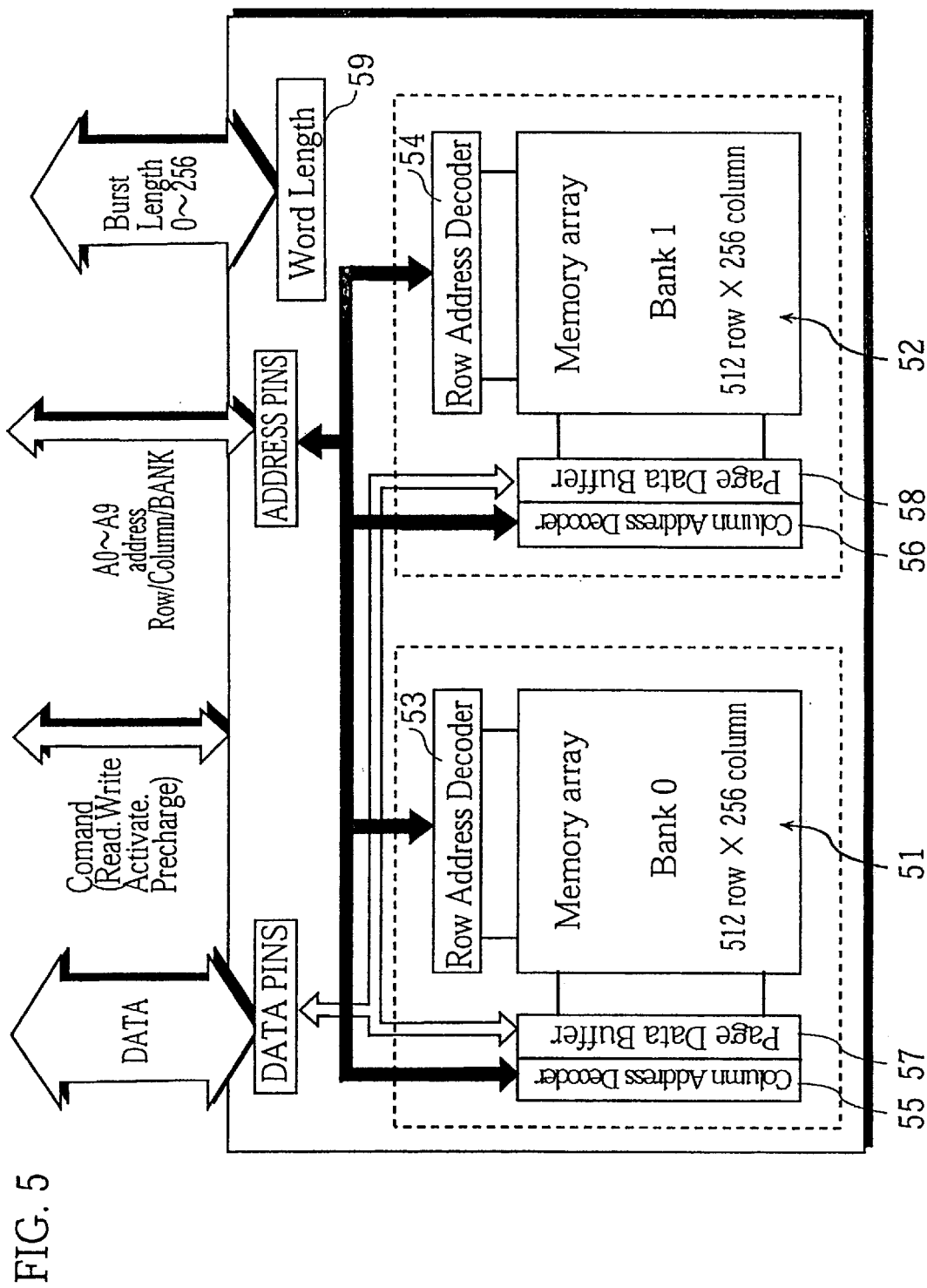
FIG. 5 shows the configuration of an SDRAM.

As shown in FIG. 5, the SDRAM 31 has two regions which are 512 rows by 256 columns, where a region which is 1 row by 256 columns is called a "page region". The principal components of this SDRAM 31 are the memory array 51, the memory array 52, the row address decoder 53, the row address decoder 54, the column address decoder 55, the column address decoder 56, the page data buffer 57, the page data buffer 58, and the word length register 59. The memory array 51 is mapped to the bank address=0 (also referred to as "bank0"), while the memory array 52 is mapped to the bank address=1 (also referred to as "bank1"). The row address decoder 53 and the row address decoder decode the address outputted to the address pins A0–A9 and output the result to the memory array 51 and the memory array 52 as the row address. The column address decoder 55 and the column address decoder 56, meanwhile, decode the address outputted to the address pins A0–A9 and output the result to the memory array 51 and the memory array 52 as the column address. The page data buffer 57 and page data buffer 58 store one page of data read from the memory array 51 and memory array 52 in accordance with the specified row address and column address, and output the read data to the data pins. The word length register 59 stores the word length which is to be used for a burst read, and gives an indication to the page data buffer 57 and the page data buffer 58 to output only the data of this word length. It should be noted here that in the first embodiment, the word length of the SDRAM 31 is one byte, and that the luminance component, blue chrominance component, and red chrominance component for one pixel are each expressed using one byte.

(1.1.1) Storage Method used by the Memory Array 51 and the Memory Array 52

The contents of row address 0000_0000 onwards in the memory array 51 and the memory array 52 are shown in FIG. 7A, while the contents of row address 1000_0000 onwards are shown in FIG. 7B.

Figure 8A:
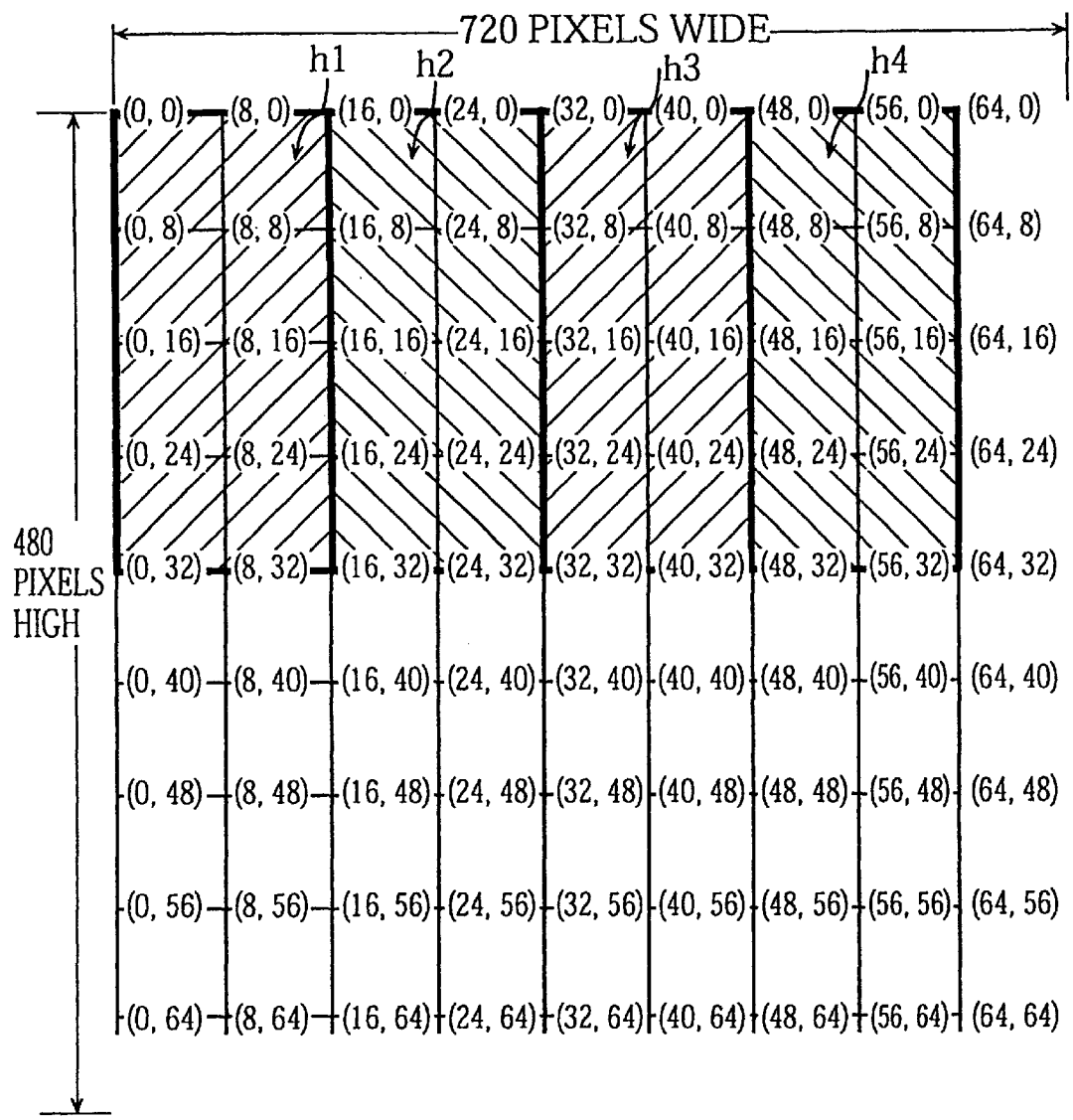
FIG. 8A shows where the luminance components stored on each page are located in an image.

In FIG. 7A, the page region for bank0-row address 0000_0000 stores the luminance components for the rectangular region (0,0)~(15,31) which has the pixel (0,0) as its top left vertex and the pixel (15,31) as its bottom left vertex (in the example shown in FIG. 8A, this corresponds to the shaded region h1). Meanwhile, the page region for bank 1-row address 0000_0000 stores the luminance components for the rectangular region (16,0)~(31,31) which has the pixel (16,0) as its top left vertex and the pixel (31,31) as its bottom left vertex (in the example shown in FIG. 8A, this corresponds to the shaded region h2).

Figure 8B:
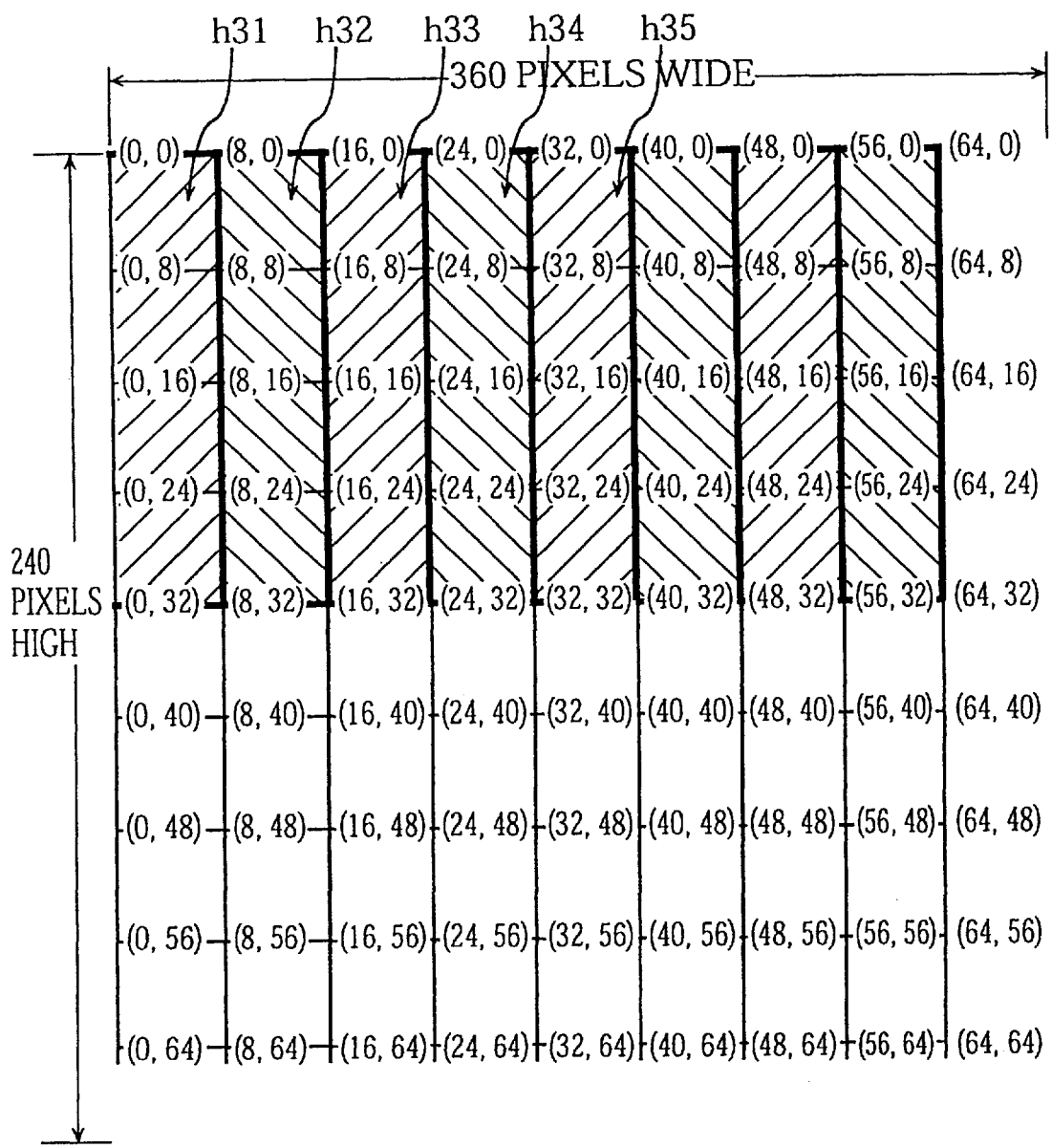
FIG. 8B shows where the red chrominance components and the blue chrominance components on each page are located in an image.

In FIG. 7B, the page region for bank0-row address 0000_0000 stores the blue chrominance components for the rectangular region (0,0)~(7,31) which has the pixel (0,0) as its top left vertex and the pixel (7,31) as its bottom left vertex and the red chrominance components for the same rectangular region (0,0)~(7,31) (in the example shown in FIG. 8B, this corresponds to the shaded region h31). Meanwhile, the page region for bank1-row address 0000_0000 stores the blue chrominance components for the rectangular region (8,0)~(15,31) which has the pixel (8,0) as its top left vertex and the pixel (15,31) as its bottom left vertex and the red chrominance components for the same rectangular region (8,0)~(15,31) (in the example shown in FIG. 8B, this corresponds to the shaded region h32).

(1.1.2) Content of Each Page in the Memory Array 51 and the Memory Array 52

The content of each page in the memory array 51 and the memory array 52 is shown in FIG. 9 and FIG. 10.

In FIG. 9, the luminance components Y(0,0)~Y(15,0) from the top left pixel (0,0) to the pixel (15,0) are stored in the column addresses 000000_0000~000000_1111 of the page region for bank 0-row address 0000.

The luminance components Y(0,1)~Y(15,1) from the pixel (0,1) at the top of the image to the pixel (15,1) are stored in the column addresses 000001_0000~000001_1111.

On the other hand, as shown in FIG. 10, even-numbered addresses for the range where the column address is 000000_0000~000000_1111 in the page region from bank 0-row address 1000_0000 are used to store the blue chrominance components positioned at the coordinates (0,0)~(7,0) in the image, while odd-numbered addresses for the range where the column address is 000000_0000~000000_1111 are used to store the red chrominance components positioned at the coordinates (0,0)~(7,0) in the image.

In more detail, the column address 000000_0000 which is an even-numbered address is used to store the blue chrominance component for the coordinate (0,0), while the column address 000000_0001 which is an odd-numbered address is used to store the red chrominance component for the coordinate (0,0). The adjacent even-numbered address, column address 000000_0010, is used to store the blue chrominance component for the coordinate (1,0), while the column address 000000_0011 which is an odd-numbered address is used to store the red chrominance component for the coordinate (1,0).

As can be seen from the above, each the blue chrominance components and red chrominance components which compose each row in the Cb block and Cr block are stored next to each other in the same page using the even-numbered columns and odd-numbered columns, respectively.

Since the blue chrominance components and the red chrominance components are stored in this way, if burst reads, where the content of the memory is read in bursts, are performed by specifying the read length from the start of the region to be read, the blue chrominance components and the red chrominance components included in the pixel block can be read in a single burst read. Once this is possible, it then becomes possible to perform a read of one pixel block of the reference picture using only two burst reads, one for luminance components and one for chrominance components.

With the construction described above, the number of burst reads can be reduced to a number which is double the number of macro blocks. In particular, when as many as thirty frames of reference pictures are read in one second, a large reduction is made in the time required by the read operations. As a result, it becomes no longer necessary to set the operation clock of the decoder at a high value, meaning that high speed operation is not especially required by the image decoding apparatus and that power consumption can duly be suppressed.

1.2 Configuration of the Image Read/Write Unit 8

Figure 4B:
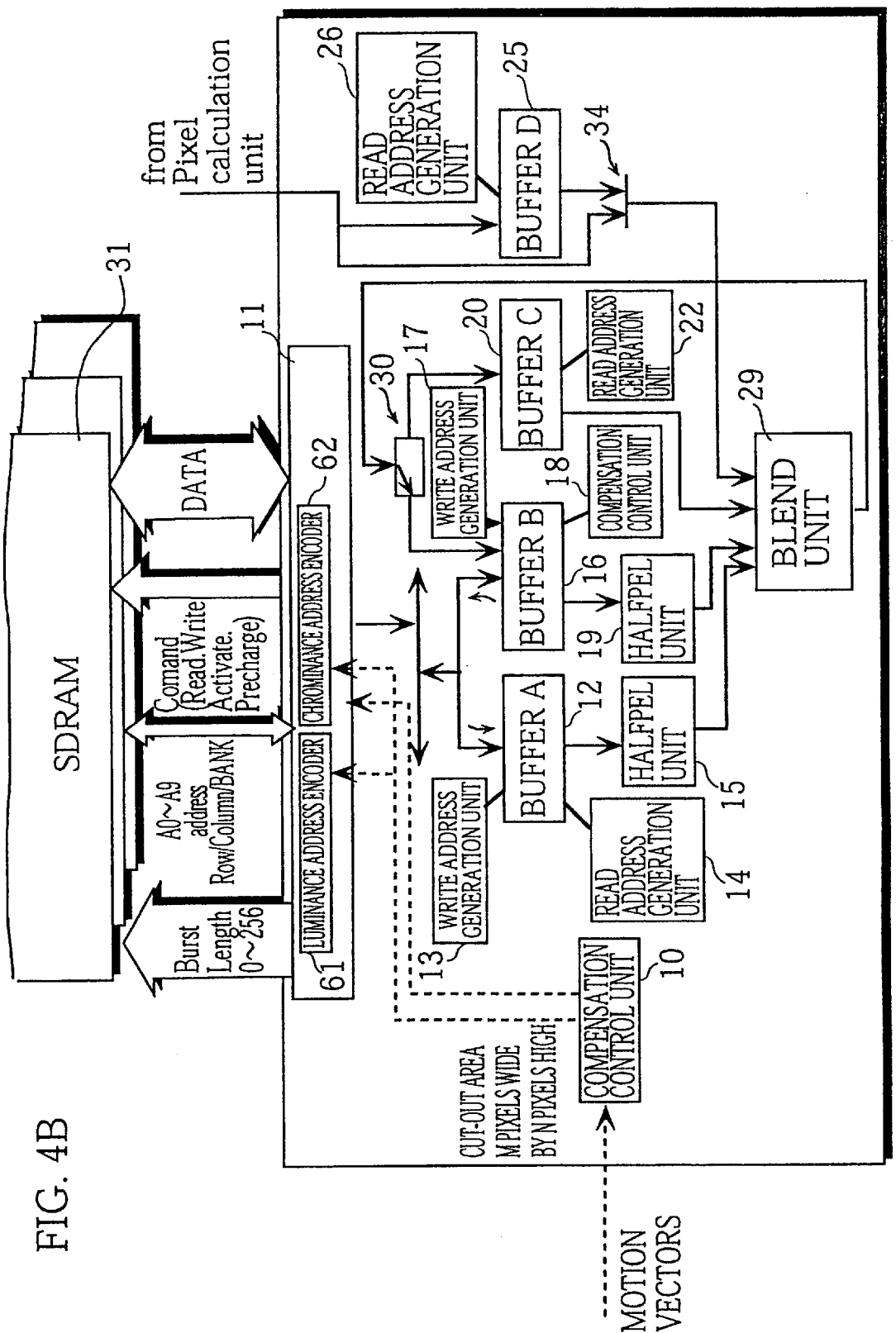
FIG. 4B shows the configuration of the image read/write unit 8.

FIG. 4B is a block diagram showing the configuration of the image read/write unit 8. As shown in FIG. 4B, the image read/write unit 8 is composed of a compensation control unit 10, a memory access unit 11, a buffer A 12, a write address generation unit 13, a read address generation unit 14, a half-pel interpolation unit 15, a buffer B 16, a write address generation unit 17, a read address generation unit 18, a half-pel interpolation unit 19, a buffer C 20, a read address generation unit 22, a buffer D25, a read address generation unit 26, a blend unit 29, and a selector 34. The following is an explanation of the configuration of this image read/write unit 8, with reference to FIG. 4B.

1.3 Role of the Compensation Control Unit 10 The compensation control unit 10 determines what areas should be cut out from which coordinates in the images stored in the SDRAM 31 to SDRAM 33 in accordance with the motion vectors outputted by the processor 5. The reference coordinates for the cut out are set as (X,Y) and the cut out area is set as m pixels wide by n pixels high. On being informed by the compensation control unit 10 of the coordinates (X,Y) of the top left vertex of the reference picture to be cut out, the size (m pixels wide and n pixels high) of the area to be cut out, and whether the differential picture is a P picture or a B picture, the memory access unit 11 performs memory access to read one of the reference pictures in the SDRAM 31 to SDRAM 33. Different amounts of luminance components and the chrominance components of the reference picture can be read, although in the present embodiment a read operation is performed three times for each reference picture.

The X coordinate of the top left vertex of the luminance components of the reference picture is expressed using 10 bits, while the Y coordinate is expressed using 9 bits. This is due to the need to store a numerical value which is between 0 and 720 as an X coordinate and a numerical value between 0 and 479 as a Y coordinate.

The X coordinate of the blue chrominance components and the red chrominance components of reference picture is expressed using 9 bits, while the Y coordinate is expressed using 8 bits. This is due to the need to store a numerical value which is between 0 and 359 as an X coordinate and a numerical value between 0 and 239 as a Y coordinate.

The first read performed by the compensation control unit 10 reads the top half of a luminance block. This is to say, the memory access unit 11 determines a combination of the Y0 block and the Y1 block (hereinafter, referred to as the "Y01 block"), out of the Y0 block, the Y1 block, the Y2 block, and the Y3 block which compose each luminance block, as the block m pixels wide by n pixels high which is to be read.

The second read performed by the compensation control unit 10 reads the bottom half of the luminance block. This is to say, the memory access unit 11 determines a combination of the Y2 block and the Y3 block (hereinafter, referred to as the "Y23 block"), out of the Y0 block, the Y1 block, the Y2 block, and the Y3 block which compose each luminance block, as the block m pixels wide by n pixels high which is to be read.

The third read performed by the compensation control unit 10 reads the Cb block and Cr block. This is to say, the memory access unit 11 determines a combination of the Cb block and the Cr block (hereinafter, referred to as the "CbCr block") as the block m pixels wide by n pixels high which is to be read.

The reason that the luminance block is read by performing separate reads for the Y01 block and the Y23 block is so that one extra row and one extra column of luminance components can be written into a buffer whose capacity is 16 horizontal pixels by 16 vertical pixels. This is to say, when the capacity of the buffer is 16 horizontal pixels by 16 vertical pixels and luminance components for 16 horizontal pixels by 16 vertical pixels are written in together, the buffer will be unable to store the extra luminance components, although when the luminance components are written into a buffer with a capacity of 16 horizontal pixels by 16 vertical pixels in two stages, there will be sufficient capacity in the buffer for storing the extra luminance components.

The following is an explanation of how luminance components are read by the compensation control unit 10 when luminance components are encoded in field units and an IDCT is performed for the odd-numbered rows and even-numbered rows in the Y02 block and the Y13 block by the pixel calculation unit 7.

During the first read by the compensation control unit 10, the left half of the luminance block is read. This is to say, the memory access unit 11 determines a combination of the Y0 block and the Y2 block (hereinafter, referred to as the "Y02 block"), out of the Y0 block, the Y1 block, the Y2 block, and the Y3 block which compose each luminance block, as the block m pixels wide by n pixels high which is to be read.

During the second read, the right half of the luminance block is read. This is to say, the memory access unit 11 determines a combination of the Y1 block and the Y3 block (hereinafter, referred to as the "Y13 block"), out of the Y0 block, the Y1 block, the Y2 block, and the Y3 block which compose each luminance block, as the block m pixels wide by n pixels high which is to be read.

The reason the reference picture is read using this Y02 block, Y13 block pattern is that the Y02 block, Y13 block pattern is obtained as the result of the IDCT by the pixel calculation unit 7.

During the third read, the Cb block and the Cr block are read. This is to say, the memory access unit 11 determines a combination of the Cb block and the Cr block (hereinafter, referred to as the "CbCr block") as the block m pixels wide by n pixels high which is to be read.

1.3.1 Positioning of the Compensation Control Unit 10 within the Image Decoding Apparatus In the timing chart shown in FIG. 6A, at timing t12 the processor 5 analyzes the motion vectors in performing the header analysis, and when the outputted differential picture is a P picture, the processor 5 recognizes that this should be added to a previous reference picture, so that the processor 5 has the previous ref_Y01_b(r) block (here, "ref" represents the "reference" of "reference picture", while in "b(r)" the "b" means "backward" and the "r" means "read"), the ref_Y23_b(r) block, and the ref_CbCr_b(r) block read from the SDRAM 31 in the memory module 3.

When the outputted differential picture is a B picture, the processor 5 recognizes that this should be added not only to a previous reference picture, but also to a following reference picture, and so the processor 5 also has the following ref_Y01_f(r) block (here, the "f" in "f(r)" means "forward"), the ref_Y23_f(r) block, and the ref_CbCr_f(r) block read from the SDRAM 32 in the memory module 3.

1.3.2 Determination of the Read Area by the Compensation Control Unit 10

The determination by the compensation control unit 10 of the area to be read is achieved by a sequencer or a machine language program, either of which realizes the procedure of the flowcharts in FIG. 12A and FIG. 12B.

The following is an explanation of the details of the processing content of the memory access unit 11 with reference to these flowcharts. In step S0, the memory access unit 11 sets the Width_Flag and the Height_Flag to "0". Next, in step S1, the compensation control unit 10 refers to the motion vectors and judges whether half-pel interpolation is necessary in the vertical direction. If so, the compensation control unit 10 sets the Height_Flag at "1" in step S2. Next, in step S3, the compensation control unit 10 judges whether half-pel interpolation is necessary in the horizontal direction. If so, the compensation control unit 10 sets the Width_Flag at "1" is step S4.

In step S5, the compensation control unit 10 judges whether the reference picture is a luminance block and, if so, in step S6 the compensation control unit 10 judges whether the reference picture has been subjected to frame encoding or field encoding.

When the reference picture has been subjected to frame encoding, in step S7, the compensation control unit 10 determines the m pixels wide by n pixels high to be read as the number of pixels (m,n)=(2*8+1*Width_Flag, 8+1*Height_Flag).

Here, if the values of both the Height_Flag and the Width_Flag are "0", the compensation control unit 10 will determine the number of pixels as (2*8+1*0, 8+1*0)=(16,8). The size of this (16,8) block is the same as the size of the Y01 block shown in FIG. 13A with the vertices (0,0), (15,0), (0,7), and (15,7).

Figure 13B:
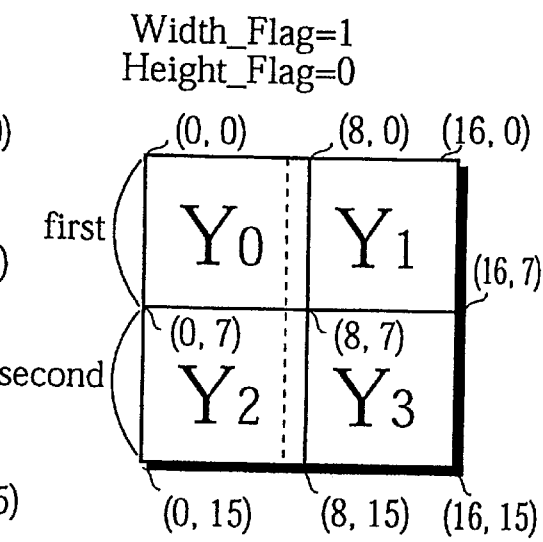

When the Height_Flag is "0" and the Width_Flag is "1", the compensation control unit 10 will determine the number of pixels as (2*8+1*1, 8+1*0)=(17,8). The size of this (17,8) block is the same as the size of the Y01 block shown in FIG. 13B with the vertices (0,0), (16,0), (0,7), and (16,7). This Y01 block of FIG. 13B has one more column than the Y01 block of FIG. 13A, as shown by the broken line in the figure. From this it can be seen that because half-pel interpolation is necessary in the horizontal direction, the Width_Flag is set at "1" and the read area is increased by one column.

The reason the read area is determined so as to include one extra column is that when half-pel interpolation is performed in the horizontal direction, it is necessary to generate average values using the luminance components in each column and the luminance components in the neighboring column.

Figure 13C:
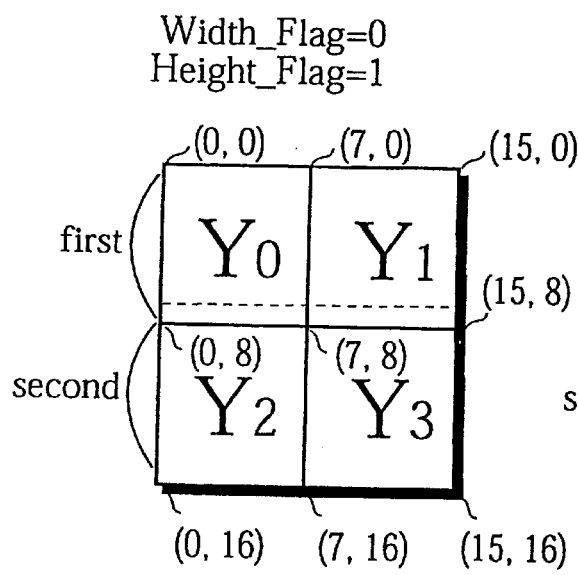

When the Height_Flag is "1" and the Width_Flag is "0", the compensation control unit 10 will determine the number of pixels as (2*8+1*0, 8+1*1)=(16,9). The size of this (16,9) block is the same as the size of the Y01 block shown in FIG. 13C with the vertices (0,0), (15,0), (0,8), and (15,8). This Y01 block of FIG. 13C has one more row than the Y01 block of FIG. 13A, as shown by the broken line in the figure. From this it can be seen that because half-pel interpolation is necessary in the vertical direction, the Height_Flag is set at "1" and the read area is increased by one row.

Figure 13D:
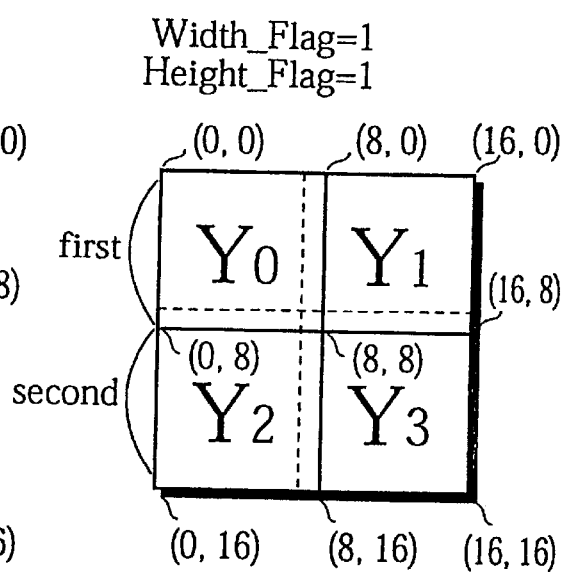

When the Height_Flag is "1" and the Width_Flag is also "1", the compensation control unit 10 will determine the number of pixels as (2*8+1*1, 8+1*1)=(17,9). The size of this (17,9) block is the same as the size of the Y01 block shown in FIG. 13D with the vertices (0,0), (16,0), (0,8), and (16,8). This Y01 block of FIG. 13D has one more column and one more row than the Y01 block of FIG. 13A, as shown by the broken line in the figure. From this it can be seen that because half-pel interpolation is necessary in the vertical and horizontal directions, the Height_Flag and Width_Flag are set at "1", and the read area is increased by one row and by one column.

After setting the coordinates (X,Y) located in the top left vertex of the reference picture and the number of pixels (m,n) in this way, in step S8 the compensation control unit 10 has the memory access unit 11 perform a read operation to read the reference picture made up of (m,n) pixels with the coordinates (X,Y) as its top left vertex. In step S9, a value (vertical height n+1) is added to the Y coordinate of the top left vertex of the reference picture. By adding this value, the coordinates (X,Y) located in the top left vertex of the reference picture become the top left vertex of the Y23 block shown in FIG. 13A. Following this, the number of pixels (m,n) in the read area to be read in this second read is determined as (2*8+1*Width_Flag,8).

Here, if the Height Flag and Width Flag are both "0", the compensation control unit 10 will determine the number of pixels as (2*8+1*0,8)=(16,8). The size of this (16,8) block is the same as the size of the Y23 block shown in FIG. 13A with the vertices (0,7), (15,7), (0,15), and (15,15).

When the Height_Flag is "0" and the Width_Flag is "1", the compensation control unit 10 will determine the number of pixels as (2*8+1*1,8)=(17,8). The size of this (17,8) block is the same as the size of the Y23 block shown in FIG. 13B with the vertices (0,8), (16,8), (0,15), and (16,15). This Y01 block of FIG. 13B has one more column than the Y23 block of FIG. 13A, as shown by the broken line in the figure. From this it can be seen that because half-pel interpolation is necessary in the horizontal direction, the Width_Flag is set at "1" and the read area is increased by one column.

When the Height_Flag is "1" and the Width_Flag is "0", the compensation control unit 10 will determine the number of pixels as (2*8+1*0,8)=(16,8). The size of this (16,8) block is exactly the size of the Y23 block shown in FIG. 13C with the vertices (0,8), (15,8), (0,16), and (15,16).

When the Height_Flag is "1" and the Width_Flag is also "1", the compensation control unit 10 will determine the number of pixels as (2*8+1*1,8)=(17,8). The size of this (17,8) block is the same as the size of the Y23 block shown in FIG. 13D with the vertices (0,8), (16,8), (0,16), and (16,16).

By having the coordinates (X,Y) located at the top left vertex of the reference picture and the number of pixels (m,n) determined in this way, the compensation control unit 10 can have the memory access unit 11 perform a read operation that will read a reference picture which is composed of (m,n) pixels starting from the coordinates (X,Y) located at its top left vertex.

The following is an explanation of when the reference picture has been field encoded, with reference to FIG. 12B.

In step S12, the compensation control unit 10 determines the number of pixels (m,n) in a block which is m pixels wide and n pixels high according to the equation number of pixels (m,n)=(8+1*Width_Flag,8*2+1*Height_Flag).

Figure 14A:
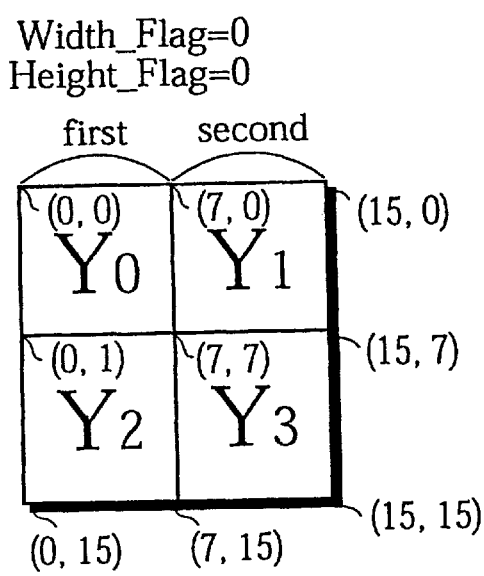
FIGS. 14A to 14D show how the Y02 block and the Y13 block are enlarged by the compensation control unit 10.

Here, if the Height_Flag and Width_Flag are both "0", the compensation control unit 10 will determine number of pixels (m,n)=(8+1*0,8*2+1*0)=(8,16). The size of this (8,16) block is the size of the Y02 block shown in FIG. 14A with the vertices (0,0), (7,0), (0,15), and (7,15).

Figure 14B:
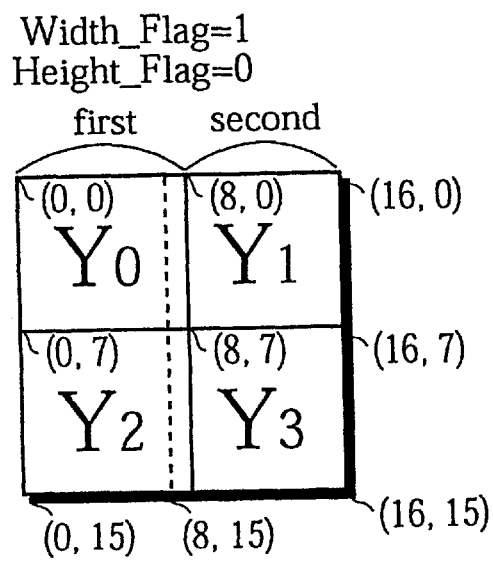

When the Height_Flag is "0" and the Width_Flag is "1", the compensation control unit 10 will determine the number of pixels as (8+1*1,2*8+1*0)=(9,16). The size of this (9,16) block is the same as the size of the Y02 block shown in FIG. 14B with the vertices (0,0), (8,0), (0,15), and (8,15). This Y02 block of FIG. 14B has one more column than the Y01 block of FIG. 14A, as shown by the broken line in the figure. From this it can be seen that because half-pel interpolation is necessary, the Width_Flag is set at "1" and the read area is increased by one column.

The reason the read area is determined so as to include one extra column is that when half-pel interpolation is performed in the horizontal direction, it is necessary to generate average values using the luminance components in each column and the luminance components in the neighboring column.

Figure 14C:
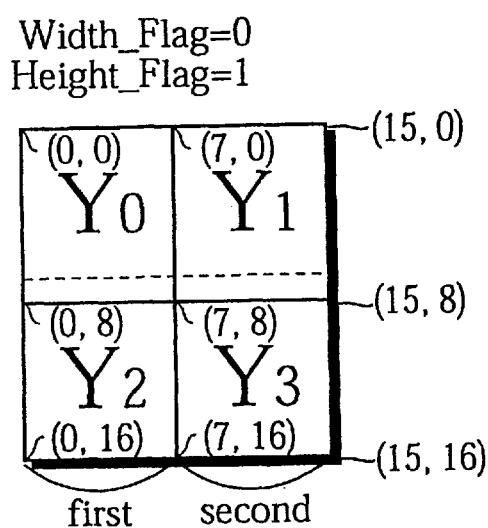

When the Height_Flag is "1" and the Width_Flag is "0", the compensation control unit 10 will determine the number of pixels as (8+1*0,2*8+1*1)=(8,17). The size of this (8,17) block is the same as the size of the Y02 block shown in FIG. 14C with the vertices (0,0), (7,0), (0,16), and (7,16). This Y02 block of FIG. 14C has one more row than the Y01 block of FIG. 14A, as shown by the broken line in the figure. From this it can be seen that because half-pel interpolation in the vertical direction is necessary, the Height_Flag is set at "1" and the read area is increased by one row.

Figure 14D:
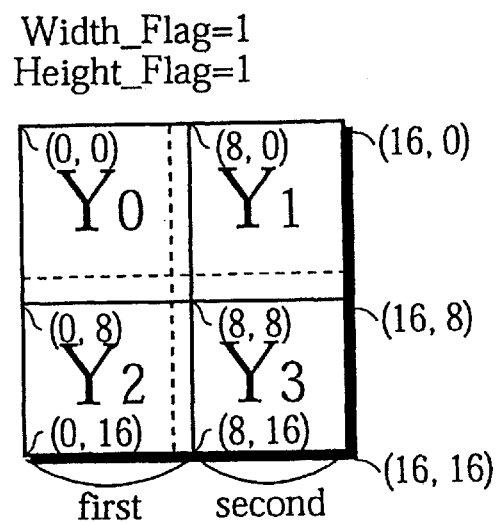

When the Height_Flag is "1" and the Width_Flag is also "1", the compensation control unit 10 will determine the number of pixels as (8+1*1,2*8+1*1)=(9,17). The size of this (9,17) block is the same as the size of the Y02 block shown in FIG. 14D with the vertices (0,0), (8,0), (0,16), and (8,16). This Y02 block of FIG. 14D has one more row and one more column than the Y01 block of FIG. 14A, as shown by the broken line in the figure. From this it can be seen that because half-pel interpolation is necessary in the vertical direction and in the horizontal direction, the Width_Flag is set at "1" and the read area is increased by one row and by one column.

By having the coordinates (X,Y) located at the top left vertex of the reference picture and the number of pixels (m,n) determined in this way, in step S13 the compensation control unit 10 can have the memory access unit 11 perform a read operation that will read a reference picture which is composed of (m,n) pixels starting from the coordinates (X,Y) located at its top left vertex.

In step S14, a value (width m+1) is added to the X coordinate of the top left vertex of the reference picture. Following this, the compensation control unit 10 determines the number of pixels (m,n) in the read area to be read in this second read as number of pixels (m,n)=(8*1*Width_Flag, 2*8+1*Height_Flag).

Here, if the Height_Flag and Width_Flag are both "0", the compensation control unit 10 will determine number of pixels (m,n)=(8,8*2+1*0)=(8,16). The size of this (8,16) block is the same as the size of the Y13 block shown in FIG. 14A with the vertices (8,0), (15,0), (8,15), and (15,15).

If the Height_Flag is "0" and the Width_Flag is "1", the compensation control unit 10 will determine number of pixels (m,n) =(8,8*2+1*0)=(8,16). The size of this (8,16) block is the same as the size of the Y13 block shown in FIG. 14B with the vertices (9,0), (16,0), (9,15), and (16,15).

If the Height_Flag is "1" and the Width_Flag is "0", the compensation control unit 10 will determine number of pixels (m,n)=(8,8*2+1*1)=(8,17). The size of this (8,17) block is the same as the size of the Y13 block shown in FIG. 14C with the vertices (8,0), (15,0), (8,16), and (15,16).

If the Height_Flag is "1" and the Width_Flag is also "1", the compensation control unit 10 will determine number of pixels (m,n)=(8,8*2+1*1)=(8,17). The size of this (8,17) block is the same as the size of the Y13 block shown in FIG. 14D with the vertices (9,0), (16,0), (9,16), and (16,16). This Y13 block of FIG. 14D has one more row than the Y13 block of FIG. 14A. From this it can be seen that because half-pel interpolation is necessary, the Width_Flag is set at "1" and the read area is increased by one row.

By having the coordinates (X,Y) located at the top left vertex of the reference picture and the number of pixels (m,n) determined in this way, in step S16 the compensation control unit 10 can have the memory access unit 11 perform a read operation that will read a reference picture which is composed of (m,n) pixels starting from the coordinates (X,Y) located at its top left vertex.

In step S17, the compensation control unit 10 determines the number of pixels (m,n) in the block of chrominance components which is m pixels wide and n pixels as number of pixels (m,n)=(2*8+1*Width_Flag,8+1*Height_Flag).

When the "Height_Flag" and the "Width Flag" are both "0", the number of pixels (m,n) in the CbCr block is determined as number of pixels (m,n)=(2*8+1*0,8+1*0)= (16,8).

When the "Height_Flag" is "0" and the "Width_Flag" is "1", the number of pixels (m,n) in the CbCr block is determined as number of pixels (m,n)=(2*8+1*1,8+1*0)= (17,8).

When the "Height Flag" is "1" and the "Width_Flag" is "0", the number of pixels (m,n) in the CbCr block is determined as number of pixels (m,n)=(2*8+1*0,8+1*1)= (16,9).

When the "Height_Flag" and the "Width_Flag" are both "1", the number of pixels (m,n) in the CbCr block is determined as number of pixels (m,n)=(2*8+1*1,8+1*1)= (17,9).

By having the coordinates (X,Y) located at the top left vertex of the reference picture and the number of pixels (m,n) determined in this way, in step S18 the compensation control unit 10 can have the memory access unit 11 perform a read operation that will read a reference picture which is composed of (m,n) pixels starting from the coordinates (X,Y) located at its top left vertex.

1.4 Outline of the Remaining Components in the Image Read/Write Unit 8

The following is a description of the remaining components of the image read/write unit 8 which will focus upon the more important components, these being the memory access unit 11, the buffer A 12, the buffer B 16, the buffer C 20, and the buffer D 25.

Once the coordinates of the top left vertex, the width, and the height have been determined by the compensation control unit 10, the memory access unit 11 reads an area of the stipulated height and width starting from the indicated top left vertex in the buffer A 12.

When the top left vertex, the width, and the height have been determined by the compensation control unit 10 for the Y01 block, the memory access unit 11 reads the Y01 block at the indicated position in the buffer A 12. Half-pel interpolation is then performed on the read Y01 block, and the compensation control unit 10 determines the top left vertex, the width, and the height for the Y23 block, with the memory access unit 11 reading the indicated Y23 block at the indicated position in the buffer A 12. Half-pel interpolation is then performed on the read Y23 block, and the compensation control unit 10 determines the top left vertex, the width, and the height for the CbCr block, with the memory access unit 11 reading the indicated CbCr block at the indicated position in the buffer A 12. This is also the case when the compensation control unit 10 has the reference picture read in a Y02 block, Y13 block, and then CbCr block order.

In order to perform memory access, the memory access unit 11 includes a luminance address encoder 61 and a chrominance address encoder 62. The luminance address encoder 61 converts each luminance component into a row address, a column address, and a bank address for an address that stores the luminance component. The chrominance address encoder 62, meanwhile, converts each blue chrominance component and red chrominance component into a row address, a column address, and a bank address of an address that stores the blue chrominance component and the red chrominance component when the coordinates (X,Y) of the pixel to be read have been outputted by the compensation control unit 10. This memory access unit 11 accesses the SDRAM 31, the SDRAM 32, and the SDRAM 33 in accordance with the read area calculated by the compensation control unit 10.

When the differential picture is a B picture and the luminance components and chrominance components that compose the Y01 block, the Y23 block, and the CbCr block in the forward direction are read by the memory access unit 11, these components will be stored in the buffer A 12. Similarly, when the differential picture is a P picture and the luminance components and chrominance components that compose the Y01 block, the Y23 block, and the CbCr block in the forward direction are read by the memory access unit 11, these components will be stored in the buffer A 12. The luminance components and chrominance components stored in this way are subjected to half-pel interpolation by the half-pel interpolation unit 15.

Buffer B 16 stores the luminance components and chrominance components that compose the Y01 block, the Y23 block, and the CbCr block in the backward direction that have been read by the memory access unit 11 when the differential picture is a B picture. The luminance components and chrominance components stored in this way are also subjected to half-pel interpolation by the half-pel interpolation unit 15. The buffer B 16 also stores the blending result of when the result of the half-pel interpolation by the half-pel interpolation unit 15 is blended with the 16 horizontal pixels by 16 vertical pixels of differences by the blend unit 29, before this blending result is outputted to the memory access unit 11 so that it can be written into an SDRAM in the memory module 3.

Buffer C 20 stores the results of the half-pel interpolation by the half-pel interpolation unit 15 performs that are outputted in a 16 horizontal pixel by 8 vertical pixel block or a 8 horizontal pixel by 16 vertical pixel block. After the differences that are to be blended with these half-pel interpolation results have been outputted by the buffer D 25, the buffer C 20 outputs the half-pel interpolation results which it has stored so far to the blend unit 29 so that these results can be blended with the differences.

The buffer D 25 stores the differences of the Y0 block, Y1 block, Y2 block, Y3 block, Cb block, and Cr block that are transferred from the pixel calculation unit 7 via the buffer 201, and when the half-pel interpolation unit 15 has performed half-pel interpolation on the Y01 block, the Y23 block, and the CbCr block that are stored in the buffer A 12 and the buffer B 16, the buffer D 25 outputs the luminance components and chrominance components for 8 horizontal pixels by 8 vertical pixels that it has been storing to the blend unit 29.

1.4.1 Configuration of the Luminance Address Encoder 61 in the Memory Access Unit 11

Figure 11A:
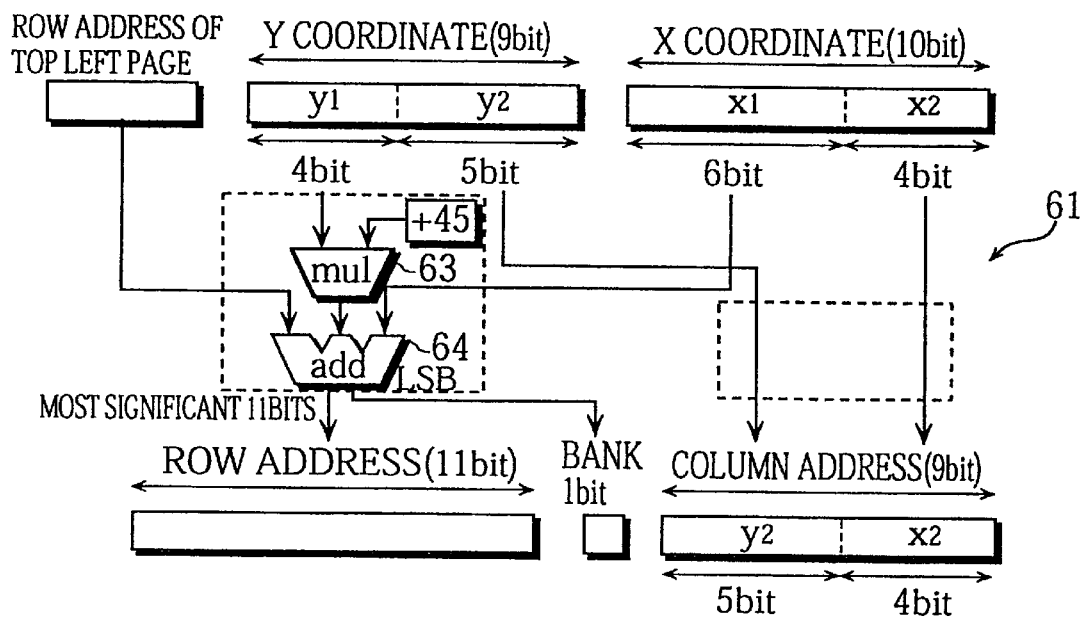
FIG. 11A shows the configuration of the luminance address encoder 61.
Figure 11B:
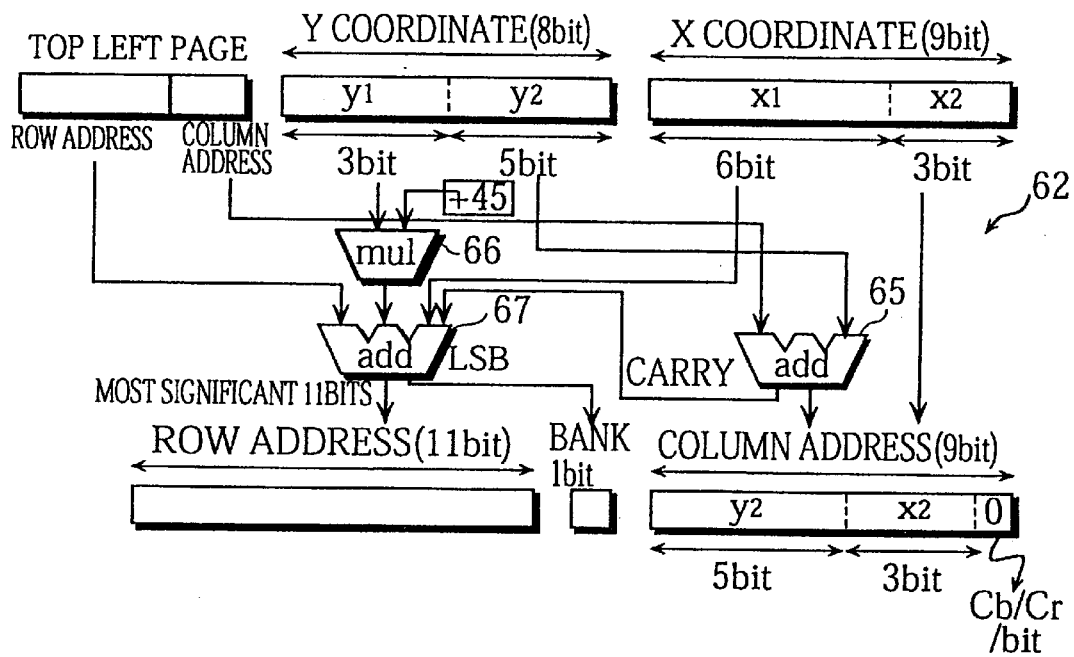
FIG. 11B shows the configuration of the chrominance address encoder 62.

The following is an explanation of the configuration of the luminance address encoder 61 and the chrominance address encoder 62 with reference to FIGS. 11A and 11B.

As shown in FIG. 11A, the luminance address encoder 61 generates a column address by aligning the lower-order 5 bits in the 9-bit Y coordinate and the lower-order 4 bits in the 10-bit X coordinate.

The column address is generated in this way so that the lower-order 4 bits of the X coordinate indicate the number of a column counted from the left side of the luminance block, while the lower-order 5 bits of the Y coordinate indicate the number of a row counted from the top of the luminance block.

The luminance address encoder 61 has a multiplier 63 and an adder 64. The multiplier 63 multiplies the value represented by the upper-order 4 bits out of the 9-bit Y coordinate by the value "45" and the adder 64 adds the multiplication result of the multiplier 63, the row address of the page storing the pixel of the top left vertex of the present image, and the upper-order 6 bits of the X coordinate. The upper-order 11 bits of the 12-bit addition result are then outputted as the row address. On the other hand, the least significant bit in the 12-bit addition result is outputted as the bank address for switching between bank 0 and bank 1. Here, the reason the upper-order 4 bits of the Y coordinate are multiplied by 45 is that 45 luminance blocks are positioned between a given luminance block and the luminance block positioned directly below the given luminance block.

1.4.2. Configuration of the Chrominance Address Encoder 62 in the Memory Access Unit 11

As shown in FIG. 11B, the chrominance address encoder 62 sets the least significant bit in the column address according whether the chrominance component is a blue chrominance component or a red chrominance component, and generates the column address using the lower-order 3 bits of the X coordinate as the first to third bits in the column address.

The chrominance address encoder 62 has an adder 65 and a multiplier 66. The adder 65 adds the lower 5 bits of the 8 bits which compose the Y coordinate to the entry column address of the page and, generates the upper-order five bits of the column address as the addition result.

The reason the column address is generated in this way is that the lower-order 3 bits of the X coordinate express a bit position counted from the left side of the chrominance block, while the lower-order 5 bits of the Y coordinate indicate a bit position counted from the top of he chrominance block. The multiplier 66 multiplies the upper-order 3 bits of the 8 bits in the Y coordinate by the value 45, and the adder 67 adds the multiplication result of the multiplier 66, the row address of the page where the chrominance block at the top left vertex of the present image is stored, the upper-order 6 bits of the X coordinate, and the carry of the addition of the adder 65 (when one has occurred). The least significant bit in the addition result of the adder 67 is outputted as the bank address for switching between bank 0 and bank 1, and the 11 bits of the addition result without this least significant bit are outputted as the row address.

1.4.3 Potential for Multiple Page Access by the Memory Access Unit 11

Once the coordinates of the top left vertex and the number of pixels (m,n) have been determined by the compensation control unit 10, the memory access unit 11 accesses the SDRAM 31 to read the Y01 block that is composed of (m,n) pixels and is located with its top left vertex at the coordinates (X,Y).

Special attention should be paid here to the coordinates at which the top left vertex, the bottom left vertex, the top right vertex, and the bottom right vertex are positioned. This is to say, if the four vertices of the Y01 block are completely enclosed within any of the blocks composed of 16 horizontal pixels by 32 vertical pixels shown by the shading in FIG.

Figure 15A:
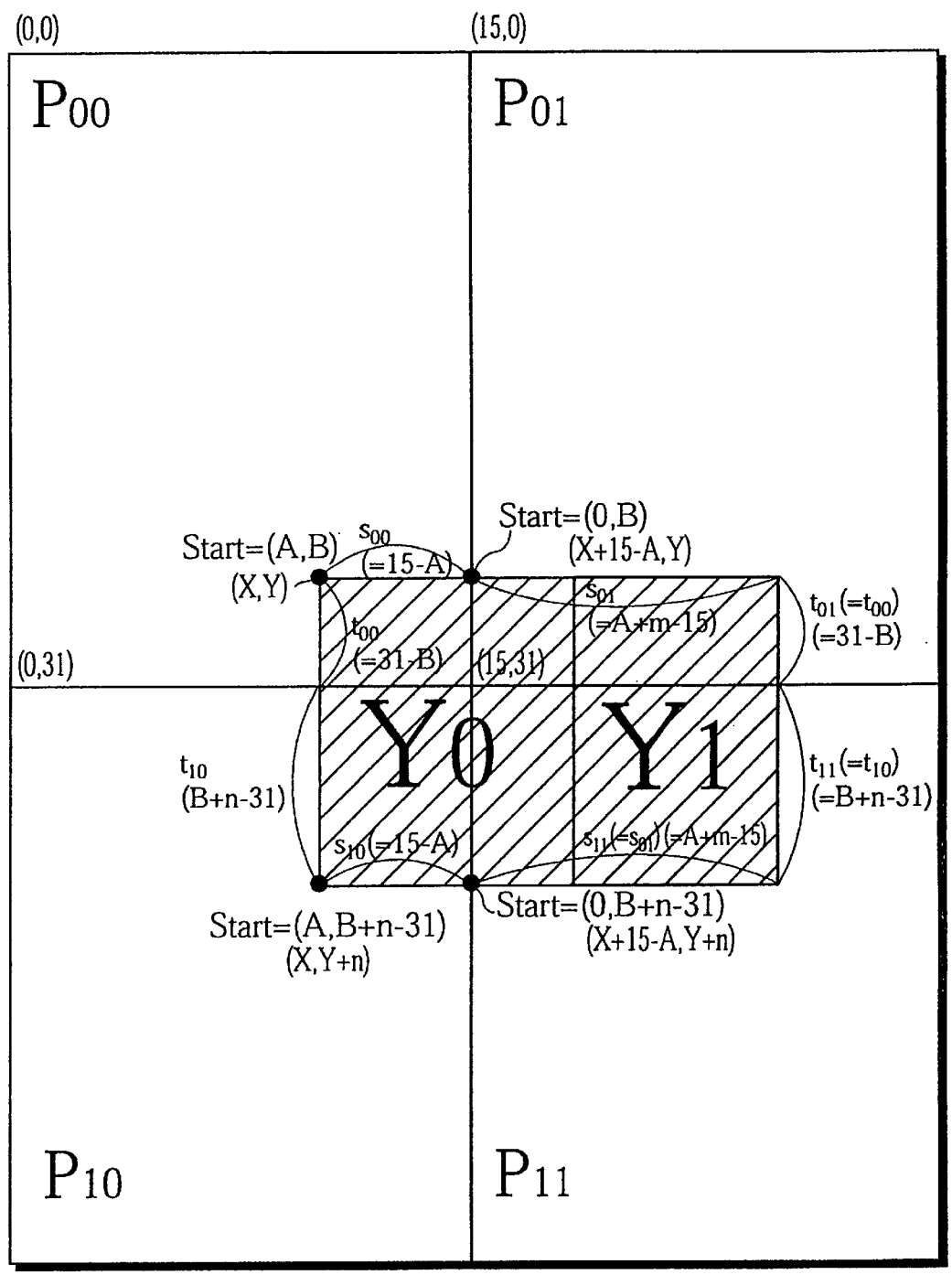
FIG. 15A shows an example of when the reference picture overlaps the horizontal 16 components by vertical 32 components stored on each of the pages from the top left page P00 to the bottom right page P11.

8A, it will only be necessary to access the page storing that block in question, while if two or more of the four vertices of the Y01 block are located in two or more blocks, it will be necessary to read each page which positionally coincides with the Y01 block. FIG. 15A shows an example where the top left vertex, the bottom left vertex, the top right vertex, and the bottom right vertex of the Y01 block are positioned on different pages which are each composed of 16 horizontal pixels by 32 vertical pixels. The two lines that intersect in the center of FIG. 15A are the boundary lines between these blocks composed of 16 horizontal pixels by 32 vertical pixels. Since each block of 16 horizontal pixels by 32 vertical pixels is stored on a different page, these lines are called "page boundaries".

Of the pages demarcated by these two page boundaries, the page which stores the top left block of 16 horizontal pixels by 32 vertical pixels is called the top-left page P00, the page which stores the bottom left block of 16 horizontal pixels by 32 vertical pixels is called the bottom-left page P10, the page which stores the top right block of 16 horizontal pixels by 32 vertical pixels is called the top-right page P01, and the page which stores the bottom-right block of 16 horizontal pixels by 32 vertical pixels is called the bottom-right page P11. The shaded Y01 block positionally coincides with the intersection of these two page boundaries, and so has an overlapping part with each of the top left page P00, the bottom left page P10, top right page P01, and the bottom right page P11.

In this way, the Y01 block overlaps two or more pages, so that in order to read only the Y01 block, the memory access unit 11 calculates the row address and bank where the page is to be accessed, as well as calculating the column address within that page from which the calculated number of luminance components should be read using a burst read.

1.4.4 Details for the SDRAM Access Performed by the Memory Access Unit 11

Figure 16:
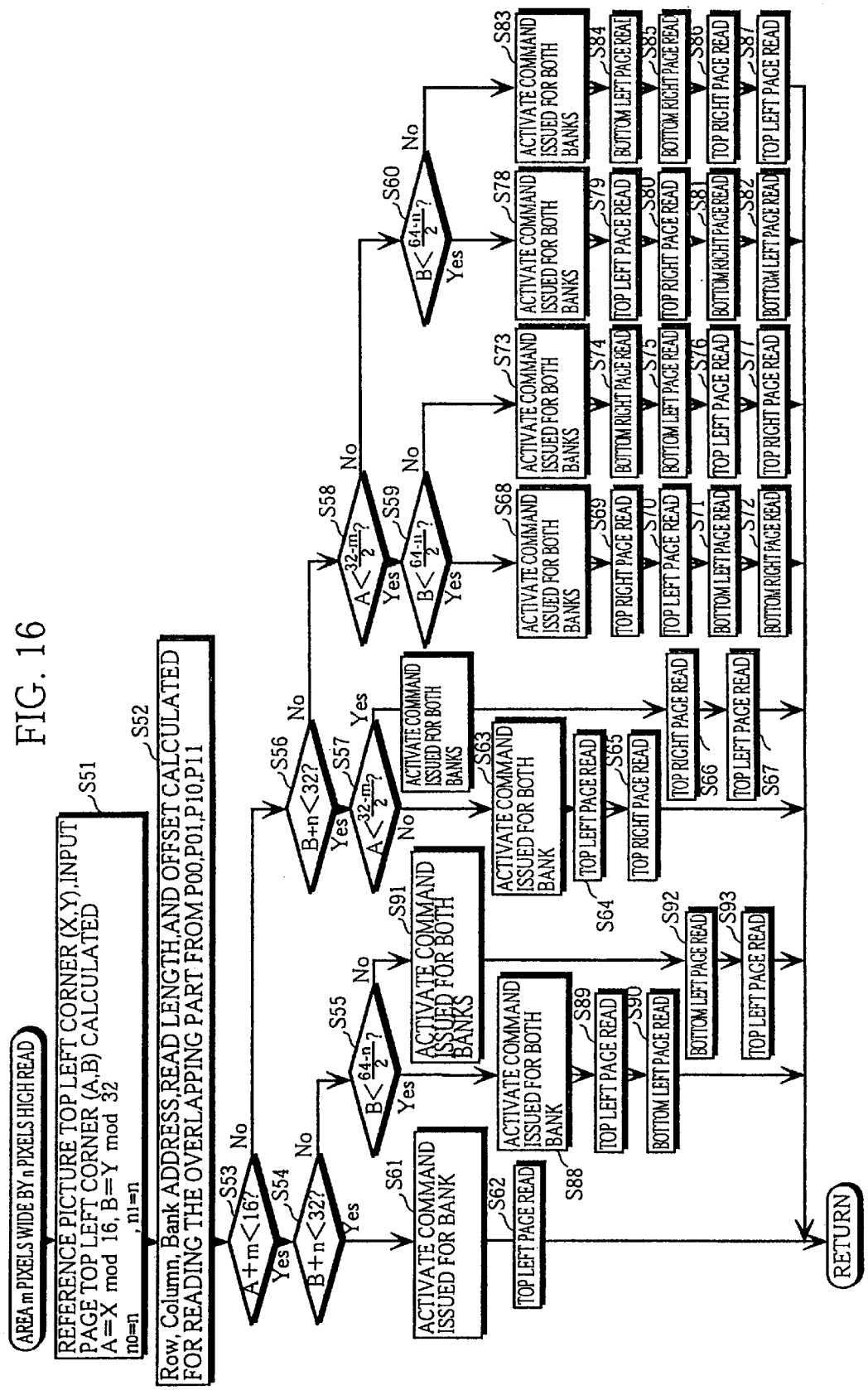
FIG. 16 is a flowchart showing the read order determining process by the compensation control unit 10.
Figure 17:
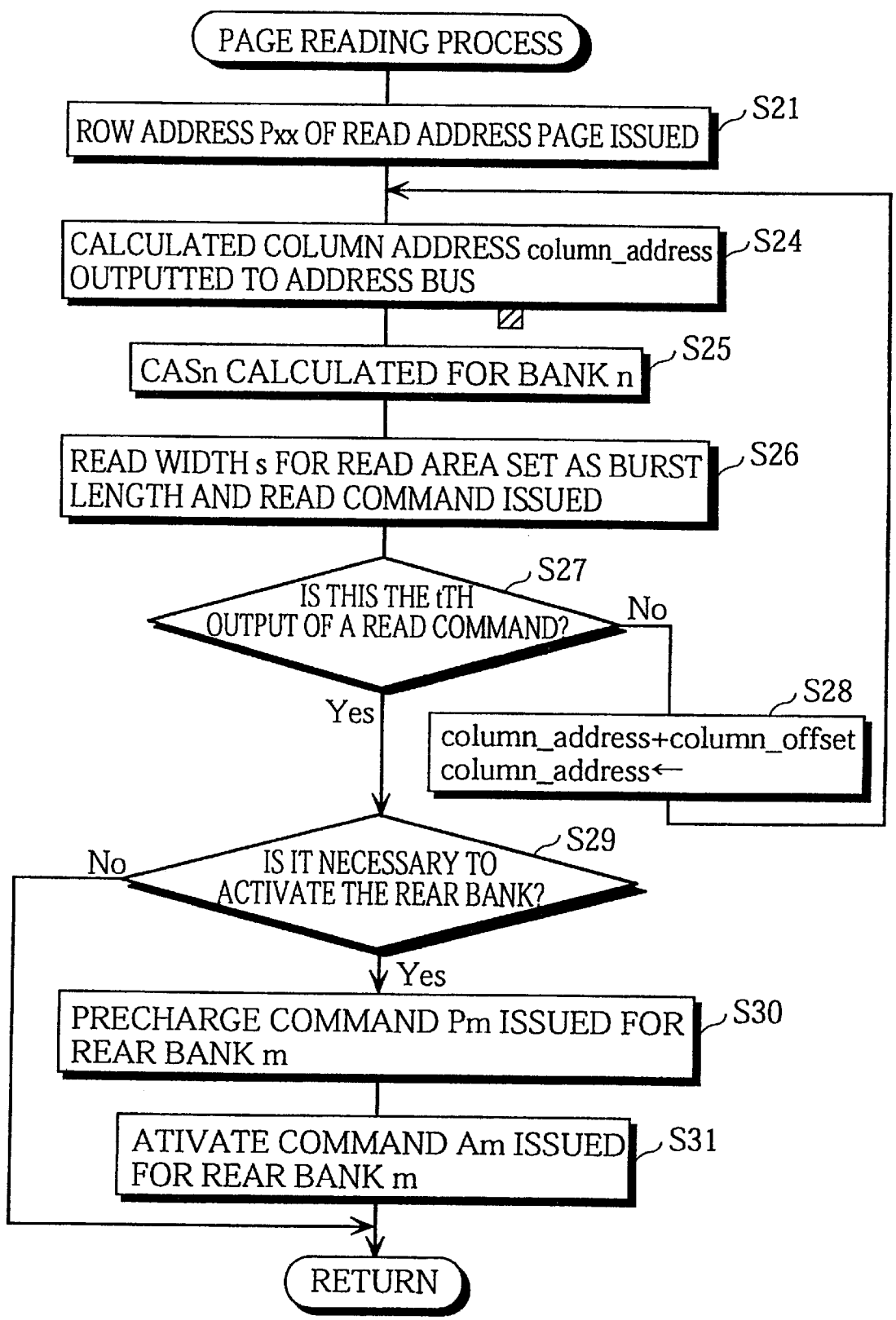
FIG. 17 is a flowchart showing the procedure for the page reading process by the compensation control unit 10.
Figure 18:
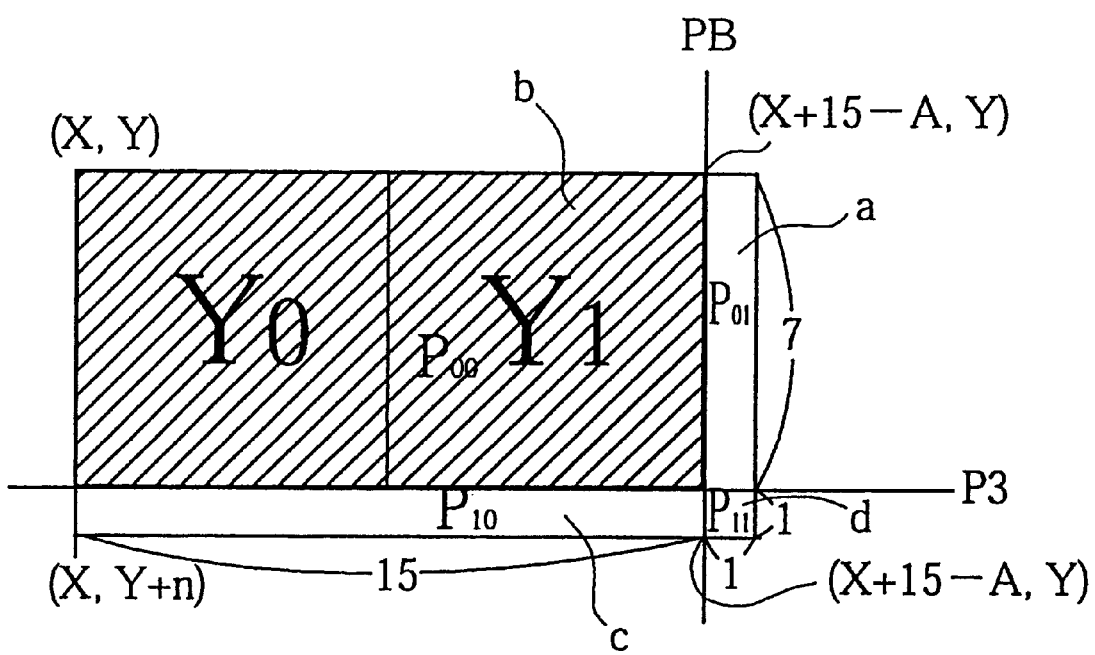
FIG. 18 shows an example of when the reference picture overlaps the horizontal 16 components by vertical 32 components stored on each of the pages from the top left page P00 to the bottom right page P11.

The memory access unit 11 is equipped with a sequencer or a machine language program for realizing the processing in the flowcharts shown in FIGS. 16 to 18. The following is an explanation of the processing of the memory access unit 11 with reference to these flowcharts. The reading of the reference picture is performed for the Y01 block, the Y23 block, and the CbCr block making a total of three separate reads, or for the Y02 block, the Y13 block, and the CbCr block also making a total of three separate reads. In the following explanation, the process for reading the Y01 block will be explained in detail although this is fundamentally the same as the remaining two reads and should be understood as also relating to them.

When the top left vertex (X,Y) of the Y01 block has been calculated by the compensation control unit 10 in step S51, the memory access unit 11 calculates the relative coordinates (A,B) of the top left vertex of the Y01 block within the block of 16 horizontal pixels by 32 vertical pixels stored in the top-left page P00.

Here, the relative coordinates (A,B) are calculated as follows.

$$A = X \bmod 16 \ldots \quad (1)$$

$$B = Y \bmod 32 \ldots \quad (2)$$

Here, "mod" represents the "remainder"

Once the relative coordinates have been calculated, in step S52 the row address, column address, and bank address for reading the overlapping part of block Y01 with pages P00, P01, P10, and P11 are calculated by the luminance address encoder 61. The starting coordinates for reading the overlapping part from the top left page P00 are set at (X,Y), and these coordinates are converted into a row address and column address by the luminance address encoder 61.

1.4.5.1 Setting of the Read Address, Read Length, and Offset for the Top Left Page P00

Figure 15B:
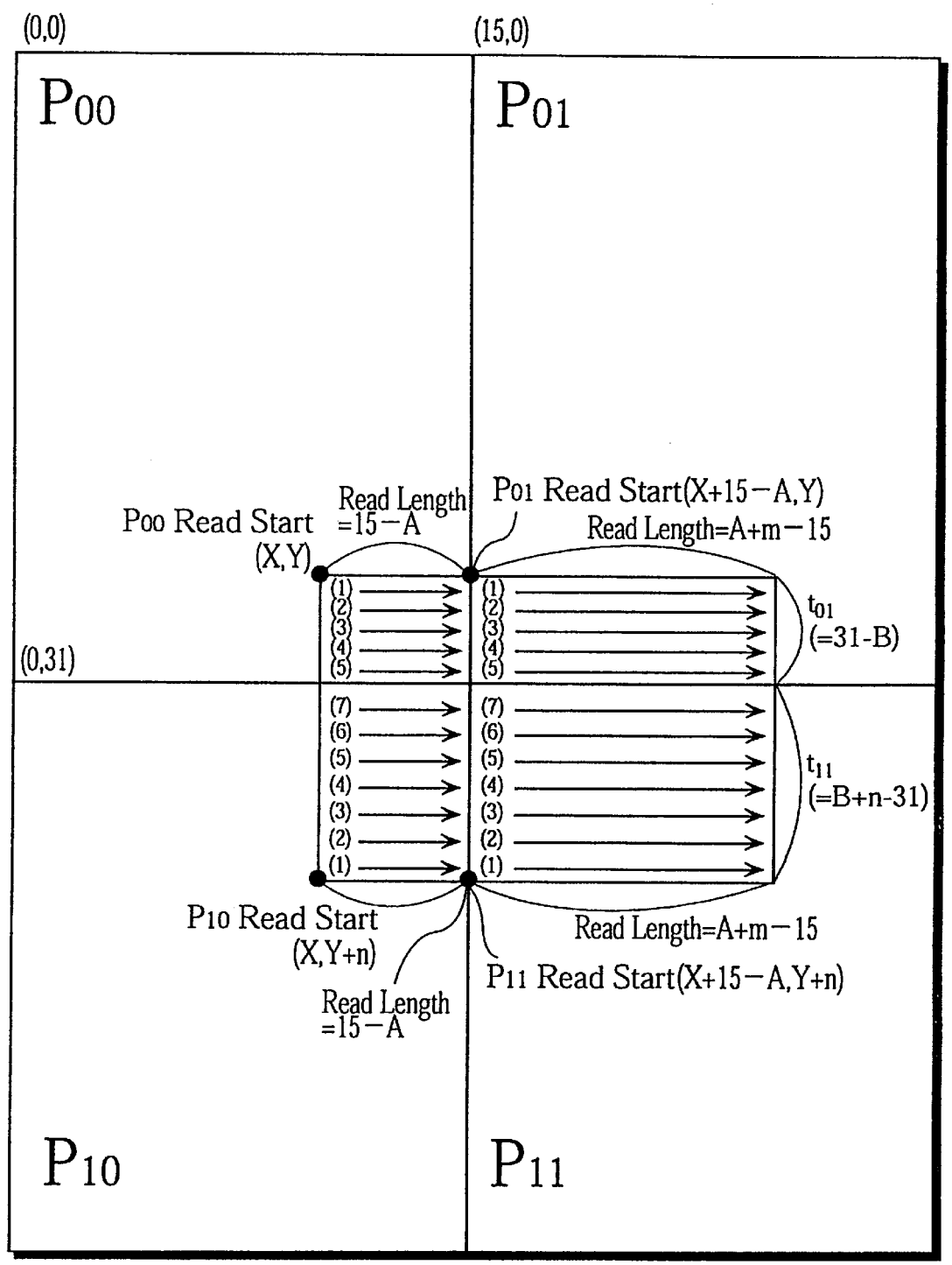
FIG. 15B shows how the luminance components and chrominance components are read when the reference picture overlaps the horizontal 16 components by vertical 32 components stored on each of the pages from the top left page P00 to the bottom right page P11.

FIG. 15B shows how the Y01 block should be read from the top left page P00, the bottom left page P10, top right page P01, and the bottom right page P11. The four black circles in this drawing labeled "Read Start" show the read starting coordinates for each page, while the arrows (1), (2), (3), (4), (5) etc. show how the luminance components and chrominance components are read.

The luminance address encoder 61 encodes the lower-order 4 bits of the X coordinate for the top left vertex of the Y01 block in the top left page P00 as the lower-order 4 bits of the column address and encodes the lower-order 5 bits of the Y coordinate as the higher-order 5 bits of the column address to generate the column address. Meanwhile, the higher-order 6 bits of the X coordinate are added to the multiplication result of the multiplier 63 to generate the bank address and row address.

The read length s00 for the top left page P00 is calculated so that the part of the Y01 block that overlaps the top left page P00 in FIG. 15A can be read, and is found as a distance from the relative coordinates (A,B) of the top left vertex of the Y01 block to the relative coordinates (15,B), so that the reading can be performed using burst reads of 15−A pixels.

In order to read the overlapping part of the Y01 block from the top left page P00, 15−A addresses are read in accordance with the read length of 15−A pixels, and after this read has been performed, the read position has to be moved down by one row.

In more detail, once 15−A pixels have been read from the relative coordinate (A,B) at the top left vertex of the Y01 block to the relative coordinate (15,B) as shown by the arrow (1), 15−A pixels need to be read from the relative coordinate (A,B+1) to the relative coordinate (15,B+1) as shown by the arrow (2). Following this, 15−A pixels need to be read from the relative coordinate (A,B+2) to the relative coordinate (15,B+2) as shown by the arrow (3).

From FIG. 11A, it can be seen that the lower-order 5 bits of the Y coordinate are encoded as the higher-order 5 bits of the column address, so that when the Y coordinate of the read address coordinate is increased by one, the column address is increased by 15 bits at a time.

This is the offset that is used to move the read position to the next row, so that read offset used for the top left page P00 is set at "+15".

1.4.5.2. Setting of the Read Address. Read Length, and Offset for the Top Right Page P01

In order to read the pixels in the overlapping part of the Y01 block from the top right page P01, the starting coordinates are set at (X+15−A, Y) as shown in FIG. 15B, and the luminance address encoder 61 converts these coordinates to a row address and column address.

The luminance address encoder 61 encodes the lower-order 4 bits of the coordinate value (X+15−A) as the lower-order 4 bits of the column address and encodes the lower-order 5 bits of the Y coordinate as the higher-order 5 bits of the column address to generate the column address. Meanwhile, the higher-order 6 bits of this coordinate value (X+15−A) are added to the multiplication result of the multiplier 63 to generate the bank address and row address.

The read length s01 for the top right page P01 is calculated so that the part of the Y01 block that overlaps the top right page P01 in FIG. 15B can be read, and is found as the A+m−15 pixels from the relative coordinates (0,B) to the (A+m−15,B) point on the top right page P01, so that the reading can be performed using a burst read of A+m−15 pixels.

In order to read the overlapping part of the Y01 block from the top right page P01, (A+m−15) addresses are read in accordance with the read length of (A+m−15) pixels, and after this read has been performed, the read position has to be moved down by one row.

In more detail, once (A+m−15) pixels have been read from the relative coordinate (0,B) at the top left vertex of the Y01 block to the relative coordinate (A+m−15,B) as shown by the arrow (1), (A+m−15) pixels need to be read from the relative coordinate (0,B+1) to the relative coordinate (A+m−15,B+1), as shown by the arrow (2). Following this, (A+m−15) pixels need to be read from the relative coordinate (0,B+2) to the relative coordinate (A+m−15,B+2) as shown by the arrow (3).

From FIG. 11A, it can be seen that the lower-order 5 bits of the Y coordinate are encoded as the higher-order 5 bits of the column address, so that when the Y coordinate of the read address coordinate is increased by one, the column address is increased by 15 bits at a time.

This is the offset that is used to move the read position to the next row, so that read offset used for the top right page P01 is set at "+15".

1.4.5.3 Setting of the Read Address, Read Length, and Offset for the Bottom Left Page P10

In order to read the pixels in the overlapping part of the Y01 block from the bottom left page P10, the starting coordinates are set at (X,Y+n), and the luminance address encoder 61 converts these coordinates to a row address and column address.

The luminance address encoder 61 encodes the lower-order 4 bits of the coordinate value X as the lower-order 4 bits of the column address and encodes the lower-order 5 bits of the Y+n coordinate as the higher-order 5 bits of the column address to generate the column address. Meanwhile, the higher-order 6 bits of this coordinate value X are added to the multiplication result of the multiplier 63 to generate the bank address and row address.

The read length s10 for the bottom left page P10 is calculated so that the part of the Y01 block that overlaps the bottom left page P10 in FIG. 15B can be read, and is found as the 15−A pixels from the relative coordinates (A,B+n−31) to the (15,B+n−31) point on the bottom left page P10, so that the reading can be performed using a burst read of 15−A pixels.

In order to read the overlapping part of the Y01 block from the bottom left page P10, (15−A) addresses are read in accordance with the read length of (15−A) pixels, and after this read has been performed, the read position has to be moved down by one row.

In more detail, once (15−A) pixels have been read from the relative coordinate (A,B+n−31) at the top left vertex of the Y01 block to the relative coordinate (15,B+n−31) as shown by the arrow (1), (15−A) pixels need to be read from the relative coordinate (A,B+n−30) to the relative coordinate (15,B+n−30) as shown by the arrow (2). Following this, (15−A) pixels need to be read from the relative coordinate (A,B+n−29) to the relative coordinate (15,B+n−29) as shown by the arrow (3).

From FIG. 11A, it can be seen that the lower-order 5 bits of the Y coordinate are encoded as the higher-order 5 bits of the column address, so that when the Y coordinate of the read address coordinate is decreased by one, the column address is decreased by 15 bits at a time.

This is the offset that is used to move the read position to the next row, so that read offset used for the bottom left page P10 is set at "−15".

1.4.5.4 Setting of the Read Address, Read Length, and Offset for the Bottom Right Page P11

In order to read the pixels in the overlapping part of the Y01 block from the bottom right page P11, the starting coordinates are set at (X+15−A, Y+n), and the luminance address encoder 61 converts these coordinates to a row address and column address.

The luminance address encoder 61 encodes the lower-order 4 bits of the coordinate value (X+15−A) as the lower-order 4 bits of the column address and encodes the lower-order 5 bits of the (Y+n) coordinate as the higher-order 5 bits of the column address to generate the column address. Meanwhile, the higher-order 6 bits of this coordinate value (X+15−A) are added to the multiplication result of the multiplier 63 to generate the bank address and row address.

The read length s11 for the bottom right page P11 is calculated so that the part of the Y01 block that overlaps the bottom right page P11 in FIG. 15B can be read, and is found as the (A+m−15) pixels from the relative coordinates (0,B+n−31) to the (A+m−15,B+n−31) point on the bottom right page P11, so that the reading can be performed using a burst read of A+m−15 pixels.

In order to read the overlapping part of the Y01 block from the bottom right page P11, (A+m−15) addresses are read in accordance with the read length of (A+m−15) pixels, and after this read has been performed, the read position has to be moved down by one row.

In more detail, once (A+m−15) pixels have been read from the relative coordinate (0,B+n−31) at the top left vertex of the Y01 block to the relative coordinate (A+m−15,B+n−31) as shown by the arrow (1), (A+m−15) pixels need to be read from the relative coordinate (0,B+n−30) to the relative coordinate (A+m−15,B+n−30) as shown by the arrow (2). Following this, (A+m−15) pixels need to be read from the relative coordinate (0,B+n−29) to the relative coordinate (A+m−15,B+n−29) as shown by the arrow (3).

From FIG. 11A, it can be seen that the lower-order 5 bits of the Y coordinate are encoded as the higher-order 5 bits of the column address, so that when the Y coordinate of the read address coordinate is decreased by one, the column address is decreased by 15 bits at a time.

This is the offset that is used to move the read position to the next row, so that read offset used for the bottom right page P11 is set at "−15".

1.4.6 Read Performed from the Top Left Page P00

Once the relative coordinates have been calculated, in step S53 it is judged whether the condition "relative coordinate A+width of the read area m<16". Here, the expression "relative coordinate A+width of the read area m" expresses the relative X coordinate of top right vertex of the Y01 block, so that when the condition "relative coordinate A+width of the read area m<16" is satisfied, this shows that the relative X coordinate of top right vertex of the Y01 block is not located over in the top right page P01.

If the result "Yes" is given in step S53, it is judged in step S54 whether the condition "relative coordinate B+height of the read area n<32". Here, the expression "relative coordinate B+height of the read area n" expresses the relative Y coordinate of bottom left vertex of the Y01 block, so that when the condition "relative coordinate B+height of the read area n<16" is satisfied, this shows the relative Y coordinate of bottom left vertex of the Y01 block is not located over in the bottom left page P10.

Figure 20A:
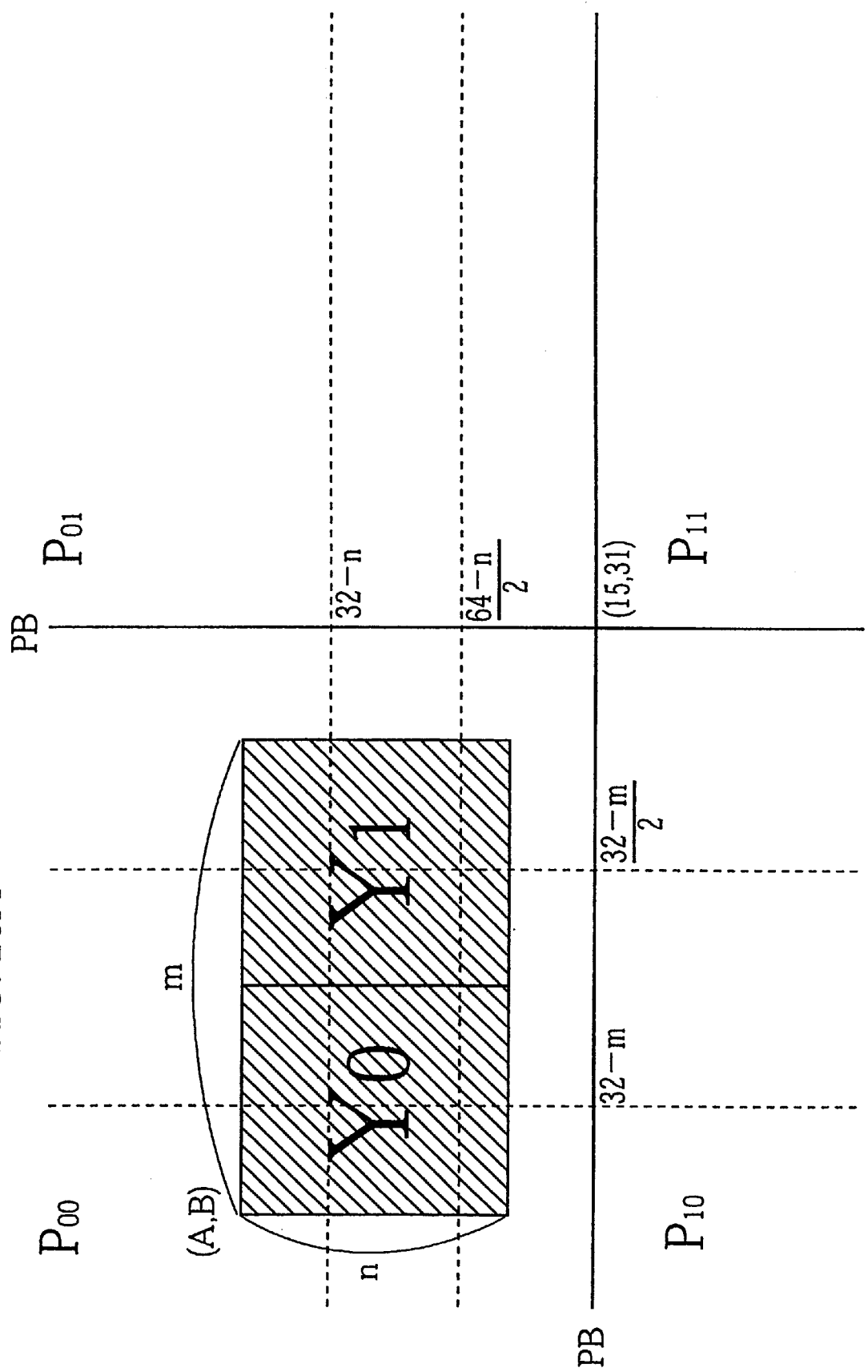

Since the Y01 block does not extend into the top right page P01 or the bottom left page P10, the read area composed of the upper half of the Y01 block can be seen as being completely enclosed within the top left page P00, as shown in FIG. 20A.

Once it is understood that the read area is completely enclosed within the top left page P00, in step S61 a precharge command and an activate command for the bank holding the top left page P00 can be issued. Once these commands have been issued, the read for the top left page P00 is commenced in step S62.

FIG. 17 is a flowchart which shows the procedure for the page read processing executed by the compensation control unit 10.

In step S21, the row address of the page to be read that has been calculated by the luminance address encoder 61 is outputted to the address pins of the SDRAM 31. After this output, in step S24 the calculated column address is outputted to the address pins and in step S25 the CAS is outputted for the bank address calculated by the luminance address encoder 61. In step S26, the read length is set in the word length register 59 and a read command is issued.

In step S27, it is judged whether the present read command is the tth output of such command, and if so in step S28 the offset that has been determined for the present page is added to the column address so as to shift the column address to the next row in the overlapping part.

After the column address has been shifted to the next row, the processing returns to step S24.

In step S24, the column address is outputted to the address pins and in step S25 the CAS is outputted for the memory array of the bank address calculated by the luminance address encoder 61. In step S26, the read length is set in the word length register 59 and a read command is issued.

By repeatedly issuing read commands in the loop process described above, the determined read length s (here, s00 pixels) of luminance components will be read from the top left page P00 in each read. Once this process has been repeated t times, an overlapping part whose size is a total of s*t pixels will have been read.

Once the read loop has been repeated t times, the judgement "Yes" will be made in step S27, and the processing will advance to step S29. In step S29 it is judged whether it is necessary to activate the rear bank.

If activation of the rear bank is judged necessary in step S29, in step S30 a precharge command is issued for the rear bank and in step S31 an activate command is issued for the rear bank, before the processing returns to the flowchart shown in FIG. 16.

1.4.7 Read Process Performed when the Y01 Block Overlaps the Top Left Page P00 and the Bottom Left Page P10

When the judgement "Yes" is given in step S53 of the flowchart in FIG. 16 and the judgement "No" is given in step S54, this shows that the bottom left and bottom right vertices of the Y01 block are located over in the bottom left page P10. When the Y01 block extends into another page, in step S55 it is judged whether the condition "relative coordinate B<(64−n)/2" is satisfied. Here, FIG. 20B shows an example of the Y01 block for the case when relative coordinate B<(64−n)/2, while FIG. 20C shows an example of the Y01 block for the case when relative coordinate B>(64−n)/2.

Figure 20C:
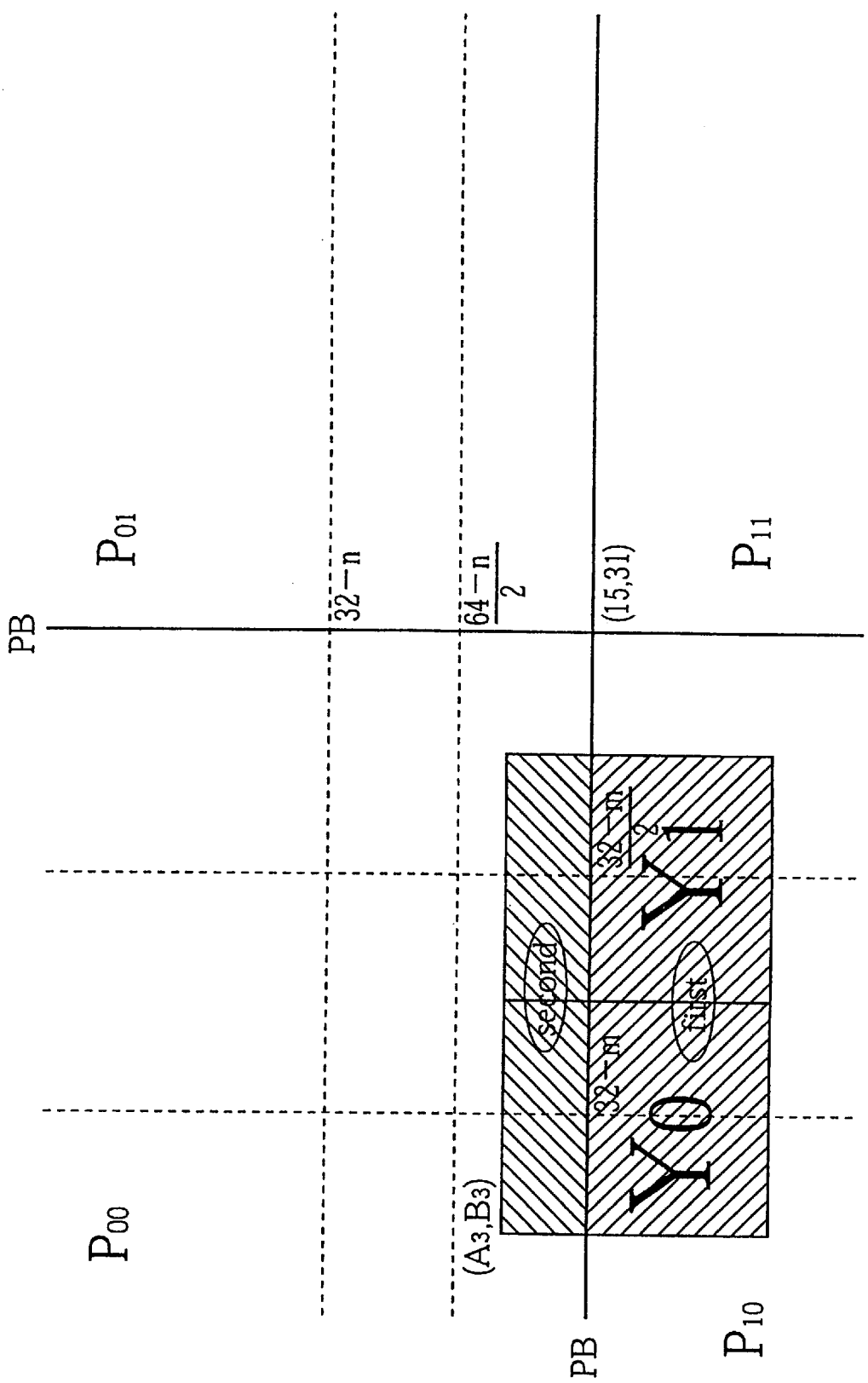

By comparing FIG. 20B and FIG. 20C, it can be seen that when the relative coordinate B>(64−n)/2, the height of the overlapping part of the Y01 for the bottom left page P10 is greater than that of the overlapping part for the top left page P00. Conversely, when the relative coordinate B<(64−n)/2, the height of the overlapping part of the Y01 for the top left, page P00 is greater than that of the overlapping part for the bottom left page P10.

By judging which of the overlapping parts has the greater height, the read order can be set so that the overlapping part with the greater height can be read first, with the shorter then being read second.

When it is judged that the relative coordinate B is greater than the value "(64−n)/2", in step S88 activate commands are issued for both bank 0 and bank 1. Following this, in step S89 a read is first performed for the top left page P00, with a read for the bottom left page P10 then being performed in step S90.

Conversely, when it is judged that the relative coordinate B is less than the value "(64−n)/2", in step S91 activate commands are issued for both bank 0 and bank 1. Following this, in step S92 a read is first performed for the bottom left page P10, with a read for the top left page P00 then being performed in step S93.

1.4.8 Read Process Performed when the Y01 Block Overlaps the Top Left Page P00 and the Top Right Page P10

When the judgement "No" is given in step S53, this shows that the top right vertex of the Y01 block is located over in the top right page P01. When the Y01 block extends into another page in this way, in step S56 it is judged whether the condition "relative coordinate B+vertical extent n of read area<32" is satisfied. Here, the expression "relative coordinate B+vertical extent n of read area" represents the Y coordinate of the bottom left vertex of the Y01 block, so that when the condition "relative coordinate B+vertical extent n of read area<32" is satisfied, this shows that the bottom left vertex of the Y01 block is not located over in the bottom left page P10.

When the judgement "Yes" is given in step S56, the processing advances to step S57. Here, the reason the judgement "No" was given in step S53 and the judgement "Yes" was given in step S56 is that the Y01 block overlaps the top left page P00 and the top right page P01, but does not overlap the bottom left page P10 or the bottom right page P11.

Once it is clearly established that the Y01 block overlaps the top left page P00 and the top right page P01, the processing advances to step S57 where the compensation control unit 10 judges which of these pages has the larger overlapping area with the Y01 block.

In step S57, it is judged whether the relative coordinate A is greater than the value "(32−m)/2".

Figure 20D:
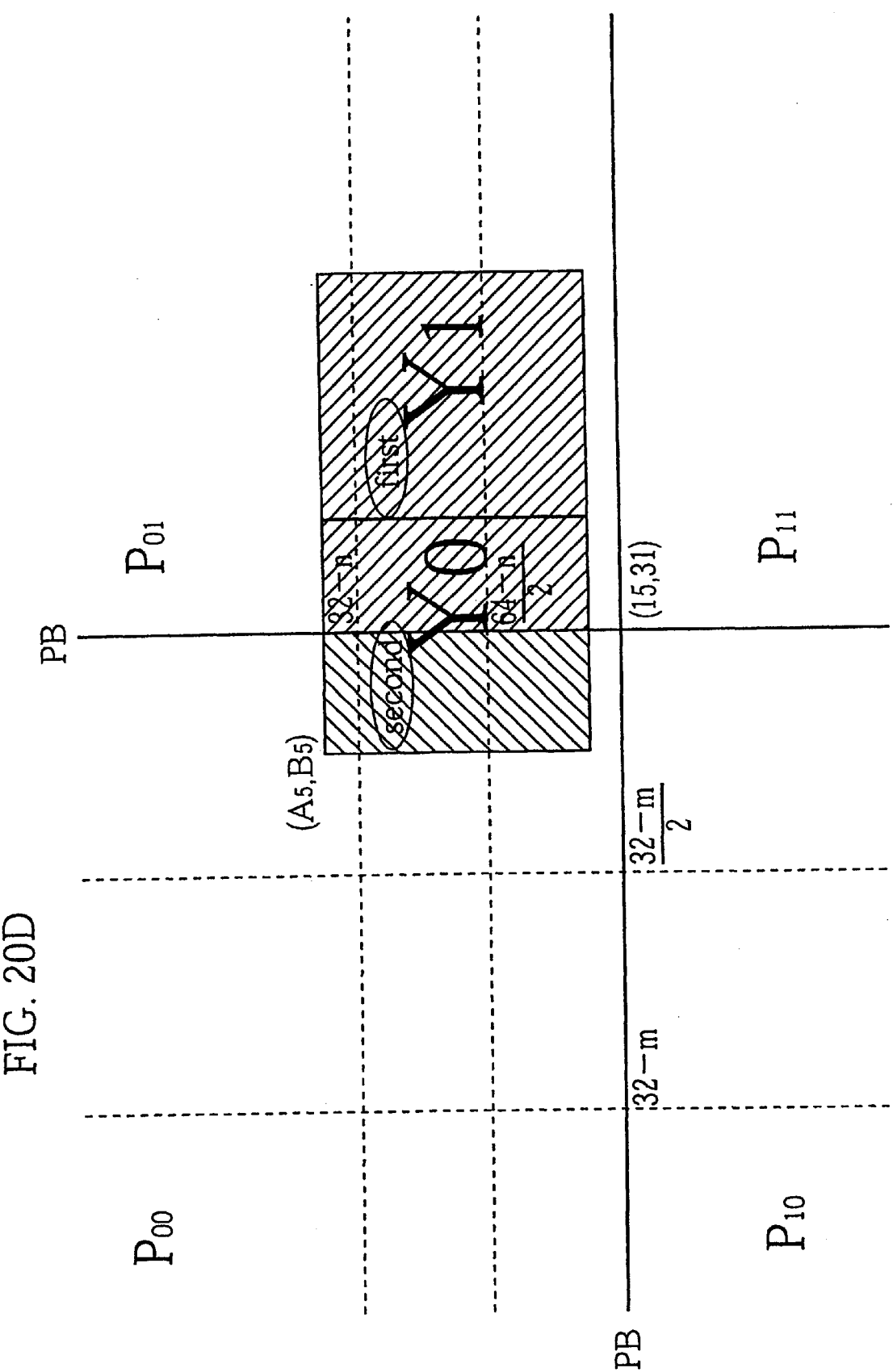
Figure 20E:
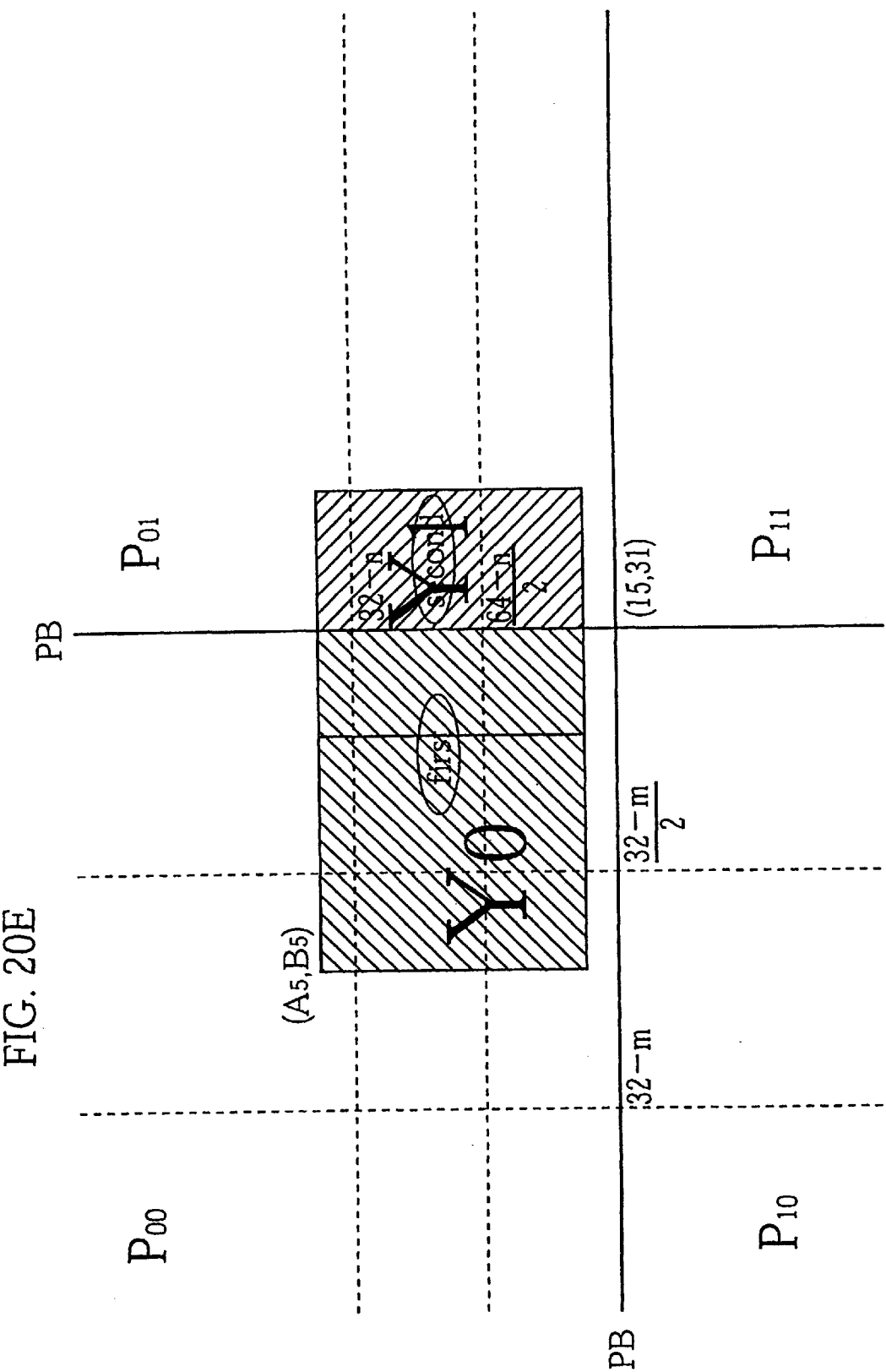

FIG. 20D shows an example of the Y01 block for the case when the relative coordinate A is greater than the value "(32−m)/2", while FIG. 20E shows an example of the Y01 block for the case when the relative coordinate A is less than the value "(32−m)/2".

By comparing FIG. 20D and FIG. 20E, it can be seen that when the relative coordinate A is greater than the value "(32−m)/2", the width of the overlapping part of the Y01 for the top right page P01 is greater than that of the overlapping part for the top left page P00. Conversely, when the relative coordinate A is less than the value "(32−m)/2", the width of the overlapping part of the Y01 for the top left page P00 is greater than that of the overlapping part for the top right page P01.

By judging which of the overlapping parts has the greater width, the read order can be set so that the overlapping part with the greater width can be read first, with the shorter then being read second.

When it is judged that the relative coordinate A is greater than the value "(32−m)/2", a read is first performed for the top right page P01, with a read for the top left page P00 then being performed second.

Conversely, when it is judged that the relative coordinate A is less than the value "(32−m)/2", a read is first performed for the top left page P00, with a read for the top right page P01 then being performed second.

1.4.9 Rationale behind the Read Order being Determined from the Widths of the Overlapping Parts The reason that the page with the wider overlapping part is read first is so that the other bank can be precharged and activated while the read is being performed. This is to say, if all of the luminance components are read by the read process before the other bank has been precharged and activated, there will be no point in performing the precharging and activating in parallel.

When the read process is taken as being performed in parallel with the precharging and activating, it is preferable for a column address and a read command to be first issued for the page that has the larger overlapping part and, after receiving this command, for the SDRAM to complete the precharging and activating of the other bank while successively reading the luminance components. With this in mind, it is logical for the page with the larger overlapping part to be read first, with the page with the smaller overlapping part then being read second.

1.4.10 Read Process Performed when the Y01 Block Overlaps All Four Pages P00, P10, P01, and P11

When the condition "relative coordinate B+vertical extent n of read area<32" is not satisfied in step S56, the processing advances to step S58. As described before, the reason the judgement "No" is given in step S53 is that the Y01 block overlaps the top right page P01, and here the reason the judgement "No" is given in step S56 is that the Y01 block also overlaps the bottom left page P10 and the bottom right page P11.

When the judgement "No" is given in step S56, the processing advances to S58 where the relative coordinate A is compared with the value "(32−m)/2". As described before, when the relative coordinate A is wider than the value "(32−m)/2", this means that the overlapping part of the Y01 block with the top left page P00 is larger than the overlapping part with the top right page P01, so that when the judgement "Yes" is given in step S58, the relative coordinate B is compared with the value "(64n)/2". When the judgement "No" is given in step S58, in step S60 the relative coordinate B is compared with the value "(64−n)/2".

Figure 20F:
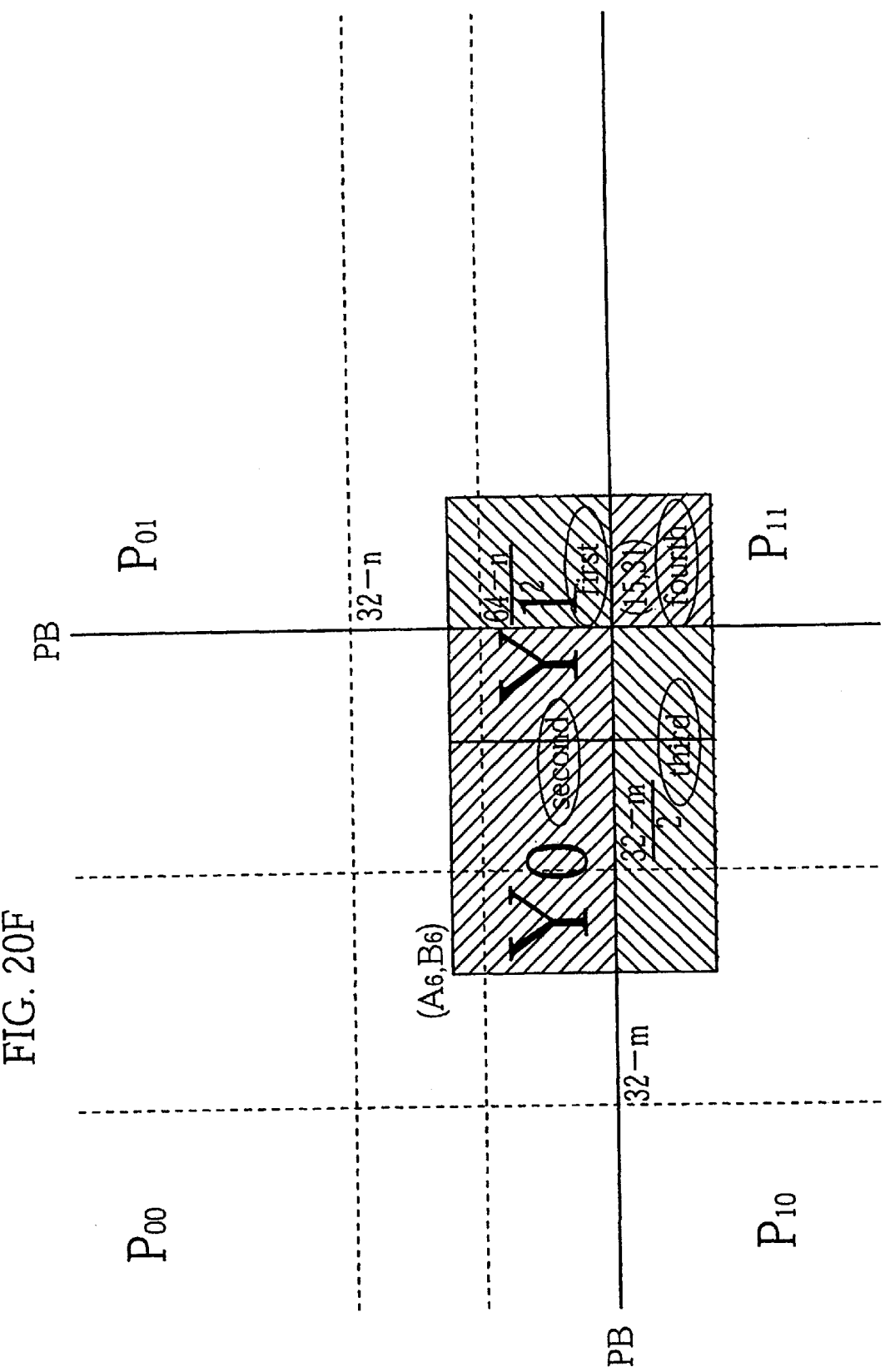
Figure 20G:
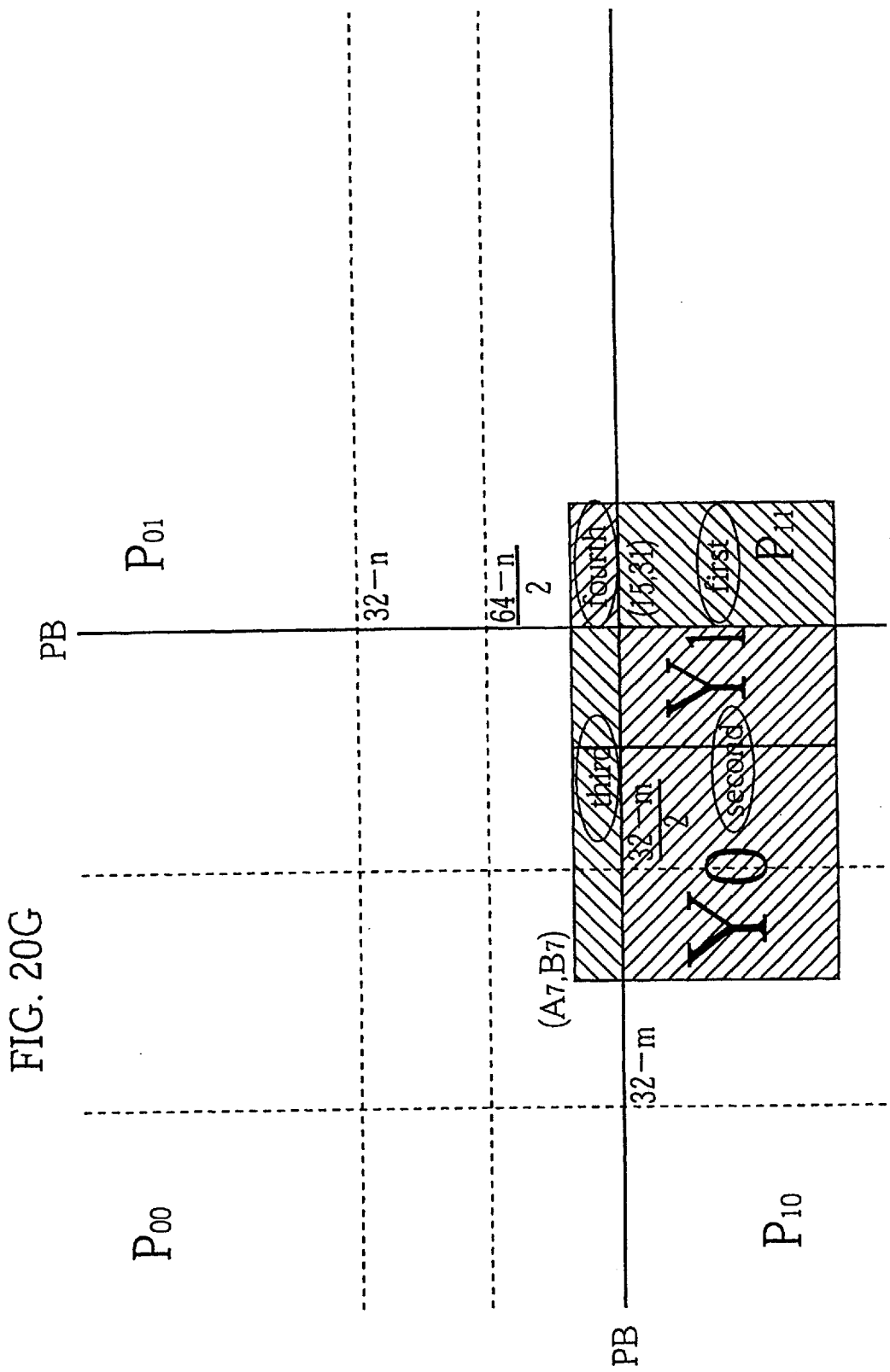

FIG. 20F shows an example of the Y01 block for the case when the relative coordinate A is less than the value "(32−m)/2" and the relative coordinate B is less than the value "(64−n)/2", while FIG. 20G shows an example of the Y01 block for the case when the relative coordinate A is less than the value "(32−m)/2" and the relative coordinate B is greater than the value "(64−n)/2".

By comparing FIG. 20F and FIG. 20G, it can be seen that when the relative coordinate B is greater than the value "(64−n)/2", the height of the overlapping part of the Y01 for the bottom left page P10 is greater than that of the overlapping part for the top left page P00. Conversely, when the relative coordinate B is less than the value "(64−n)/2", this shows that the height of the overlapping part of the Y01 block with the top left page P00 is greater than that of the overlapping part with the bottom left page P10.

By determining which pages have the greater height and width, the page having an overlapping part with the shorter width and the greater height can be set as the page to be read first, the page having an overlapping part with the greater width and the greater height can be set as the page to be read second, the page having an overlapping part with the greater width and the shorter height can be set as the page to be read third, and the page having an overlapping part with the shorter width and the shorter height can be set as the page to be read fourth.

1.4.11 Rationale Behind the Determination of the Read Order for the Pages from P00 to P11

Figure 19:
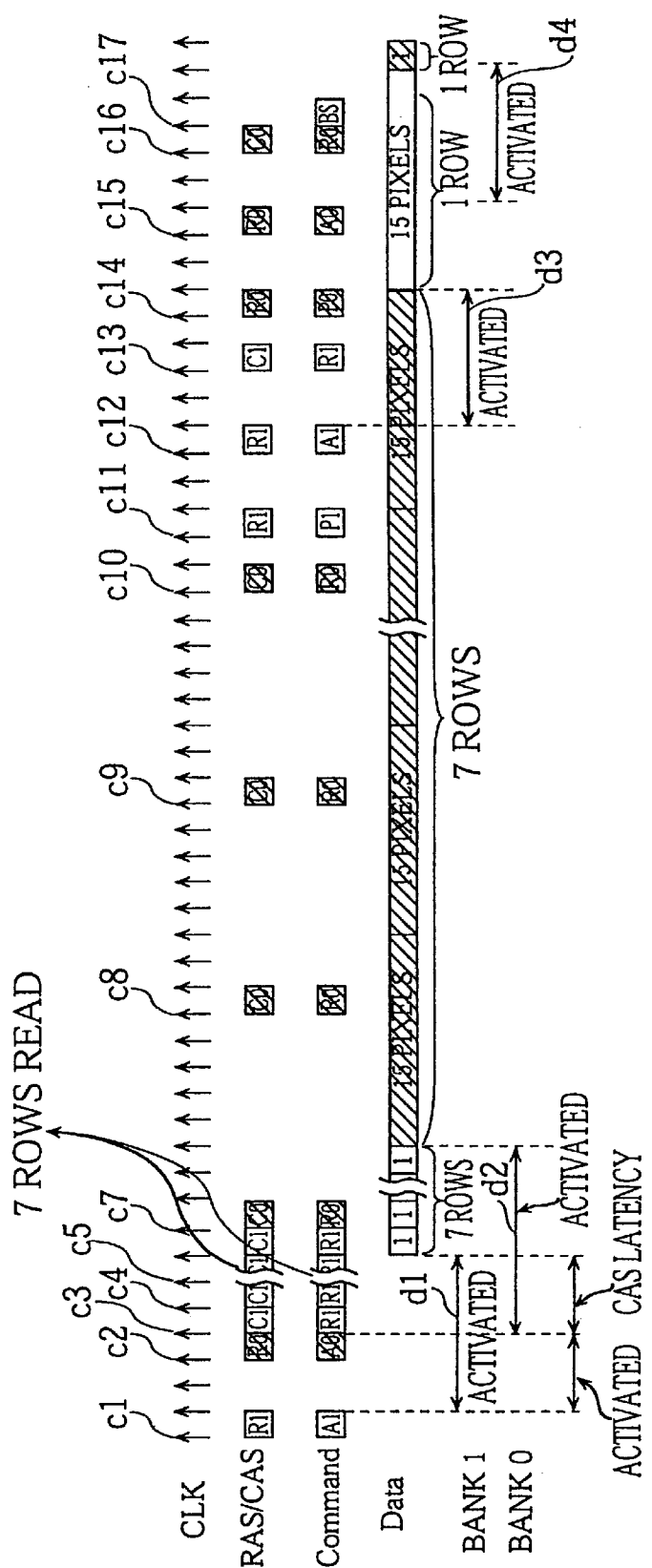
FIG. 19 is a timing chart for a page read by the compensation control unit 10.

The following is an explanation of the rationale behind the determination of the read order of pages P00 to P11, with reference to FIG. 19. In this example, the width and height of the overlapping part in each page is as shown in FIG. 18. The following is an explanation, with reference to the timing chart in FIG. 19, of the timing at which the memory access unit 11 issues the read commands, activate commands, and precharge commands when the Y01 block overlaps each page as shown in FIG. 18.

In FIG. 19, the "RAS/CAS" line shows the input of the row address and column address, with, as examples, "R0" showing the input of a row address for bank 0 and "C1" showing the input of a column address for bank 1.

The "Command" line in FIG. 19 shows the indication of operations to the SDRAM, and as examples, "A1" shows an activation ("A" representing "Activate) of bank 1, "R0" shows a read ("R" representing "Read") of bank 0, "P1" shows a precharging ("P1" representing "Precharge") of bank 1, and "BS" showing a termination of consecutive transfers ("BS" representing "Burst Stop").

The "Data" line in FIG. 19 shows the read content of the memory. It should be noted here that the shaded parts of FIG. 19 represent operations performed for bank 0, while the non-shaded parts are operations performed for bank 1.

In FIG. 19, activate commands are issued for the overlapping part a with the greatest height and the lowest width at timing c1 and c2.

As a characteristic of the SDRAM, after an activate command has been issued, it is not possible to issue a read command for the activated bank or an activate command for the other bank until a time equivalent to three clock pulses has passed. However, if bank 0 is activated after bank 1 has been activated but before a read has been performed for bank 1, a read is possible for bank 1 during the three clock pulses following the activation of bank 0.

Here, while the overlapping part a with the greatest height but shortest width is continuous, its column addresses are not continuous, so that it is necessary to resend the column address for each read word (shown by "C1" and "R1" at timing "c3", "c4", and "c5" in FIG. 19). In this case, it is not possible to activate bank 0 and to read bank 1 in parallel, so that before issuing the read command for bank 1, an activation command for bank 0 is issued so that the overlapping part a which has the greatest height and the lowest width can be read (see "R1" and "A1" at timing C1 in FIG. 19) and an activation command for bank 1 is issued so that the overlapping part b which has the greatest height and the greatest width can also be read (see "R0" and "A0" at timing C2 in FIG. 19). Following this, a read command is issued for bank 1 so that the overlapping part a with the greatest height and the shortest width can be read(see "C1" and "R1" at timing c3, c4, c5, and c7 in FIG. 19). This means that the time equivalent to the three clock pulses following the activate command for bank 0 can be used effectively.

Next, a read command is issued so that the overlapping part b with the greatest height and greatest width is read (see "C0" and "R0" at timing c7, c8, c9, and c10 in FIG. 19). This overlapping part b with the greatest width and greatest height is continuous in the horizontal direction, so that the column address are consecutive, meaning there is no need to retransmit the column addresses while the reading is continuously being performed in the horizontal direction. As a result, in parallel with a read for the overlapping part b that has the greatest width and height, a precharge command for bank 1 (R1, P1 at timing c11) and an activate command for bank 1, which enables a read for the overlapping part b to be performed, are issued (R1, A1 at timing c12).

The overlapping part c with the lowest height but greatest width is similarly continuous in the horizontal direction, so that in parallel with the read for this overlapping part c (C1, R1 at timing c13), a precharge command for bank 0 (R0, P0 at timing c14) and an activate command for bank 0, which enable the overlapping part d with the lowest height and width to be read (R0, A0 at timing c15), are issued.

Finally, a read is performed for the overlapping part d which has the lowest height and width (C0, R0 at timing c16), the consecutive read process is halted (BS at timing C17), and precharge commands are issued for both banks (note that these commands are not shown in the drawings). In this present embodiment, the page which contains the lowest number of pixels, such as this overlapping part d, is accessed last. This is because when the overlapping part d with the lowest height and width is being read, it is not clear what pixels in what reference picture should be read after all of the currently required pixels have been read, with it not being possible to perform processing such as the issuance of commands before a BS command is issued.

As described above, by reading the memory areas that contain low numbers of pixels with continuous column addresses first and last (in the illustrated example, the overlapping part a with the greatest height but lowest width and the overlapping part d with the lowest height and lowest width), it is possible to issue a precharge command for the other bank while a read is performed for the memory areas that contain large numbers of pixels with continuous column addresses (in the illustrated example, the overlapping part b with the greatest height and greatest width and the overlapping part c with the lowest height but greatest width). This means that memory arrays which are mapped onto two bank addresses can be efficiently accessed. Also, of the memory areas that contain low numbers of pixels with consecutive column addresses, if the memory area with the larger amount of data to be transferred is read first (in the illustrated example, this corresponds to the overlapping part a with the greatest height but lowest width), then following the issuance of the activate command for the other bank, the waiting time of the three clock pulses until the issuance of the data read command for the bank activated by this activate command can be put to good use. In the illustrated example, since bank 1 is read in the interval between the issuance of the activate command for bank 0 and the issuance of the read command for bank 0, the three-clock-pulse interval is effectively used.

It should be noted here that the two memory areas with the least number of pixels with consecutive column addresses means the smallest and next smallest areas out of the four memory areas, although when a rectangular region is divided by two lines that are parallel to the edges of the region, the smallest region and the second smallest region will end up being next to each other. On the other hand, in the present embodiment, since the pixels in neighboring memory areas are stored in different banks, the smallest area and next smallest area will end up being stored in different banks.

As described above, the read order is determined so that the overlapping part d with the lowest height and lowest width is read last while the overlapping part a which has the greatest height but lowest width is read first, which means that efficient use can be made of the SDRAM, and that the required memory areas can be referenced using the lowest possible number of clock pulses.

Supplementary Description

The following is an investigation into the case when the read order for the bottom left page P10 with the lowest height and greatest width and the top right page P01 with the greatest height and lowest width is reversed for the read shown in FIG. 19. In such a case, it is necessary to issue a precharge command and an activate command for the read of the bottom left page P10 with the lowest height and greatest width, but on attempting to issue such a precharge command, the burst read for the bottom left page P10 with the lowest height and greatest width will be suspended. Since an activate command will have been issued for the top right page P01, it will not be possible to issue another activate command. From this it can be seen that the optimal order is for the top right page P01 with the greatest height and lowest width to be read first with the bottom left page P10 with the lowest height but greatest width then being read later.

1.4.12 Read Pattern for the Top Left Page P00 to the Bottom Right Page P11 (Part 1)

FIG. 20F shows an example of how the Y01 block can overlap the top left page P00, the bottom left page P10, the top right page P01, and the bottom right page P11 for the case when the judgement "Yes" is given in Step S58 and the judgement "Yes" is given in Step S59. When the judgement "Yes" is given in Step S58, the top left vertex (X,Y) of the Y01 block is positioned towards the left of the 16 horizontal pixels by 32 vertical pixels included in the top left page P00, so that the overlapping parts of the top left page P00 and the bottom left page P10 have the greatest widths.

When the judgement "Yes" is given in Step S59, the top left vertex (X,Y) of the Y01 block is positioned towards the top of the 16 horizontal pixels by 32 vertical pixels included in the top left page P00, so that the overlapping parts of the top left page P00 and the top right page P01 have the greatest heights.

In FIG. 20F, the overlapping part with the greatest width and greatest height is on the top left page P00, and the overlapping part with the greatest height but lowest width is on the top right page P01. The overlapping part with the greatest width and lowest height is on the bottom left page P10, and the overlapping part with the lowest height and lowest width is on the bottom right page P11. With the overlapping parts on each page in this state, the read order for these pages is determined as "top right page P01", "top left page P00", "bottom left page P10", "bottom right page P11".

1.4.13 Timing at which Commands are Issued to the SDRAM

The height and width of each overlapping part in FIG. 20F are as shown in FIG. 18.

In step S68 in FIG. 16, an RAS signal is issued to the RAS pins of the SDRAM at timing c1 and at the same time an activate command for bank 1 of the SDRAM to be read is issued. By issuing the activate command A1, the activation of bank 1 is performed during the period d1 (the timing d1 mentioned here including the effective activation of the memory array and the CAS delay (labeled as the "CAS latency" in FIG. 19)). Three clock pulses later at timing c2, an RAS signal is issued to the RAS pins of the SDRAM and at the same time an activate command A0 for bank 0 of the SDRAM is issued. By issuing the activate command A0, the activation of bank 0 can be performed during the period d2.

In steps S69 to S72, burst reads are performed in order for "top right page P01", "top left page P00", "bottom left page P10", "bottom right page P11".

1.4.14 Issuance of Commands for Top Right Page P01

The overlapping part s01*t01 (=1*7) which takes up the read area m*n for the top right page P01 has already been calculated. In step S21 in FIG. 17, the row address and bank address converted from the top left vertex (X+15−A,Y) of the overlapping part are outputted to the address pins. After this output, in step S24 the column address which has been converted from the relative coordinates (X+15−A,Y) in the pixel block is outputted to the address pins at timing c3 in FIG. 19, and in step S25 the CAS is outputted to the bank address calculated by the luminance address encoder 61. In step S26, the read length (A+m−15)(=1) is set in the word length register 59 and the read command R1 is issued.

It is judged whether the output of the read command has been performed t times, and if not, in step S28 the column address is updated by the offset (here, "+15") which has been set for the present page and the column address advances to the next row in the overlapping part.

Once the column address has advanced to the next row, the processing returns to step S24.

After the processing returns to step S24, the column address which has been incremented by the offset "+15" is outputted to the address pins at the timing c4 shown in FIG. 19, and in step S25 a CAS is outputted for the bank address calculated by the luminance address encoder 61. The read length "1" is then set in the word length register 59 and a read command is issued.

When the processing returns to step S24, after the column address that has been incremented by the offset value "+15" is outputted to the address pins at timing c5 in FIG. 18, in step S25 a CAS is outputted for the bank address calculated by the luminance address encoder 61. The read length "1" is then set in the word length register 59 and a read command is issued.

While the seven reads are being performed, the activation of bank 0 by the activate command issued at timing c2 is completed, so that access becomes possible for bank 0. Also, while the seven reads are being performed, seven rows of pixels are successively outputted from the data pins. After repeating the above read process seven times in this way, the processing finally advances to step S29. In step S29, it is judged whether activation of another bank is necessary.

In the present case, an activation command has already been issued, so that the judgement "No" is given in step S29.

1.4.15 Issuance of Commands for the Top Left Page P00

The memory access unit 11 outputs the row address and bank address converted from the top left vertex (X,Y) in the top left page P00 of an overlapping part of the read area that is n pixels wide and m pixels high to the address pins. After this output, in step S24 the column address which has been converted from the relative coordinates (X,Y) in the pixel block is outputted to the address pins at timing c7 in FIG. 18, and in step S25 the CAS is outputted to the bank address calculated by the luminance address encoder 61. In step S26, the read length "15" is set in the word length register 59 and a read command is issued.

It is judged whether the output of the read command has been performed t times, and if not, in step S28 the column address is updated by the offset (here, "+15") which has been set for the present page and the column address advances to the next row in the overlapping part.

Once the column address has advanced to the next row, the processing returns to step S24.

After the processing returns to step S24, the column address which has been incremented by the offset "+15" is outputted to the address pins at the timing c4 shown in FIG. 18, and in step S25 a CAS is outputted for the bank address calculated by the luminance address encoder 61. The read length "15" is then set in the word length register 59 and a read command is issued.

When the processing returns to step S24, after the column address that has been incremented by the offset value "+15" is outputted to the address pins at timing c9 in FIG. 19, in step S25 a CAS is outputted for the bank address calculated by the luminance address encoder 61. The read length "15" is then set in the word length register 59 and a read command is issued.

The processing returns to step S24 again, and after the column address that has been incremented by the offset value "+15" is outputted to the address pins at timing c10 in FIG. 18, in step S25 a CAS is outputted for the bank address calculated by the luminance address encoder 61. The read length "15" is then set in the word length register 59 and a read command is issued.

Once the above read process has been performed four times, the judgement "Yes" is given in step S27, and the processing advances to step S29. In step S29, it is judged whether it is necessary to activate the other bank.

In the present example, since the bottom left page P10 remains as another page to be read, in step S30 an RAS signal is issued to the RAS pins at timing c11 (3 clock pulses later), and at the same time a precharge command is issued. By issuing commands in this way, the activation of bank 1 can be performed in the interval d3 during which the output of luminance components according to the read command issued at timing c10 is repeated until timing c14.

1.4.16 Issuance of Commands for Bottom Left Page P10

The row address and bank address converted from the top left vertex (X,Y+n−31) of the overlapping part s10*t10 for the bottom left page P10 are outputted to the address pins. After this output, in step S24 the column address which has been converted from the relative coordinates (X,Y+n−31) in the pixel block is outputted to the address pins at timing c13 in FIG. 18, and in step S25 the CAS is outputted to the bank address calculated by the luminance address encoder 61. In step S26, the read length "15" is set in the word length register 59 at timing c14 in FIG. 18 and the read command R1 is issued.

Since t=1, the judgement "Yes" is given in step S27 and the processing advances to step S29. In step S29, it is judged whether it is necessary to activate the other bank.

In the present example, since the bottom right page P11 remains as another page to be read, in step S30 an RAS signal is issued to the RAS pins at timing c14 (3 clock pulses later), and at the same time a precharge command is issued. An activation command is then issued at timing c15 in FIG. 18. By issuing commands in this way, the activation of bank 0 can be performed in the interval d4 during which the output of luminance components according to the read command issued at timing c13 is repeated until timing c17.

1.4.17 Issuance of Commands for Bottom Right Page P11

At this point, the bottom right page P11 remains as a page to be read, so that the memory access unit 11 outputs the row address and bank address converted from the top left vertex (X+15−A,Y+n−31) of the overlapping part s11*t11 to the address pins. After this output, in step S24 the column address which has been converted from the relative coordinates (X+15−A,Y+n−31) in the pixel block is outputted to the address pins, and in step S25 the CAS is outputted to the bank address calculated by the luminance address encoder 61 at timing c16 in FIG. 18. In step S26, the read length "1" is set in the word length register 59 and the read command R0 is issued.

Since t=1, the judgement "Yes" is given in step S27 and the processing advances to step S29. In step S29, it is judged whether it is necessary to activate the other bank.

In the present example, since there are no more pages to be read, in step S30 a burst stop command is issued at timing c17. By issuing this command, the read process is terminated.

1.4.18 Read Pattern for the Top Left Page P00 to the Bottom Right Page P11 (Part 2)

FIG. 20G shows an example of how the Y01 block can overlap the top left page P00, the bottom left page P10, the top right page P01, and the bottom right page P11 for the case when the judgement "Yes" is given in Step S58 and the judgement "No" is given in Step S59. When the judgement "Yes" is given in Step S58, the overlapping parts of the top left page P00 and the bottom left page P10 have the greatest widths. When the judgement "No" is given in Step S59, the overlapping parts of the bottom left page P10 and the bottom right page P11 have the greatest heights. In FIG. 20G, the top left page P00 has the overlapping part with the lowest height and the greatest width, and the top right page P01 has the overlapping part with the lowest height and the lowest width. The bottom left page P10 has the overlapping part with the greatest height and the greatest width, and the bottom right page P11 has the overlapping part with the greatest height and the lowest width. When the overlapping parts on the respective pages are in this state, precharge commands for both bank 0 and bank 1 in the SDRAM will be issued in step S73. After this, in step S74 a read will be performed for the "bottom right page P11", in step S75 a read will be performed for the "bottom left page P10", in step S76 a read will be performed for the "top left page P00", and in step S77 a read will be performed for the "top right page P01".

1.4.19 Read Pattern for the Top Left Page P00 to the Bottom Right Page P11 (Part 3)

Figure 20H:
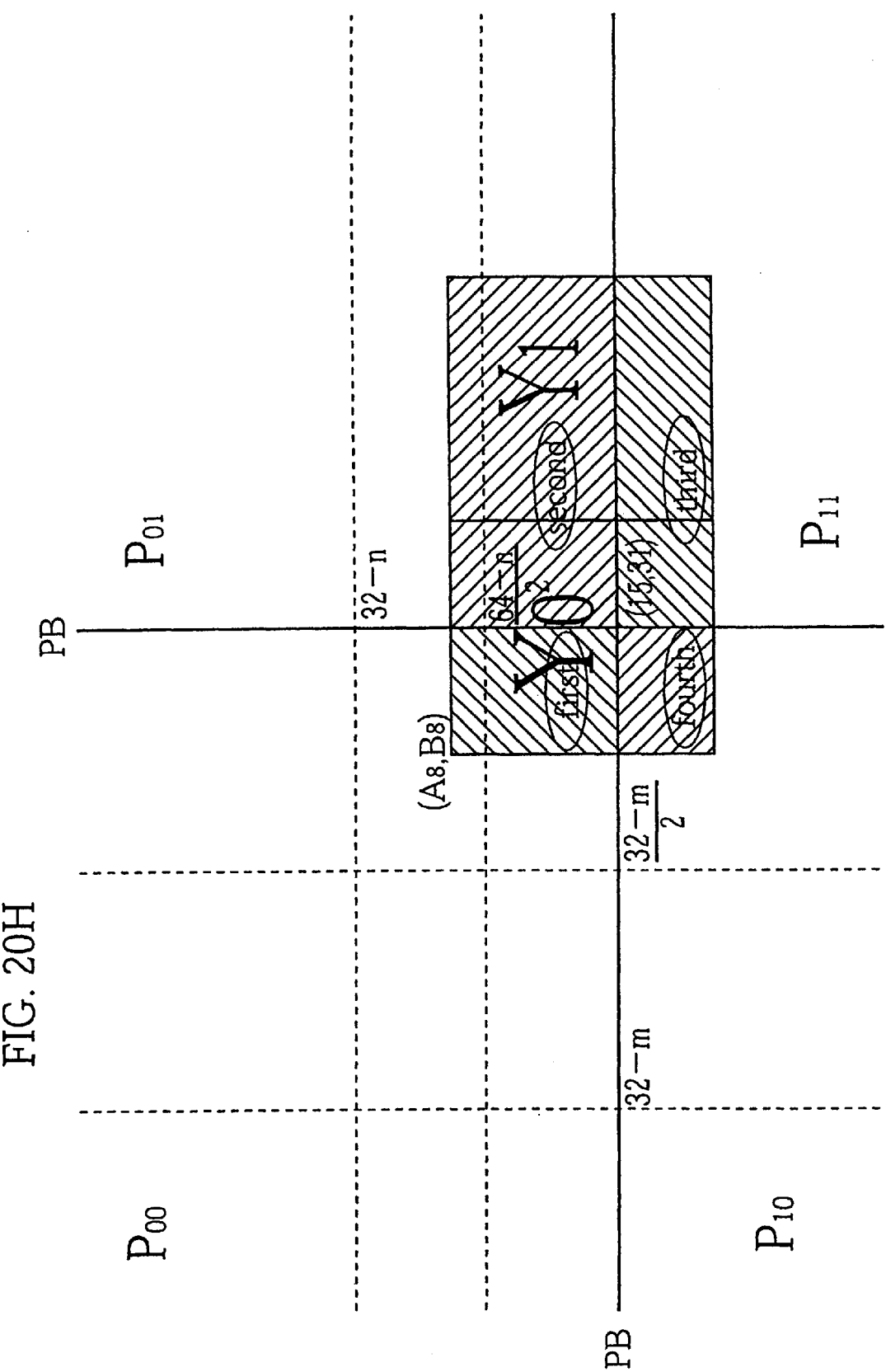

FIG. 20H shows an example of how the Y01 block can overlap the top left page P00, the bottom left page P10, the top right page P01, and the bottom right page P11 for the case when the judgement "No" is given in Step S58 and the judgement "Yes" is given in Step S60. When the judgement "No" is given in Step S58, the top left vertex (X,Y) of the Y01 block is positioned towards the right of the 16 horizontal pixels by 32 vertical pixels included in the top left page P00, so that the overlapping parts of the top right page P01 and the bottom right page P11 have the greatest widths. The overlapping parts of the top left page P00 and the top right page P01, meanwhile, have the greatest heights. In FIG. 20H, the top left page P00 has the overlapping part with the greatest height and the lowest width, and the top right page P01 has the overlapping part with the greatest height and the greatest width. The bottom left page P10 has the overlapping part with the lowest height and the lowest width, and the bottom right page P11 has the overlapping part with the lowest height but the greatest width. When the overlapping parts on the respective pages are in this state, precharge commands for both bank 0 and bank 1 in the SDRAM will be issued in step S78. After this, in step S79 a read will be performed for the "top left page P00", in step S80 a read will be performed for the "top right page P01", in step S81 a read will be performed for the "bottom right page P11", and in step S82 a read will be performed for the "bottom left page P10".

1.4.20 Read Pattern for the Top Left Page P00 to the Bottom Right Page P11 (Part 4)

Figure 20I:
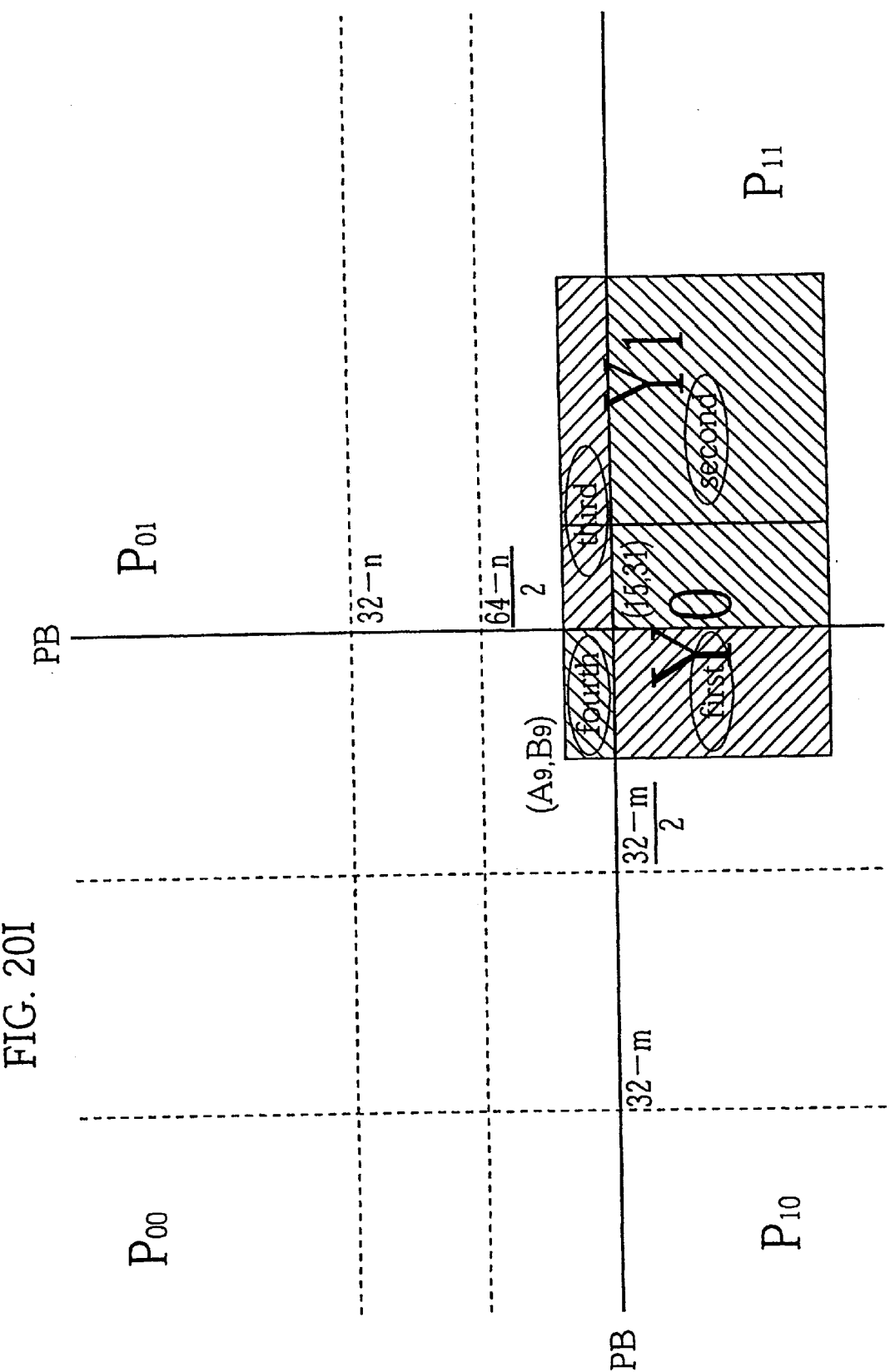

FIG. 20I shows an example of how the Y01 block can overlap the top left page P00, the bottom left page P10, the top right page P01, and the bottom right page P11 for the case when the judgement "No" is given in Step S58 and the judgement "No" is given in Step S60. When the judgement "No" is given in Step S58, the top left vertex (X,Y) of the Y01 block is positioned towards the right of the 16 horizontal pixels by 32 vertical pixels included in the top left page P00, so that the overlapping parts of the top right page P01 and the bottom right page P11 have the greatest widths. The overlapping parts of the bottom left page P10 and the bottom right page P11, meanwhile, have the greatest heights. In FIG. 20I, the top left page P00 has the overlapping part with the lowest height and the lowest width, and the top right page P01 has the overlapping part with the lowest height and the greatest width. The bottom left page P10 has the overlapping part with the greatest height and the lowest width, and the bottom right page P11 has the overlapping part with the greatest height and the greatest width. When the overlapping parts on the respective pages are in this state, precharge commands for both bank 0 and bank 1 in the SDRAM will be issued in step S83. After this, in step S84 a read will be performed for the "bottom left page P10", in step S85 a read will be performed for the "bottom right page P11", in step S86 a read will be performed for the "top right page P01", and in step S87 a read will be performed for the "top left page P00".

By reading the Y01 block according to the method described above, the luminance components and chrominance components that compose the Y23 block and the CbCr block are successively read by calculating the coordinates of the top left vertex and calculating the height and width of the overlapping part on each page. The same reading process is also performed when the read is performed for the Y02 block, the Y13 block, and the CbCr block.

1.5 Description of the Buffer A 12

When the luminance components and chrominance components that compose the Y01 block, the Y23 block, and the CbCr block in a future direction are read from the memory access unit 11, the buffer A 12 writes these into one of its internal memory areas in accordance with the write address coordinates indicated by the write address generation unit 13. The buffer A 12 also outputs data at the read address coordinates indicated by the read address generation unit 14, out of the luminance components and chrominance components written into the internal memory areas, to the half-pel interpolation unit 15.

1.5.1 Positioning of the Buffer A 12 within the Entire Image Decoding Apparatus

In the timing chart shown in FIG. 6A, the operation of the buffer A 12 is shown as the processing at timing t41.

At timing t41 in the timing chart in FIG. 6A, the Y01_f(r) block is read from the memory access unit 11 and is stored. At timing t43, the Y23_f(r) block is read and stored, and at timing t46, the pair of the Cb block and the Cr block, CbCr_f(r), is read and is stored. Whenever two blocks of a reference picture in the backward direction have been read from the memory access unit 11, these are then stored. In the timing chart of FIG. 6A, the Y01_b(r) block read from the memory access unit 11 at timing t51, the Y23_b(r) block read at timing t52, and the CbCr_b(r) block read at timing t54 are all stored in the buffer A12.

1.5.2 Internal Areas of the Buffer A12

FIG. 21A shows the internal area of the buffer A 12. This internal area has variable numbers of columns and rows and includes a plurality of 4-byte areas. In FIG. 21A, the variable "z" which shows the number of rows in the buffer A 12 and the variable "v" which shows the number of columns are both variable, so that by setting these variables at appropriate values, the number of columns and rows in the buffer A 12 can be changed. The reason the numbers of rows and columns in the buffer A 12 are variable is that the number of rows and columns of luminance components determined by the compensation control unit 10 can be any of the following eight patterns: 16 horizontal pixels by 8 vertical pixels; 17 horizontal pixels by 8 vertical pixels; 16 horizontal pixels by 9 vertical pixels; 17 horizontal pixels by 9 vertical pixels; 8 horizontal pixels by 16 vertical pixels; 9 horizontal pixels by 16 vertical pixels; 8 horizontal pixels by 17 vertical pixels or 9 horizontal pixels by 17 vertical pixels, with it being preferable for the reference picture to be stored in the form in which the luminance components and the chrominance components were read.

1.5.3 Storage Method for the Buffer A 12 (Part I)

FIG. 21*b* shows how the luminance components read from the top left page P00, the top right page P01, the bottom left page P10, and the bottom right page P11 in the SDRAM 31 are stored in the buffer A 12.

Here, suppose that the luminance components for s00 horizontal pixels by t00 vertical pixels have been read from the relative coordinates (A,B) in the top left page P00, and that the luminance components for s01 horizontal pixels by t01 vertical pixels have been read from the relative coordinates (0,B) in the top right page P01. In the y=0 area of the buffer A 12, the luminance components from the relative coordinates (A,B) in the top left page P00 to the relative coordinates (A+s00,B) of the top left page P00 and the luminance components from the relative coordinates (0,B) in the top right page P01 to the relative coordinates (s01,B) of the top right page P01 are stored.

In the y=1 area of the buffer A 12, the luminance components from the relative coordinates (A,B+1) in the top left page P00 to the relative coordinates (A+s00,B+1) of the top left page P00 and the luminance components from the relative coordinates (0,B+1) in the top right page P01 to the relative coordinates (s01,B+1) of the top right page P01 are stored.

Again, suppose that the luminance components for s10 horizontal pixels by t10 vertical pixels have been read from the relative coordinates (A,0) in the bottom left page P10, and that the luminance components for s11 horizontal pixels by t11 vertical pixels have been read from the relative coordinates (0,0) in the bottom right page P11. In the y=t00+1 area of the buffer A 12, the luminance components from the relative coordinates (A,0) in the bottom left page P10 to the relative coordinates (A+s00,0) of the bottom left page P10 and the luminance components from the relative coordinates (0,0) in the bottom right page P11 to the relative coordinates (0+s11,0) of the bottom right page P11 are stored.

1.5.4 Storage Method for the Buffer A 12 (Part II)

FIG. 22 shows how luminance components that have been read from the respective pages are stored in the various 4 bytes areas of the buffer A 12.

Each four-byte area in the buffer A 12 has been assigned a linear address as shown in FIG. 22. As shown in FIG. 22, the four-byte area with linear_address=0000 stores the four luminance components composed of the luminance component for the top left vertex (A,B) in the top left page P00, the next luminance component to the right (A+1,B), the following luminance component to the right (A+2,B), and another luminance component to the right (A+3,B). Similarly, the four-byte area with linear_address=0001 stores the four luminance components composed of the luminance component for (A+4,B) in the top left page P00, the next luminance component to the right (A+5,B), the following luminance component to the right (A+6,B), and another luminance component to the right (A+7,B).

Figure 23A:
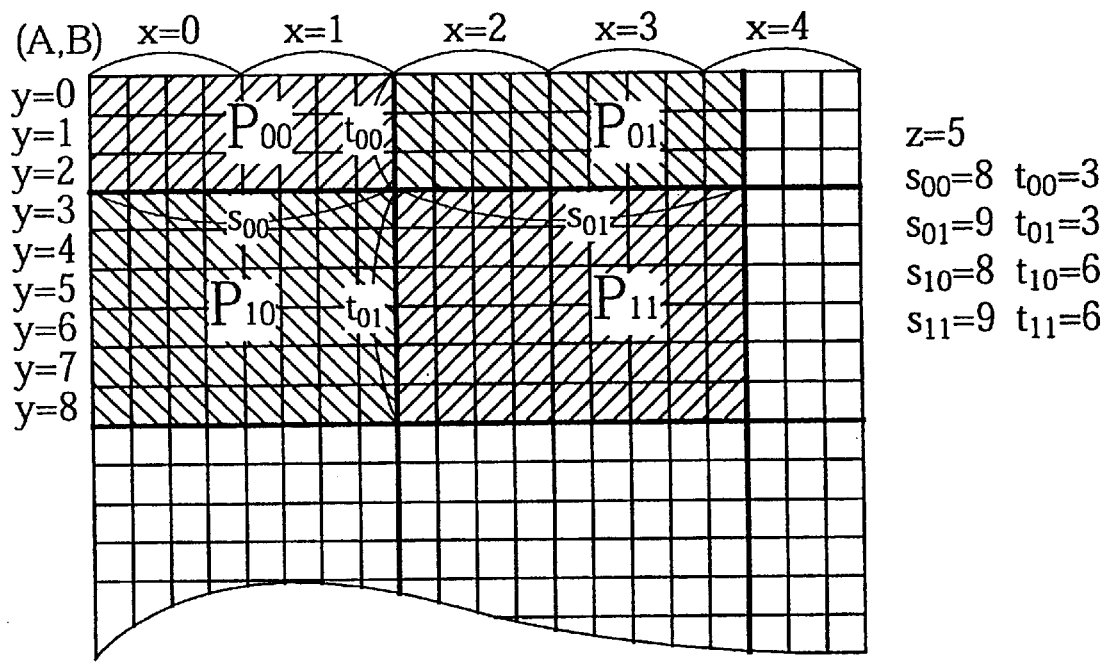
FIG. 23A shows how the Y01 block which is composed of the overlapping parts read from the top left page P00 to the bottom right page P11 is stored in the internal regions of the buffer A12.

In FIG. 23A, the Y01 block is composed of 17 horizontal pixels by 9 vertical pixels, with 8 horizontal pixels by 3 vertical pixels being read from the top left page P00, 9 horizontal pixels by 3 vertical pixels being read from the top right page P01, 8 horizontal pixels by 6 vertical pixels being read from the bottom left page P10, and 9 horizontal pixels by 6 vertical pixels being read from the bottom right page P11. This figure shows how the read pixels are stored.

As can be seen from FIG. 23A, the width of the Y01 block is 17 pixels, and since a luminance component and a chrominance component are each expressed using one byte, the internal area of the buffer A 12 requires five areas, shown as x=0~x=4 in the horizontal direction for storing a total of twenty bytes, and nine rows in the vertical direction shown as y=0~y=8.

Figure 23B:
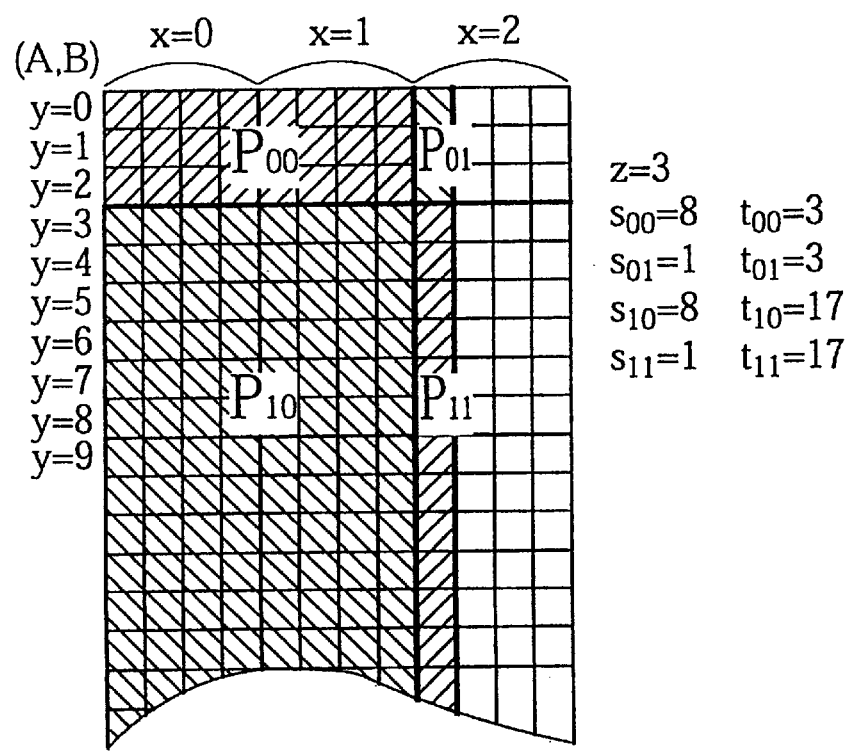
FIG. 23B shows how the Y02 block composed of the overlapping parts read from the top left page P00 to the bottom right page P11 is stored in the internal regions of the buffer A12.

In FIG. 23B, the Y02 block is composed of 9 horizontal pixels by 16 vertical pixels, with 8 horizontal pixels by 3 vertical pixels being read from the top left page P00, 1 horizontal pixel by 3 vertical pixels being read from the top right page P01, 8 horizontal pixels by 13 vertical pixels being read from the bottom left page P10, and 1 horizontal pixel by 13 vertical pixels being read from the bottom right page P11. This figure shows how the read pixels are stored.

As can be seen from FIG. 23B, the width of the Y02 block is 9 pixels, and since a luminance component and a chrominance component are each expressed using one byte, the internal area of the buffer A 12 requires five areas, shown as x=0~x=2 in the horizontal direction for storing a total of twelve bytes, and seventeen rows in the vertical direction shown as y=0~y=16.

1.6 Outline Description of the Write Address Generation Unit 13

When the compensation control unit 10 has started to read the luminance components and the chrominance components from the SDRAM, the write address generation unit 13 generates a linear address and has the read luminance components and chrominance components written into the buffer A 12 at the area indicated by the generated linear address.

1.6.1 Configuration of the Write Address Generation Unit 13

Figure 24A:
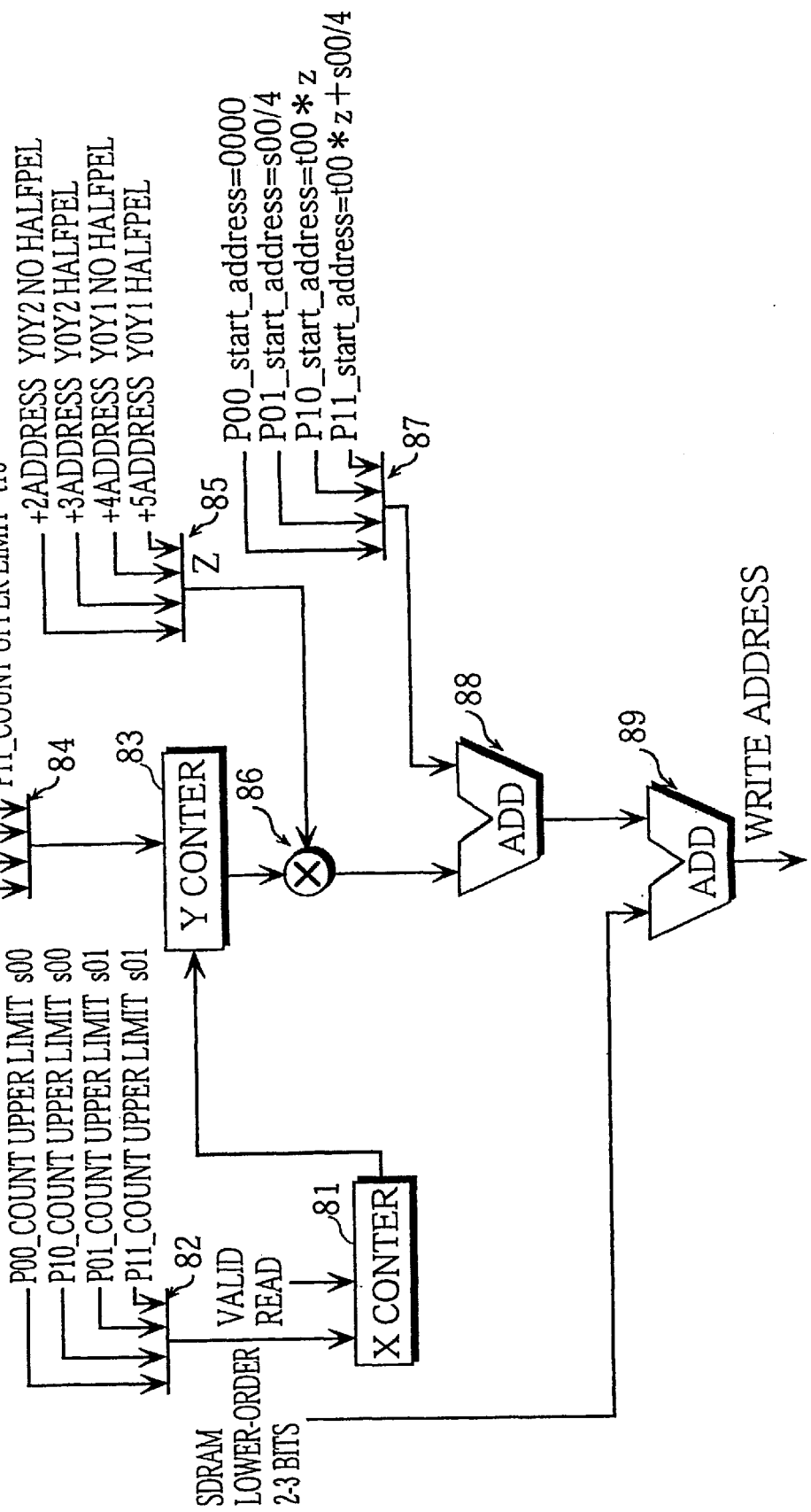
FIG. 24A shows the configuration of the write address generation unit 13.

FIG. 24A shows the configuration of the write address generation unit 13. As shown in FIG. 24A, the write address generation unit 13 is composed of an X counter 81, a selector 82, a Y counter 83, a selector 84, a selector 85, a multiplier 86, a selector 87, an adder 88, and an adder 89.

The X counter 81 increments a count value every time a valid read of a luminance component and a chrominance component is performed from the SDRAM. When this count value reaches the maximum value that is selectively outputted by the selector 82, the Y counter 83 is informed that this maximum value has been reached.

The selector 82 selectively outputs one of the width s00 of the top left page P00, the width s01 of the top right page P01, the width s10 (=s00) of the bottom left page P10, and the width s11 (=s01) of the bottom right page P11, depending on whether the read address in the SDRAM is for the top left page P00, the top right page P01, the bottom left page P10, or the bottom right page P11. More specifically, when the top left page P00 is being read, the selector 82 outputs the width s00 of the top left page P00 to the X counter 81, while when the top right page P01 is being read, the selector 82 outputs the width s01 of the top right page P01 to the X counter 81. In the same way, when the bottom left page P10 is being read, the selector 82 outputs the width s10 (=s00) of the bottom left page P10 to the X counter 81, while when the bottom right page P11 is being read, the selector 82 outputs the width s11 (=s01) of the bottom right page P11 to the X counter 81.

The Y counter 83 increments its count value on being informed that the X counter 81 has reached the appropriate maximum value. This count value incremented by the Y counter 83 is selectively outputted by the selector 84 until it reaches its maximum value, after which it is reset.

The selector 84 selectively outputs one of the height t00 of the top left page P00, the height t01 of the top right page P01, the height t10 of the bottom left page P10, and the height t11 of the bottom right page P11, depending on whether the read address in the SDRAM is for the top left page P00, the top right page P01, the bottom left page P10, or the bottom right page P11. More specifically, when the top left page P00 is being read, the selector 84 outputs the height t00 of the top left page P00 to the Y counter 83, while when the top right page P01 is being read, the selector 84 outputs the height t01 (=t00) of the top right page P01 to the Y counter 83. In the same way, when the bottom left page P10 is being read, the selector 84 outputs the height t10 of the bottom left page P10 to the Y counter 83, while when the bottom right page P11 is being read, the selector 84 outputs the height t11 (=t10) of the bottom right page P11 to the Y counter 83.

The selector 85 selects one of "+2", "+3", "+4", and "+5", as the number of rows by which this count value is to be multiplied and outputs its selection to the multiplier 86, when the count value for the Y coordinate has been incremented by "1" by the Y counter 83. When the bread pattern is set for the Y02 block and half-pel interpolation in the horizontal direction is not necessary, luminance components are read in a block of 8 horizontal pixels by 16 vertical pixels. Since luminance components are stored for eight pixels, the selector 85 outputs the value "+2" to the multiplier 86. By outputting the value "+2" to the multiplier 86 in this way, the increase in the count value can be doubled every time the Y counter 83 increments the Y coordinate.

When the read pattern is set for the Y02 block and half-pel interpolation in the horizontal direction is necessary, luminance components are read in a block of 9 horizontal pixels by 16 vertical pixels. Since luminance components are stored for nine pixels, the selector 85 outputs the value "+3" to the multiplier 86. By outputting the value "+3" to the multiplier 86 in this way, the increase in the count value can be tripled every time the Y counter 83 increments the Y coordinate.

When the read pattern is set for the Y01 block and half-pel interpolation in the horizontal direction is not necessary, luminance components are read in a block of 16 horizontal pixels by 8 vertical pixels. Since luminance components are stored for sixteen pixels, the selector 85 outputs the value "+4" to the multiplier 86. By outputting the value "+4" to the multiplier 86 in this way, the increase in the count value can be quadrupled every time the Y counter 83 increments the Y coordinate.

When the read pattern is set for the Y01 block and half-pel interpolation in the horizontal direction is necessary, luminance components are read in a block of 17 horizontal pixels by 8 vertical pixels. Since luminance components are stored for seventeen pixels, the selector 85 outputs the value "+5" to the multiplier 86. By outputting the value "+5" to the multiplier 86 in this way, the increase in the count value can be quintupled every time the Y counter 83 increments the Y coordinate.

The multiplier 86 multiplies the incremented total by the row number in the buffer A 12 outputted by the selector 85 and outputs the result to the adder 88, when the count value for the Y coordinate is incremented by the Y counter 83.

The reason the multiplier 86 multiplies the count value of the Y counter 83 by the row number every time the Y coordinate is incremented is that it is necessary to store into the buffer A 12-one row of luminance components between a given luminance component and the luminance component directly below every time the Y coordinate is incremented.

The selector 87 selectively outputs one of a start address for storing an overlapping part read from the top left page P00, a start address for storing an overlapping part read from the top right page P01, a start address for storing an overlapping part read from the bottom left page P10, or a start address for storing an overlapping part read from the bottom right page P11.

Here, the start address for storing an overlapping part read from the top left page P00 may be set as the address 0000 in the buffer A 12, so that in this case the selector 87 can output the linear address 0000 to the adder 88.

If the width of the top left page P00 is set as s00 and the luminance components read from the top left page P00 are stored in the area from the linear address 0000 to the linear address 0000+t00*z−1, the luminance components read from the bottom left page P10 can be stored starting from the linear address 0000+t00*z. Consequently, the selector 87 will output the linear address 0000+t00*z as the storage starting address for the luminance components read from the bottom left page P10.

The luminance components read from the bottom right page P11 can be stored starting from the linear address 0000+t00*z+s00/4. Consequently, the selector 87 will output the linear address 0000+t00*z+s00/4 as the storage starting address for the luminance components read from the bottom right page P11.

The adder 88 adds the count value of the Y counter 83 that has been multiplied by the total number of columns z by the multiplier 86 to the starting address that was selectively outputted by the selector 87.

The adder 89 adds the value between the second lower-order bit to the ninth lower-order bit out of the 9-bit column address generated by the luminance address encoder 61 to the result of the addition by the adder 88 to generate the write address in the buffer A 12 for the luminance components. The value between the second lower-order bit to the ninth lower-order bit out of the 9-bit column address is a multiple of four bytes, so that if the addition result of the adder 88 is added to this value, the write address in the buffer A 12 can be determined.

1.7.1 Internal Image of the Buffer A 12 When Storing the Y01 Block

It has been previously described how the luminance block is divided into the Y01 block and the Y23 block and is read from the memory module 3, and the following description will focus on how the luminance components in the Y01 block and the Y23 block are stored, with reference to FIG. 25A and FIG. 25B.

FIG. 25A shows how the luminance components are stored when the Y01 block is composed of 17 horizontal pixels by 9 vertical pixels, while FIG. 25B shows how the luminance components are stored when the Y23 block is composed of 17 horizontal pixels by 8 vertical pixels.

In FIG. 25A, the internal area of the buffer A 12 completely used up by the 17 horizontal pixels by 9 vertical pixels included in the Y01 block, but when the Y23 block is read, the 17 horizontal pixels by 8 vertical pixels included in the Y23 block are overwritten into the internal area of the buffer A 12 that is used for the Y01 block in FIG. 25A. Here, since the Y01 block is composed of 17 horizontal pixels by 9 vertical pixels and includes one more row of luminance components than the Y23 block, the luminance components on the ninth row Y01(0,8), Y01(1,8), Y01(2,8), Y01(3,8), . . . Y01(14,8), Y01(15,8), Y01(16,8) are not overwritten and so remain in the buffer A 12. The reason this one row of luminance components is allowed to remain in the buffer A 12 is that of the pixels in the Y23 block, the luminance components of the pixels with the row addresses Y23(0,0), Y23(1,0), Y23(2,0), Y23(3,0), . . . Y23(14,0), Y23(15,0), Y23(16,0) are generated by taking an average with the luminance components on this ninth row.

1.7.2 Internal Image of the Buffer A 12 When Storing the Y01 Block

It has been previously described how the luminance block is divided into the Y02 block and the Y13 block and is read from the memory module 3, and the following description will focus on how the luminance components in the Y02 block and the Y13 block are stored, with reference to FIG. 26A and FIG. 26B.

FIG. 26A shows how the luminance components are stored when the Y02 block is composed of 9 horizontal pixels by 17 vertical pixels, while FIG. 26B shows how the luminance components are stored when the Y13 block is composed of 8 horizontal pixels by 17 vertical pixels.

In FIG. 26A, the internal area of the buffer A 12 completely used up by the 9 horizontal pixels by 17 vertical pixels included in the Y02 block, but when the Y13 block is read, the 8 horizontal pixels by 17 vertical pixels included in the Y13 block are overwritten into the internal area of the buffer A 12 that is used for the Y02 block in FIG. 26A. Here, since the Y02 block is composed of 9 horizontal pixels by 17 vertical pixels and includes one more column of luminance components than the Y13 block, the luminance components in the ninth column Y02(8,0), Y02(8,1), Y02(8,2), Y02(8,3), . . . Y02(8,14), Y02(8,15), Y02(8,16) are not overwritten and so remain in the buffer A 12. The reason this one column of luminance components is allowed to remain in the buffer A 12 is that of the pixels in the Y13 block, the luminance components of the pixels with the column addresses Y13(0,0), Y13(0,1), Y13(0,2), Y13(0,3) . . . Y13(0,14), Y13(0,15), Y13(0,16) are generated by taking an average with the luminance components in this ninth column.

1.8 Outline of the Read Address Generation Unit 14

The read address generation unit 14 generates the coordinates (X,Y) in the buffer A 12 of the luminance components that are to be subjected to half-pel interpolation by the half-pel interpolation unit 15, and instructs the buffer A 12 to output the luminance components and the chrominance components for these coordinates (X,Y).

1.8.1 Configuration of the Read Address Generation Unit 14

Figure 4C:
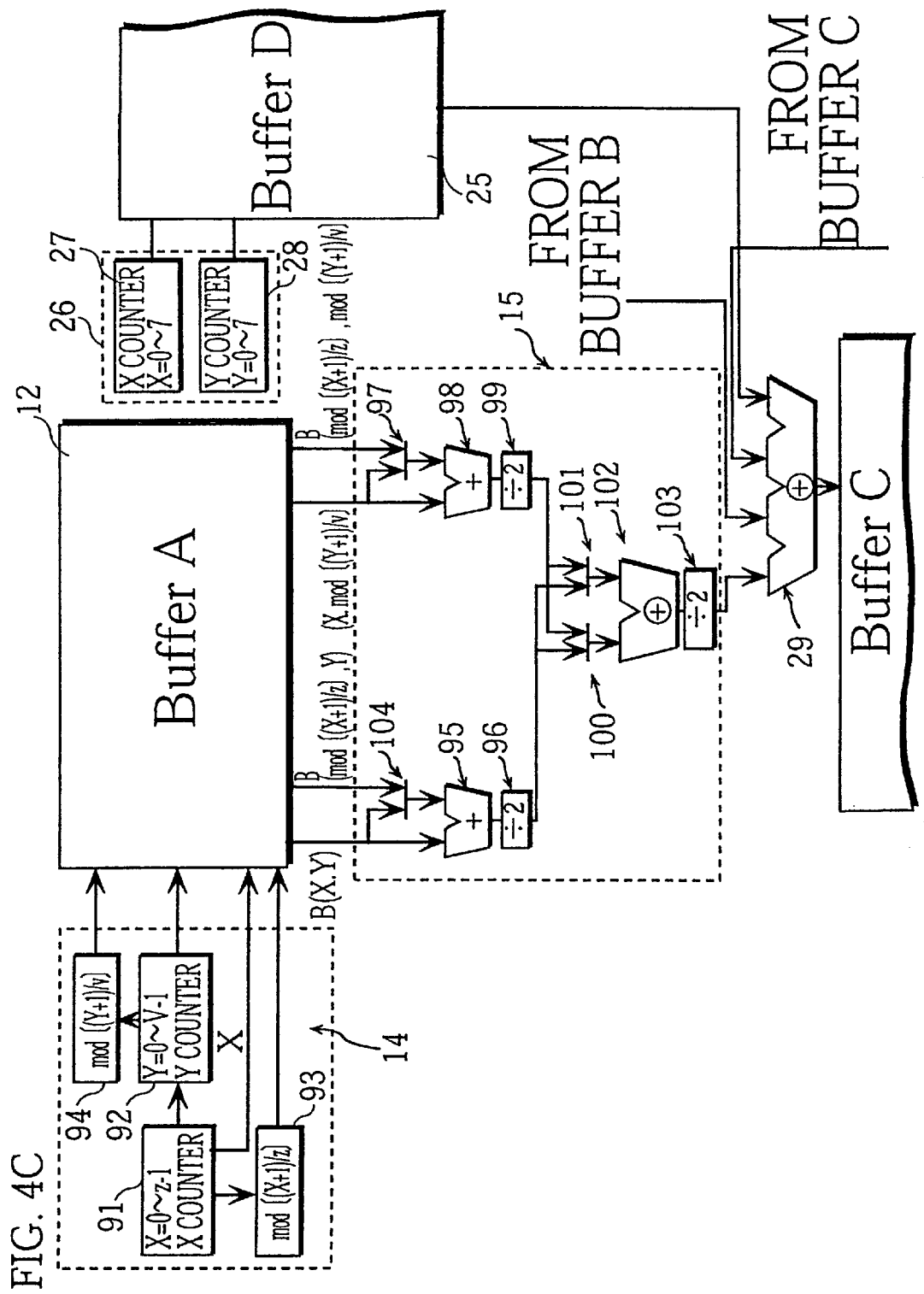
FIG. 4C shows the configuration of the half-pel interpolation unit 15, the write address generation unit 110, and the read address generation unit 22.

The configuration of the read address generation unit 14 is shown in FIG. 4C. As shown in FIG. 4C, the read address generation unit 14 is composed of an X counter 91, a Y counter 92, a MOD calculator 93, and a MOD calculator 94.

The X counter 91 counts a value in the range 0 to the total number of columns z, and outputs the value to the buffer A 12 as an X coordinate in the buffer A 12. The maximum value for this count value is the total number of columns z, so that the value outputted by the X counter 91 as the count value has an effective range of "0" to the value "z−1".

The Y counter 92 counts a value in the range 0 to the total number of rows v, and outputs the value to the buffer A 12 as a Y coordinate in the buffer A 12. The maximum value for this count value is the total number of rows v, so that the value outputted by the Y counter 92 as the count value has an effective range of "0" to the value "v−1".

When half-pel interpolation is required in the horizontal direction, the MOD calculator 93 adds "1" to the count value outputted by the X counter 91 as the X coordinate and outputs the remainder of the addition result divided by the total number of columns z to the buffer A 12.

When half-pel interpolation is required in the vertical direction, the MOD calculator 94 adds "1" to the count value outputted by the Y counter 92 as the Y coordinate and outputs the remainder of the addition result divided by the total number of rows v to the buffer A 12.

As described above, when the coordinates (X,Y) composed of the count values of the X counter 91 and the Y counter 92 are outputted and half-pel interpolation is only required in the horizontal direction, the coordinates (mod [(X+1)/z],Y) composed of the output of the MOD calculator 93 and the output of the Y counter 92 are outputted to the buffer A 12. Alternatively, when half-pel interpolation is only required in the vertical direction, the coordinates (X,mod[(Y+1)/v]) composed of the output of the X counter 91 and the output of the MOD calculator 94 are outputted to the buffer A 12.

When half-pel interpolation is required in both the horizontal direction and the vertical direction, the coordinates (mod[(X+1)/z],mod[(Y+1)/v]) composed of the output of the MOD calculator 93 and the output of the MOD calculator 94 are outputted to the buffer A 12.

1.9 Description of the Half-pel interpolation Unit 15

The half-pel interpolation unit 15 performs one of half-pel interpolation in the horizontal direction, half-pel interpolation in the vertical direction, or half-pel interpolation in the horizontal and vertical directions, when a luminance component or chrominance component for the coordinates (X,Y) (or any of (mod[(X+1)/z],Y), (X,mod[(Y+1)/v]), and (mod [(X+1)/z],mod[(Y+1)/v])) given by the outputs of the X counter 91, the Y counter 92, the MOD calculator 93 and the MOD calculator 94 has been outputted by the buffer A 12. The result of the half-pel interpolation can then be outputted to the blend unit 29 so that it will be blended with the luminance component and the chrominance component of the differential image outputted by the buffer D 25.

The luminance components and chrominance components are read in one of the following block patterns: 16 horizontal pixels by 8 vertical pixels; 17 horizontal pixels by 8 vertical pixels; 16 horizontal pixels by 9 vertical pixels; 17 horizontal pixels by 9 vertical pixels; 8 horizontal pixels by 16 vertical pixels; 9 horizontal pixels by 16 vertical pixels; 8 horizontal pixels by 17 vertical pixels; or 9 horizontal pixels by 17 vertical pixels.

When luminance components are read from the read address generation unit 14 in any of the 17 horizontal pixel by 8 vertical pixel, 16 horizontal pixel by 9 vertical pixel, or 17 horizontal pixel by 9 vertical pixel patterns, the half-pel interpolation unit 15 performs half-pel interpolation for 16 horizontal pixels by 8 vertical pixels and the half-pel interpolation result for the 16 horizontal pixels by 8 vertical pixels is written into the buffer C 20.

Conversely, luminance components are read from the read address generation unit 14 in any of the 9 horizontal pixel by 16 vertical pixel, 8 horizontal pixel by 17 vertical pixel, or 9 horizontal pixel by 17 vertical pixel patterns, the half-pel interpolation unit 15 performs half-pel interpolation for 8 horizontal pixels by 16 vertical pixels and the half-pel interpolation result for the 8 horizontal pixels by 16 vertical pixels is written into the buffer C 20.

1.9.1 Positioning of the Half-pel interpolation Unit 15 within the Entire Image Decoding Apparatus When the Y01 block has been read from the buffer A 12 for the reference picture in the backward direction at timing t41 in the timing chart of FIG. 6A, the half-pel interpolation unit 15 performs the half-pel interpolation on the read Y01 block at timing t71. When the Y01 block has been read from the buffer B 16 for the reference picture in the backward direction at timing t42 in the timing chart of FIG. 6A, the half-pel interpolation unit 15 performs the half-pel interpolation on the read Y01 block at timing t72. When the Y23 block has been read from the buffer A 12 for the reference picture in the forward direction at timing t43 in the timing chart of FIG. 6A, the half-pel interpolation unit 15 performs the half-pel interpolation on the read Y23 block at timing t73.

1.9.2 Configuration of the Half-pel interpolation Unit 15

The following is an explanation of the configuration of the half-pel interpolation unit 15, with reference to FIG. 4C. As shown in FIG. 4C, the half-pel interpolation unit 15 is composed of a selector 104, an adder 95, a divider 96, a selector 97, an adder 98, a divider 99, a selector 100, a selector 101, an adder 102, and a divider 103.

The selector 104 outputs a luminance component to the adder 95, when half-pel interpolation is required in the horizontal direction and the luminance component stored at the coordinates (mod[(X+1)/z],Y) has been outputted. When half-pel interpolation is not required in the horizontal direction, only the luminance component stored at the coordinates (X,Y) is outputted by the buffer A 12, so that the selector 104 outputs this luminance component to the adder 95.

The adder 95 adds the luminance component for the coordinates (mod[(X+1)/z],Y) that has been outputted by the buffer A 12 and the luminance component for the coordinates (X,Y) that has been outputted by the buffer A 12 when half-pel interpolation is required in the horizontal direction. Conversely, when half-pel interpolation is not required in the horizontal direction, the luminance component for the coordinates (X,Y) is outputted by the selector 104, so that the adder 95 adds the luminance component for the coordinates (X,Y) to itself, resulting in a value which is twice the luminance component of the coordinates (X,Y) being outputted to the divider 96.

The divider 96 divides the result of the addition by the adder 95 by two. When half-pel interpolation is required in the horizontal direction, the result of the divider 96 dividing the addition result of the adder 95 by two is that an average luminance component for the coordinates (X,Y) and (mod[(X+1)/z],Y) is calculated. Conversely, when half-pel interpolation is not required in the horizontal direction, the result of the divider 96 dividing the addition result of the adder 95 by two is that a value which is double the luminance component of the coordinate value (X,Y) is divided by two, meaning that the luminance component of the coordinates (X,Y) is outputted without amendment.

The selector 97 outputs a luminance component to the adder 98 when half-pel interpolation is required in the vertical direction and the luminance component stored at the coordinates (X, mod[(Y+1)/v]) has been outputted. When half-pel interpolation is required in the horizontal and vertical directions, the luminance component stored at the coordinates (mod[(X+1)/z],mod[(Y+1)/v]) is outputted by the buffer A 12, so that the selector 97 outputs this luminance component to the adder 98.

When half-pel interpolation is required in the horizontal and vertical directions, the adder 98 adds the luminance component for the coordinates (X, mod[(Y+1)/v]) that has been outputted by the buffer A 12 and the luminance component for the coordinates (mod[(X+1)/z], mod[(Y+1)/v]) that has been outputted by the selector 97. Conversely, when half-pel interpolation is only required in the vertical direction, the luminance component for the coordinates (X, mod[(Y+1)/v]) is outputted by the buffer A 12, so that the adder 95 adds this to the luminance component for the coordinates (X, mod[(Y+1)/v]) which is outputted by the buffer A 12.

The divider 99 divides the result of the addition by the adder 98 by two. When half-pel interpolation is required in the horizontal and vertical directions, the result of the divider 99 dividing the addition result of the adder 98 by two is that an average luminance component for the coordinates (X, mod[(Y+1)/z]) and (mod[(X+1)/z],mo d[(Y+1)/z]) is calculated. Conversely, when half-pel interpolation is only required in the vertical direction, the result of the divider 99 dividing the addition result of the adder 98 by two is that a value which is double the luminance component of the coordinate value (X, mod[(Y+1)/z]) is divided by two, meaning that the luminance component of the coordinates (X, mod[(Y+1)/z]) is outputted without amendment.

The selector 100 and the selector 101 output the division result of the divider 96 to the adder 102 when half-pel interpolation is not required in either the horizontal or the vertical directions.

When half-pel interpolation is only required in the vertical direction, the selector 100 and the selector 101 output the result of the half-pel interpolation in the horizontal direction obtained by the processing of the adder 95 and divider 96 to the adder 102.

When half-pel interpolation is required in both the horizontal and vertical directions, the average value for (X,Y) and (mod[(X+1/z],Y) calculated by the adder 95 and the divider 96 is added by the adder 102 to the average value for the (X,mod[(Y+1)/v]) and (mod[(X+1/z],mod[(Y+1)/v]) calculated by the adder 98 and the divider 99.

The adder 102 adds the values outputted by the selector 100 and the selector 101.

The divider 103 divides the addition result of the adder 102 by two. When half-pel interpolation is not required in either of the horizontal or vertical directions, the value which was outputted through the divider 96 is again outputted without amendment.

When half-pel interpolation is only required in the vertical direction, the value (X,Y) outputted without amendment by the adder 95 and the divider 96 is added to the value (X,mod[(Y+1)/v]) which is outputted without amendment by the adder 98 and the divider 99 and the addition result is divided by two, thereby obtaining the result for the half-pel interpolation in the vertical direction.

When half-pel interpolation is only required in the horizontal direction, the value calculated by the adder 95 and the divider 96 is outputted without amendment, thereby obtaining the result for the half-pel interpolation in the horizontal direction.

When half-pel interpolation is required in the horizontal and vertical directions, the average value for (X,Y) and (mod[(X+1/z],Y) calculated by the adder 95 and the divider 96 is added to the average value for (X,mod[(Y+1)/v]) and (mod[(X+1/z],mod[(Y+1)/v]) calculated by the adder 98 and the divider 99 and the result of this addition is divided by two, thereby obtaining the result for the half-pel interpolation in the horizontal and vertical directions.

1.10 Description of the Buffer B 16

The buffer B 16 has the same configuration as the buffer A 12, and when a reference picture in the forward direction has been read from the buffer A 12, the buffer B 16 stores the Y01 block, the Y23 block, the CbCr block, the Y02 block, and the Y13 block for the reference picture in the backward direction read from the memory access unit 11. When the result of half-pel interpolation or blending is obtained for the stored block, the buffer B 16 stores this result and outputs it to the memory access unit 11.

1.10.1 Positioning of the Buffer B 16

Within the Entire Image Decoding Apparatus In the timing chart of FIG. 6A, the Y01_b(r) read from the memory access unit 11 at timing t42, the Y23_b(r) read at timing t45, and the CbCr_b(r) read at timing t48 are all stored in the buffer B 16.

When the blending result has been calculated by the blend unit 29 at timing t82, this result is stored in the memory module 3. Similarly, the blending result has been calculated by the blend unit 29 at timing t84 and t86, these results are also stored in the memory module 3.

1.11 Periphery of the Buffer B 16

The write address generation unit 17 has the same configuration as the write address generation unit 13, so that when a Y01 block, Y23 block and CbCr block have been read from the SDRAM 32, the write address generation unit 17 generates the coordinates for the write address at which these luminance components and chrominance components should be written and outputs the generated coordinates to the buffer B 16.

The read address generation unit 18 has the same configuration as the read address generation unit 14 and outputs the X coordinate and Y coordinate of the read address coordinates that should be blended with the differences and outputs the generated coordinates to the buffer B 16.

The half-pel interpolation unit 19 has the same configuration as the half-pel interpolation unit 15, and performs half-pel interpolation in the horizontal direction, in the vertical direction, or in the vertical and horizontal directions on the Y01 block, the Y23 block, and the CbCr block stored in the buffer B16.

1.12 Description of the Buffer C 20

When luminance components or chrominance components for a block of 16 horizontal pixels by 8 vertical pixels or 8 horizontal pixels by 16 vertical pixels are outputted as a result of the half-pel interpolation performed by the half-pel interpolation unit 15, the outputted luminance components or chrominance components are written into the buffer C 20 at the X coordinates and Y coordinates generated by the read address generation unit 22. Later, when the differences that are to be blended with these luminance components and chrominance components are outputted by the buffer D 25, the buffer C 20 outputs the half-pel interpolation results it has hitherto been storing to the blend unit 29 in accordance with the X coordinate and Y coordinate generated by the read address generation unit 22 so that these results can be blended with the differences.

1.13 Configuration of the Read Address Generation Unit 22

Figure 24B:
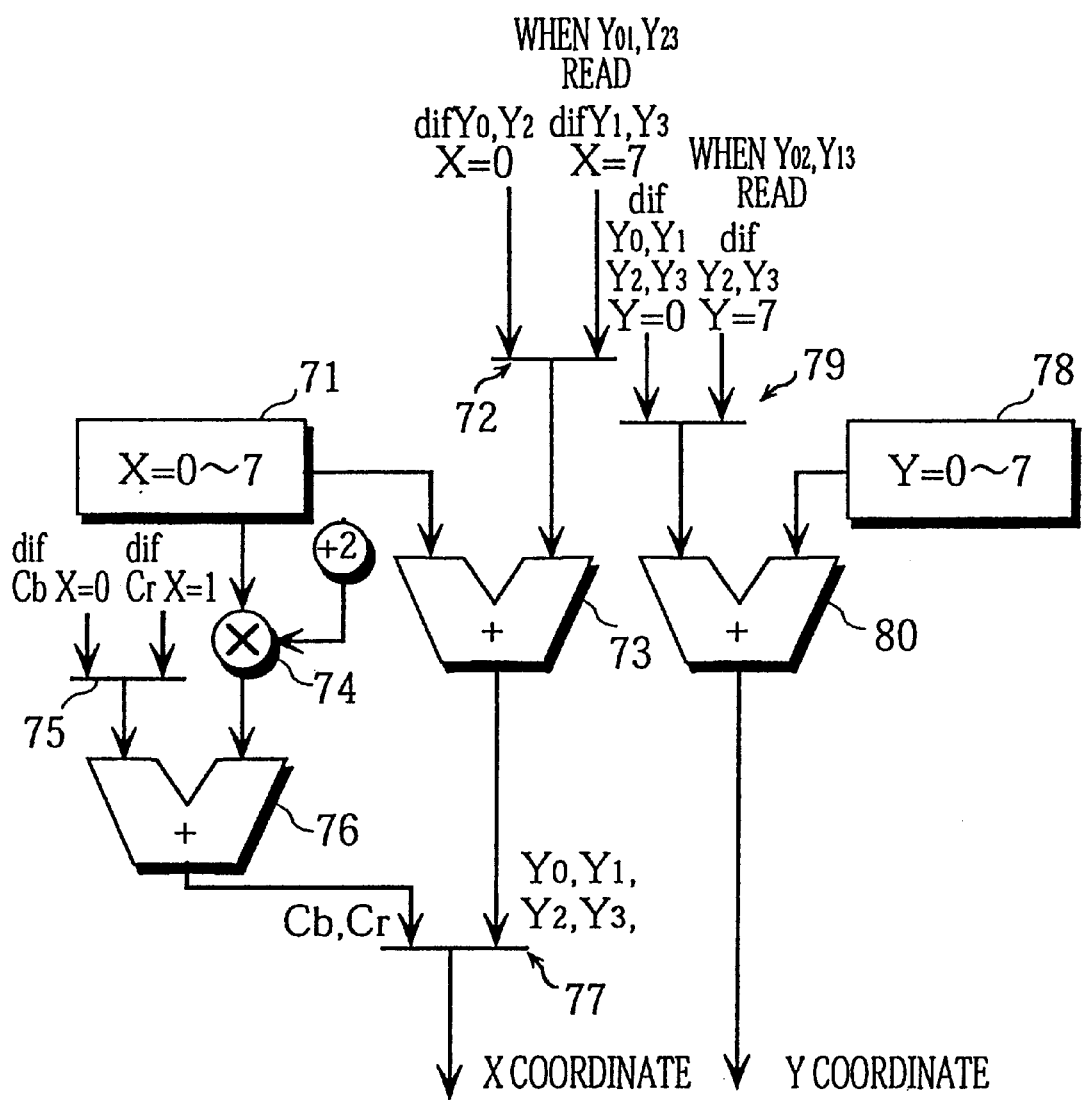
FIG. 24B shows the configuration of the read address generation unit 22.

FIG. 24B shows the configuration of the read address generation unit 22. As shown in FIG. 24B, the read address generation unit 22 is composed of an X counter 71, a selector 72, an adder 73, a multiplier 74, a selector 75, an adder 76, a selector 77, a Y counter 78, a selector 79, and an adder 80.

The X counter 71 counts a value between 0 and 7. This count value is incremented whenever a valid read has been performed from the SDRAM for a luminance component or a chrominance component. When the count value reaches its maximum value of "7" the Y counter 78 is informed that this count value of the X counter 71 has reached its maximum value.

The selector 72 outputs the first coordinate of the read address to the adder 73. Here, when half-pel interpolation is to be performed on the Y01 block, the Y23 block, Y02 block, the Y13 block, and the CbCr block, and the next differences to be blended are for one of the Y0 block, the Y1 block, the Y2 block, the Y3 block, the Cb block, or the Cr block, the selector 72 outputs the value "0" to the adder 73 as the first X coordinate for the read address or write address. When half-pel interpolation is to be performed for the Y01 block and the Y23 block and the next differences to be read are for the Y1 block or Y3 block, the selector 72 outputs "7" to the adder 73 as the first X coordinate for the read address and write address. The reason the selector 72 outputs "7" to the adder 73 as the first X coordinate in the latter case is that the Y1 block and the Y3 block that are read as reference pictures are positioned with the X coordinates "7" to "15" when the luminance components are read according to the pattern "Y01 block then Y23 block".

The adder 73 adds the X coordinate selectively outputted by the selector 72 as a read address or write address to the count value of the X counter 71.

The multiplier 74 multiplies the count value of the X counter 71 by the integer "2".

When the next difference to be blended is for the Cb block, the selector 75 outputs the value "0" to the adder 76 as the start X coordinate for the read or write. Conversely, when the next difference to be blended is for the Cr block, the selector 75 outputs the value "1" to the adder 76 as the start X coordinate for the read or write. The multiplier 74 multiplies the count value by "2", and the selector alternately outputs "0" and "1", so that the blue chrominance components and the red chrominance components in the CbCr block are respectively stored in odd-numbered addresses and even-numbered addresses.

The adder 76 adds the result of the multiplier 74 having multiplied the count value of the X counter 71 by "2" to the first coordinate outputted by the selector 75.

When the next difference to be blended is for the Cb block or the Cr block, the selector 77 outputs the output value of the adder 76 as the X coordinate, while when the next difference to be blended is one of the Y0 block, the Y1 block, the Y2 block, or the Y3 block, the selector 77 outputs the output value of the adder 73 as the X coordinate.

The Y counter 78 counts a value between 0 and 7 which is incremented every time the X counter 71 reaches its maximum value. The count number of this Y counter 78 is used when performing a valid read of a luminance component or a chrominance component from the SDRAM.

The selector 79 outputs a first coordinate of a read address or a write address to the adder 80. When half-pel interpolation is performed for the Y01 block, the Y23 block, the Y02 block, the Y13 block, or the CbCr block and the next difference to be blended is for the Y0 block, the Y1 block, the Y2 block, the Y3 block, the Cb block, or the Cr block, the selector 79 outputs "0" to the adder 80 as the first Y coordinate for the read address and write address. Conversely, when half-pel interpolation is performed for the Y02 block and the Y13 block and the next differences to be read are for the Y2 block or Y3 block, the selector 79 outputs "7" to the adder 80 as the first Y coordinate for the read address and write address. The reason the selector 79 outputs "7" to the adder 80 as the first Y coordinate in the latter case is that the Y2 block and the Y3 block that are read as reference pictures are positioned with the Y coordinates "7" to "15" when the luminance components are read according to the pattern Y02 block then Y13 block.

The adder 80 adds the Y coordinate selectively outputted by the selector 79 as a read address and write address to the count value of the Y counter 78.

1.14 Description of the Buffer D 25

The buffer D 25 stores the differences for the Y0 block, Y1 block, Y2 block, Y3 block, Cb block, or Cr block that get transferred from the pixel calculation unit 7 via the buffer 201. When the half-pel interpolation unit 15 has performed half-pel interpolation for the Y01 block, the Y23 block, and the CbCr block stored in the buffer A 12 and the buffer B 16, the buffer D 25 outputs the luminance components and chrominance components for the 8 horizontal pixels by 8 vertical pixels that compose the differential picture that it has hitherto stored to the blend unit 29 in accordance with the X coordinate and Y coordinate indicated by the read address generation unit 26.

1.15 Configuration of the Read Address Generation Unit 26

The read address generation unit 26 is composed of an X counter 27 and a Y counter 28. When luminance components are outputted from the buffer A 12 and half-pel interpolation is commenced for these luminance components, the read address generation unit 26 outputs read address coordinates to the buffer C 20 for reading the differences stored in the buffer D 25.

The X counter 27 increments the X coordinate within the range "0" to "7" when a luminance block and chrominance block have been read out of the reference picture in the SDRAM 31.

The Y counter 28 increments the Y coordinate within the range "0" to "7" when a luminance block and chrominance block have been read out of the reference picture in the SDRAM 31.

1.16 Description of the Blend Unit 29

The blend unit 29 blends the differences stored in the buffer D 25 with the results of the half-pel interpolation by the half-pel interpolation unit 15 and half-pel interpolation unit 19 that have been stored in the buffer C 20 and outputs the results of the blending to the selector 30.

If the differential picture is a P picture, when the half-pel interpolation has been executed on reference picture in the backward direction by the half-pel interpolation unit 15 and the results stored in the buffer C 20, the blend unit 29 blends the differences stored in the buffer D 25 with the Y01 block, the Y23 block, the CbCr block, the Y02 block, and the Y13 block that have been subjected to half-pel interpolation by the half-pel interpolation unit 15 and outputs the blended results to the buffer B 16.

If the differential picture is a B picture, when the half-pel interpolation has been performed on the reference picture in the forward direction by the half-pel interpolation unit 15 and the results stored in the buffer C 20, the blend unit 29 blends the differences stored in the buffer D 25 with the reference picture that has been subjected to half-pel interpolation by the half-pel interpolation unit 15 and stores the results in the buffer C 20. When the reference picture in the backward direction has been read, subjected to half-pel interpolation and stored in the buffer C 20, the blend unit 29 blends the result of the previous blending which is stored in the buffer C 20 with the reference picture in the forward direction and outputs the result to the selector 30.

1.16 Positioning of the Blend Unit 29 within the Entire Image Decoding Apparatus When half-pel interpolation has been performed by the half-pel interpolation unit 15 at timing t71 in the timing chart of FIG. 6A, at timing t81 the blend unit 29 blends the result of the half-pel interpolation by the half-pel interpolation unit 15 with the Y0 block that was stored at timing t61.

When the half-pel interpolation unit 15 has performed half-pel interpolation at timing t72, at timing t82 the blend unit 29 blends the result of half-pel interpolation by the half-pel interpolation unit 15 with the Y0 block that was stored at timing t62. The blend unit 29 outputs the result to the buffer B 16.

The selector 30 switches the destination of the output of the blend unit 29 so that the output is stored in the buffer C 20 when the blend unit 29 has blended the result of the half-pel interpolation stored in the buffer C 20 and the differences stored in the buffer D 25. Conversely, when the blend unit 29 has blended the blending result stored in the buffer C 20 with the differences stored in the buffer D 25, the selector 30 switches the destination of the output of the blend unit 29 so that the output is stored in the buffer B 16.

Figure 27:
FIG. 27 shows which luminance components are read out of the luminance components of the Y01 block and the Y23 block by the write address generation unit 80 and how half-pel interpolation is performed.

1.17 Operation of the Half-pel interpolation Unit 15 and the Blend Unit 29 During Half-pel interpolation The following is an explanation of the processing by the half-pel interpolation unit 15 when it reads a Y01 block composed of 17 horizontal pixels by 9 vertical pixels, with reference to FIG. 27.

When the X counter 91 outputs the value X=0 and the Y counter 92 outputs the value Y=0 in phase w0, the value X=1(=mod[(1+0)/17]) is outputted by the MOD calculator 93 and the value Y=1(mod[(1+0)/9] is outputted by the MOD calculator 94. As a result, the luminance components Y01(0,0), Y01(1,0), Y01(0,1), and Y01(1,1) are outputted from the buffer A 12 and an average of these values is calculated by the half-pel interpolation unit 15. Meanwhile, when the X counter 27 and the Y counter 28 output the values X coordinate=0 and Y coordinate=0 to the buffer D 25 as the read address for the calculation result of the half-pel interpolation unit 15, the difference for the luminance component for Y01(0,0) will be added to the calculation result of the half-pel interpolation unit 15 by the blend unit 29. The X counter 27 and the Y counter 28 output the values X coordinate=0 and Y coordinate=0 to the buffer D 25 as the write address for calculation result of the half-pel interpolation unit 15 and the result of the addition by the blend unit 29 is stored in the buffer C 20 as the luminance component of Y01(0,0).

When the X counter 91 outputs the value X=1 and the Y counter 92 outputs the value Y=0 in phase w1, the MOD calculator 93 outputs the value X=2(=mod[(1+1)/17]) and the MOD calculator 94 outputs the value Y=1(=mod[(1+0)]/9) As a result, the luminance components Y01(1,0), Y01(2, 0), Y01(1,1), and Y01(2,1) are outputted from the buffer A 12 and an average of these values is calculated by the half-pel interpolation unit 15. Meanwhile, when the luminance component for the coordinates Y01(1,0) in the difference picture is read as a result of the calculations by the X counter 27 and the Y counter 28, the difference for the luminance component for Y0(1,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=2 and the Y counter 92 outputs the value Y=0 in phase w2, the value X=3(=mod[(1+2)/17]) is outputted by the MOD calculator 93 and the value Y=1(mod[(1+0)/9] is outputted by the MOD calculator 94. As a result, the luminance components Y01(2,0), Y01(3,0), Y01(2,1), and Y01(3,1) are outputted from the buffer A 12 and an average of these values is calculated by the half-pel interpolation unit 15. Meanwhile, when the luminance component for the coordinates Y01(2,0) in the difference picture is read as a result of the calculations by the X counter 27 and the Y counter 28, the difference for the luminance component for Y0(2,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=3 and the Y counter 92 outputs the value Y=0 in phase w3, the value X=4(=mod[(1+3)/17]) is outputted by the MOD calculator 93 and the value Y=1(mod[(1+0)/9] is outputted by the MOD calculator 94. As a result, the luminance components Y01(3,0), Y01(4,0), Y01(3,1), and Y01(4,1) are outputted from the buffer A 12 and an average of these values is calculated by the half-pel interpolation unit 15. Meanwhile, when the luminance component for the coordinates Y01(3,0) in the difference picture is read as a result of the calculations by the X counter 27 and the Y counter 28, the difference for the luminance component for Y0(3,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=4 and the Y counter 92 outputs the value Y=0 in phase w4, the value X=5(=mod[(1+4)/17]) is outputted by the MOD calculator 93 and the value Y=1(mod[(1+0)/9] is outputted by the MOD calculator 94. As a result, the luminance components Y01(4,0), Y01(5,0), Y01(4,1), and Y01(5,1) are outputted from the buffer A 12 and an average of these values is calculated by the half-pel interpolation unit 15. Meanwhile, when the luminance component for the coordinates Y01(4,0) in the difference picture is read as a result of the calculations by the X counter 27 and the Y counter 28, the difference for the luminance component for Y0(4,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

The above process is repeated while the X counter 91 outputs X=5,6,7,8,9,10,11,12,13 as its count value.

When the X counter 91 outputs the value X=14 and the Y counter 92 outputs the value Y=0 in phase w14, the value X=15(=mod[(1+14)/17]) is outputted by the MOD calculator 93 and the value Y=1(mod[(1+0)/9] is outputted by the MOD calculator 94. As a result, the luminance components Y01(14,0), Y01(15,0), Y01(14,1), and Y01(15,1) are outputted from the buffer A 12 and an average of these values is calculated by the half-pel interpolation unit 15. Meanwhile, when the luminance component for the coordinates Y01(14,0) in the difference picture is read as a result of the calculations by the X counter 27 and the Y counter 28, the difference for the luminance component for Y0(3,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=15 and the Y counter 92 outputs the value Y=0 in phase w15, the value X=16(=mod[(1+15)/17]) is outputted by the MOD calculator 93 and the value Y=1(mod[(1+0)/9] is outputted by the MOD calculator 94. As a result, the luminance components Y01(15,0), Y01(16,0), Y01(15,1), and Y01(16,1) are outputted from the buffer A 12 and an average of these values is calculated by the half-pel interpolation unit 15. Meanwhile, when the luminance component for the coordinates Y01(15,0) in the difference picture is read as a result of the calculations by the X counter 27 and the Y counter 28, the difference for the luminance component for Y0(15,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

The above process is repeated while the Y counter 92 outputs the values Y=1,2,3,4,5,6,7 as its count value.

When the X counter 91 outputs the value X=14 and the Y counter 92 outputs the value Y=7 in phase w16, the value X=15(=mod[(1+14)/17]) is outputted by the MOD calculator 93 and the value Y=8(mod[(1+7)/9] is outputted by the MOD calculator 94. As a result, the luminance components Y01(14,7), Y01(15,7), Y01(14,8), and Y01(15,8) are outputted from the buffer A 12 and an average of these values is calculated by the half-pel interpolation unit 15. Meanwhile, when the luminance component for the coordinates Y01(14,7) in the difference picture is read as a result of the calculations by the X counter 27 and the Y counter 28, the difference for the luminance component for Y0(14,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=15 and the Y counter 92 outputs the value Y=7 in phase w17, the value X=16(=mod[(1+15)/17]) is outputted by the MOD calculator 93 and the value Y=8(mod[(1+7)/9] is outputted by the MOD calculator 94. As a result, the luminance components Y01(15,7), Y01(16,7), Y01(15,8), and Y01(16,8) are outputted from the buffer A 12 and an average of these values is calculated by the half-pel interpolation unit 15. Meanwhile, when the luminance component for the coordinates Y01(15,7) in the difference picture is read as a result of the calculations by the X counter 27 and the Y counter 28, the difference for the luminance component for Y0(15,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When half-pel interpolation has been performed for 17 horizontal pixels by 8 vertical pixels, the 17 horizontal pixels by 8 vertical pixels of the Y23 block are stored in the buffer A 12. It should be noted here that since the Y01 block has a size of 17 horizontal pixels by 9 vertical pixels, the luminance components on the ninth row will not be overwritten and so will remain in the buffer A 12.

When the X counter 91 outputs the value X=12 and the Y counter 92 outputs the value Y=8 in phase w18, the value X=13(=mod[(1+12)/17]) is outputted by the MOD calculator 93 and the value Y=0(mod[(1+8)/9] is outputted by the MOD calculator 94. As a result, the luminance components Y01(12,8), Y01(13,8), Y23(12,0), and Y23(13,0) are outputted from the buffer A 12 and an average of these values is calculated by the half-pel interpolation unit 15. Meanwhile, when the luminance component for the coordinates Y23(12,0) in the difference picture is read as a result of the calculations by the X counter 27 and the Y counter 28, the difference for the luminance component for Y23(12,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=13 and the Y counter 92 outputs the value Y=8 in phase w19, the value X=14(=mod[(1+13)/17]) is outputted by the MOD calculator 93 and the value Y=0(mod[(1+8)/9] is outputted by the MOD calculator 94. As a result, the luminance components Y01(13,8), Y01(14,8), Y23(13,0), and Y23(14,0) are outputted from the buffer A 12 and an average of these values is calculated by the half-pel interpolation unit 15. Meanwhile, when the luminance component for the coordinates Y23(13,0) in the difference picture is read as a result of the calculations by the X counter 27 and the Y counter 28, the difference for the luminance component for Y23(13,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=14 and the Y counter 92 outputs the value Y=8 in phase w20, the value X=15(=mod[(1+14)/17]) is outputted by the MOD calculator 93 and the value Y=0(mod[(1+8)/9] is outputted by the MOD calculator 94. As a result, the luminance components Y01(14,8), Y01(15,8), Y23(14,0), and Y23(15,0) are outputted from the buffer A 12 and an average of these values is calculated by the half-pel interpolation unit 15. Meanwhile, when the luminance component for the coordinates Y23(14,0) in the difference picture is read as a result of the calculations by the X counter 27 and the Y counter 28, the difference for the luminance component for Y23(14,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=15 and the Y counter 92 outputs the value Y=8 in phase w21, the value X=16(=mod[(1+15)/17]) is outputted by the MOD calculator 93 and the value Y=0(mod[(1+8)/9] is outputted by the MOD calculator 94. As a result, the luminance components Y01(15,8), Y01(16,8), Y23(15,0), and Y23(16,0) are outputted from the buffer A 12 and an average of these values is calculated by the half-pel interpolation unit 15. Meanwhile, when the luminance component for the coordinates Y23(15,0) in the difference picture is read as a result of the calculations by the X counter 27 and the Y counter 28, the difference for the luminance component for Y23(15,0) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=12 and the Y counter 92 outputs the value Y=0 in phase w22, the value X=13(=mod[(1+12)/17]) is outputted by the MOD calculator 93 and the value Y=1(mod[(1+0)/8] is outputted by the MOD calculator 94. As a result, the luminance components Y23(12,0), Y23(13,0), Y23(12,1), and Y23(13,1) are outputted from the buffer A 12 and an average of these values is calculated by the half-pel interpolation unit 15. Meanwhile, when the luminance component for the coordinates Y23(12,1) in the difference picture is read as a result of the calculations by the X counter 27 and the Y counter 28, the difference for the luminance component for Y23(12,1) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=13 and the Y counter 92 outputs the value Y=0 in phase w23, the value X=14(=mod[(1+13)/17]) is outputted by the MOD calculator 93 and the value Y=1(mod[(1+0)/8] is outputted by the MOD calculator 94. As a result, the luminance components Y23(13,0), Y23(14,0), Y23(13,1), and Y23(14,1) are outputted from the buffer A 12 and an average of these values is calculated by the half-pel interpolation unit 15. Meanwhile, when the luminance component for the coordinates Y23(13,1) in the difference picture is read as a result of the calculations by the X counter 27 and the Y counter 28, the difference for the luminance component for Y23(13,1) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=14 and the Y counter 92 outputs the value, Y=0 in phase w24, the value X=15(=mod[(1+14)/17]) is outputted by the MOD calculator 93 and the value Y=1(mod[(1+0)/8] is outputted by the MOD calculator 94. As a result, the luminance components Y23(14,0), Y23(15,0), Y23(14,1), and Y23(15,1) are outputted from the buffer A 12 and an average of these values is calculated by the half-pel interpolation unit 15. Meanwhile, when the luminance component for the coordinates Y23(14,1) in the difference picture is read as a result of the calculations by the X counter 27 and the Y counter 28, the difference for the luminance component for Y23(14,1) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=12 and the Y counter 92 outputs the value Y=6 in phase w25, the value X=13(=mod[(1+12)/17]) is outputted by the MOD calculator 93 and the value Y=7(mod[(1+6)/8]) is outputted by the MOD calculator 94. As a result, the luminance components Y23(12,6), Y23(13,6), Y23(12,7), and Y23(13,7) are outputted from the buffer A 12 and an average of these values is calculated by the half-pel interpolation unit 15. Meanwhile, when the luminance component for the coordinates Y23(12,7) in the difference picture is read as a result of the calculations by the X counter 27 and the Y counter 28, the difference for the luminance component for Y23(12,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=13 and the Y counter 92 outputs the value Y=6 in phase w26, the value X=14(=mod[(1+13)/17]) is outputted by the MOD calculator 93 and the value Y=7(mod[(1+6)/8] is outputted by the MOD calculator 94. As a result, the luminance components Y23(13,6), Y23(14,6), Y23(13,7), and Y23(14,7) are outputted from the buffer A 12 and an average of these values is calculated by the half-pel interpolation unit 15. Meanwhile, when the luminance component for the coordinates Y23(13,7) in the difference picture is read as a result of the calculations by the X counter 27 and the Y counter 28, the difference for the luminance component for Y23(13,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=14 and the Y counter 92 outputs the value Y=6 in phase w27, the value X=15(=mod[(1+14)/17]) is outputted by the MOD calculator 93 and the value Y=7(mod[(1+6)/8] is outputted by the MOD calculator 94. As a result, the luminance components Y23(14,6), Y23(15,6), Y23(14,7), and Y23(15,7) are outputted from the buffer A 12 and an average of these values is calculated by the half-pel interpolation unit 15. Meanwhile, when the luminance component for the coordinates Y23(14,7) in the difference picture is read as a result of the calculations by the X counter 27 and the Y counter 28, the difference for the luminance component for Y23(14,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

When the X counter 91 outputs the value X=15 and the Y counter 92 outputs the value Y=6 in phase w28, the value X=16(=mod[(1+15)/17]) is outputted by the MOD calculator 93 and the value Y=7(mod[(1+6)/8] is outputted by the MOD calculator 94. As a result, the luminance components Y23(15,6), Y23(16,6), Y23(15,7), and Y23(16,7) are outputted from the buffer A 12 and an average of these values is calculated by the half-pel interpolation unit 15. Meanwhile, when the luminance component for the coordinates Y23(15,7) in the difference picture is read as a result of the calculations by the X counter 27 and the Y counter 28, the difference for the luminance component for Y23(15,7) will be added to the calculation result of the half-pel interpolation unit 15 by the blend unit 29. The X counter 27 and the Y counter 28 output the same values to the buffer D 25 as the write address for calculation result of the half-pel interpolation unit 15, and the result of the addition by the blend unit 29 is stored in the buffer C 20 as the luminance component for the same coordinates.

As a result of the half-pel interpolation by the half-pel interpolation unit 15 described above, the luminance components included in the Y01 block are generated using an average value calculated from the present luminance component, the luminance component to the right, the luminance component below, and the luminance component below and to the right. The luminance components included in the Y23 block are generated using an average of the present luminance component, the luminance component to the right, the luminance component directly above, and the luminance component above and to the right.

1.18 Generation Method when Performing Half-pel Interpolation in the Vertical Direction and the Horizontal Direction FIG. 28A shows how the luminance components in the Y01 block are generated when half-pel interpolation is performed in the vertical direction and the horizontal direction.

The luminance component at (0,0) in the Y01 block (shown by the hatching in FIG. 28A) is generated using the average value of the luminance components enclosed by the same frame as (0,0), which is to say, the luminance component Y(1,0) positioned to the right, the luminance component Y(0,1) positioned below, and the luminance component Y(1,1) positioned below and to the right. The luminance component Y(2,1) in the Y01 block, meanwhile, is generated using the average value of the luminance component Y(2,1) itself, the luminance component to the right Y(3,1), the luminance component below Y(2,2), and the luminance component Y(3,2) below and to the right.

The luminance component Y(0,0) in the Y23 block is generated using the average value of the luminance component Y(0,0) itself, the luminance component Y(1,0) to the right, the luminance component Y(0,8) in the Y01 block which is directly above, and the luminance component Y(1,8) in the Y01 block which is above and to the right.

The luminance component Y(2,1) in the Y23 block is generated using the average value of the luminance component Y(2,1) itself, the luminance component Y(3,1) to the right, the luminance component Y(2,0) positioned directly above, and the luminance component Y(3,0) positioned above and to the right.

In the half-pel interpolation performed by the half-pel interpolation unit 15, the luminance components included in the Y02 block are calculated using the average values of the luminance components themselves, the luminance component positioned to the right, the luminance component below, and the luminance component below and to the right. The luminance components included in the Y13 block, meanwhile, are generated using the average values of the luminance components themselves, the luminance component to the left, the luminance component directly below, and the luminance component below and to the left.

FIG. 28B shows the pixel values for which an average value is calculated when the luminance components included in the Y02 block are generated when half-pel interpolation is performed in the horizontal and vertical directions.

The luminance component for the coordinates (0,0) in the Y02 block (shown by the hatching in FIG. 28B), is generated using the average value of the luminance components enclosed by the same frame as (0,0), which is to say, the luminance component (0,0) itself, the luminance component Y(1,0) positioned to the right, the luminance component Y(0,1) positioned below, and the luminance component Y(1,1) positioned below and to the right. The luminance component Y(2,2) in the Y02 block, meanwhile, is generated using the average value of the luminance component Y(2,2) itself, the luminance component to the right Y(3,2), the luminance component below Y(2,3), and the luminance component Y(3,3) below and to the right.

The luminance component for the coordinates (0,0) in the Y13 block is generated using the average value of the luminance component (0,0) itself, the luminance component Y02(8,0) positioned to the left, the luminance component Y13(0,1) directly below, and the luminance component Y02(8,1) positioned below and to the left.

The luminance component for the coordinates (1,2) in the Y13 block is generated using the average value of the luminance component itself, the luminance component Y(0, 2) positioned to the left, the luminance component Y(1,3) below, and the luminance component Y(0,3) below and to the left.

1.19 Significance of the Selector 34

The selector 34 forms a detour so that the buffer D 25 can be skipped when a Y2 block whose differences have been encoded in field units is outputted from the pixel calculation unit 7.

Figure 6B:
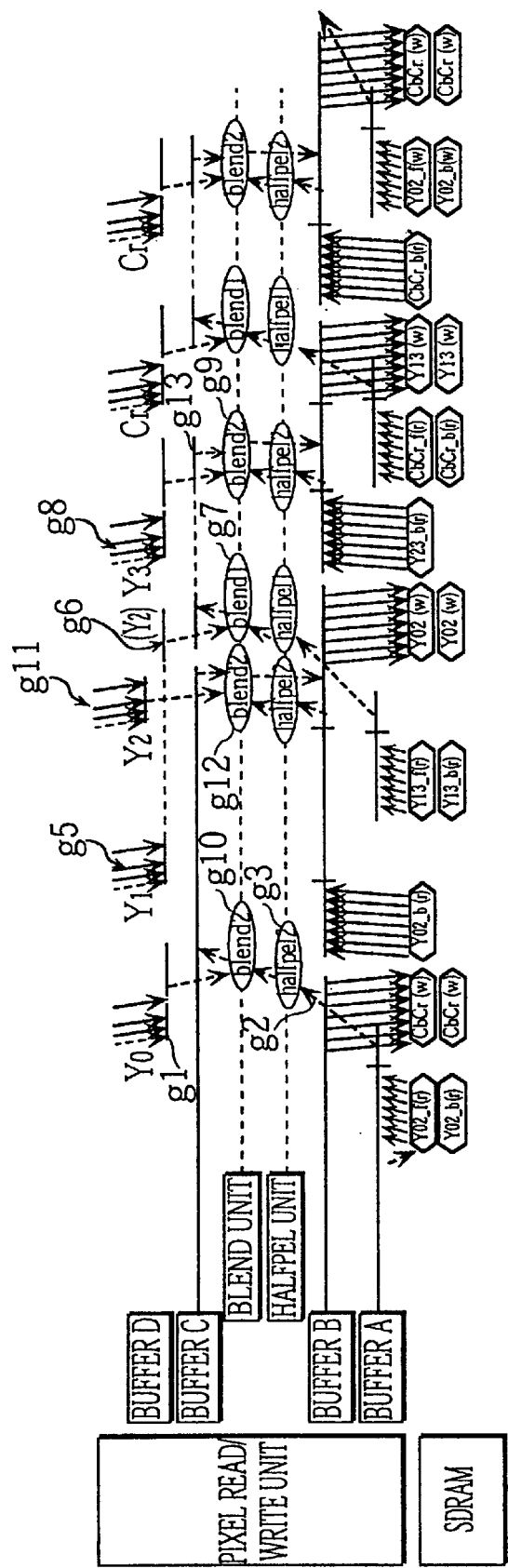
FIG. 6B is a timing chart for the entire image decoding apparatus when a differential image is expressed in field units.

This detour is provided for the Y0 block so that when differences given in field units are read, the processing for the buffer A 12, the buffer B 16, the buffer C 20, and the buffer D 25 will be slightly different to that explained above. FIG. 6B is a timing chart that shows the processing content of the buffer A 12, the buffer B 16, the buffer C 20, and the buffer D 25 when differences given in field units are read. The processing of the buffer A 12, the buffer B 16, the buffer C 20, and the buffer D 25 in this case will be explained with reference to this timing chart.

As shown in FIG. 6B, when a Y0 block whose differences have been encoded in field units is outputted from the pixel calculation unit 7, the buffer D 25 stores this block at timing g1. Next, at timing g2, the Y02 block of the reference picture is read and at timing g3 half-pel interpolation is performed on the read Y02 block, with the result of the half-pel interpolation being outputted to the blend unit 29 so that it can be blended with the Y0 block.

When a Y1 block whose differences have been encoded in field units is outputted from the pixel calculation unit 7 at timing g5, this block is stored in the buffer D 25. This Y1 block of differences is stored by the buffer D 25 until half-pel interpolation has been performed for the Y13 block read as the reference picture at timing g6. When half-pel interpolation has been completed for the Y13 block, the buffer D 25 outputs the Y1 block of differences that it has been storing to the blend unit 29 and at timing g7 the Y1 block and the result of the half-pel interpolation on the Y13 block are blended by the blend unit 29.

When a Y3 block whose differences have been encoded in field units is outputted from the pixel calculation unit 7 at timing g8, this block is stored in the buffer D 25. At timing g9, when the Y1 block and the result of the half-pel interpolation on the Y13 block have been blended by the blend unit 29, the Y3 block is outputted so that it can be blended with this blending result.

The blending result of the blend unit 29 for the Y0 block and the result of the half-pel interpolation on the Y02 block at timing g10 is stored in the buffer C 20.

The differences for the Y2 block which have been encoded in field units are outputted at timing g11 skipping out the buffer D 25, and the result of the half-pel interpolation result for the Y02 block and the Y0 block are outputted to the blend unit 29. At timing g12 the Y02 block and the differences for the Y2 block are blended. The Y02 block outputted to the blend unit 29 here has already been blended with the Y0 block, and when this is blended with the differences of the Y2 block, the final blending result for the Y02 block is achieved. The blending result for the Y02 block obtained in this way is outputted to the buffer B 16 and is written into the memory module 3 by the buffer B 16.

The buffer C 20 stores the result of the blending by the blend unit 29 of Y1 block and the half-pel interpolation result for the Y13 block that is performed at timing g7. At timing g8, once the Y3 block whose differences have been encoded in field units has been stored in the buffer D 25, the blending result of the blend unit 29 for the Y13 block is outputted at timing g13 so that the Y3 block can be blended with the Y13 block. The Y13 block outputted by the blend unit 29 here will have already been blended with the Y1 block, so that once this Y13 block is blended with the Y3 block, the final blending result for the Y13 block is obtained. The blending result for the Y13 block obtained here is outputted to the buffer B 16 which then writes the Y13 block into the memory module 3.

By means for the present embodiment, the blue chrominance components and the red chrominance components included in a pixel block will be stored from a first region to a final region specified by the same row address, so that if the read length is specified from this first region and burst reads, where the content of the memory is read in bursts, are performed, the blue chrominance components and the red chrominance components can be read together. If the blue chrominance components and the red chrominance components are read together, then a reference picture can be read in a total of two burst reads composed of a burst read for the chrominance components and a burst read for the luminance components. This means that the number of burst reads can be reduced to a number that is proportionate to two reads of the reference picture. As one example, when close to 30 reads of a reference picture are performed in one second, the influence of the delay tRCD between the issuance of a row address and the issuance of a column address can be remarkably reduced.

When it becomes necessary to individually read a reference picture from a page that has been mapped into another bank, the overlapping parts with the greater width are set earlier in the read order, so that while the luminance components for this greater width are being read from one page, the other bank can be activated in parallel, so that the delays caused in the decode processing by the activation of a bank can be avoided.

When one row and one column of luminance components and chrominance components are required for performing half-pel interpolation, these components will be read in separate read operations. The read areas for the reads are set to include one row or one column extra, so that if there is a buffer the size of the pixel block, there will be sufficient capacity for storing the luminance components and chrominance components required by the half-pel interpolation.

Second Embodiment

In the second embodiment, the word length of the SDRAM in two bytes, so that when the luminance components, blue chrominance components, and red chrominance components are each 1 byte long, luminance components, blue chrominance components, and red chrominance components for two pixels can be stored in one word in the SDRAM.

The storage method for luminance components in this second embodiment is shown in FIG. 29A, while the storage method for chrominance components is shown in FIG. 29B. Of special note in FIG. 29A is the storage method for two luminance components in a region of word length composed of one column address in one page. As examples, the luminance components for Y(0,0) and Y(1,0) are stored in the column address 000000_0000, while the luminance components for Y(2,0) and Y(3,0) are stored in column address 000000_0001.

Of special note in FIG. 29B is that a pair of a blue chrominance component and a red chrominance component for the same coordinates are stored in a region of word length composed of one column address in one page. As examples, the blue chrominance component Cb(0,0) and the red chrominance component Cr(0,0) are stored in the column address 000000_0000 and the blue chrominance component Cb(1,0) and the red chrominance component Cr(1,0) are stored in the column address 000000_0001.

Figure 30A:
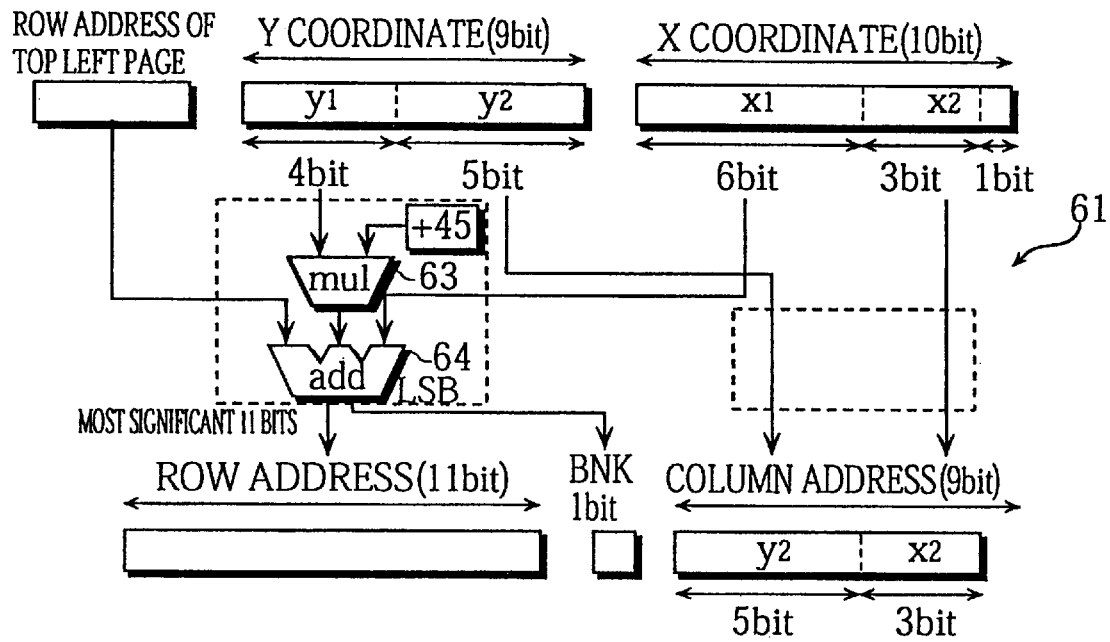
FIG. 30A shows the configuration of the luminance address encoder 61 in the second embodiment.
Figure 30B:
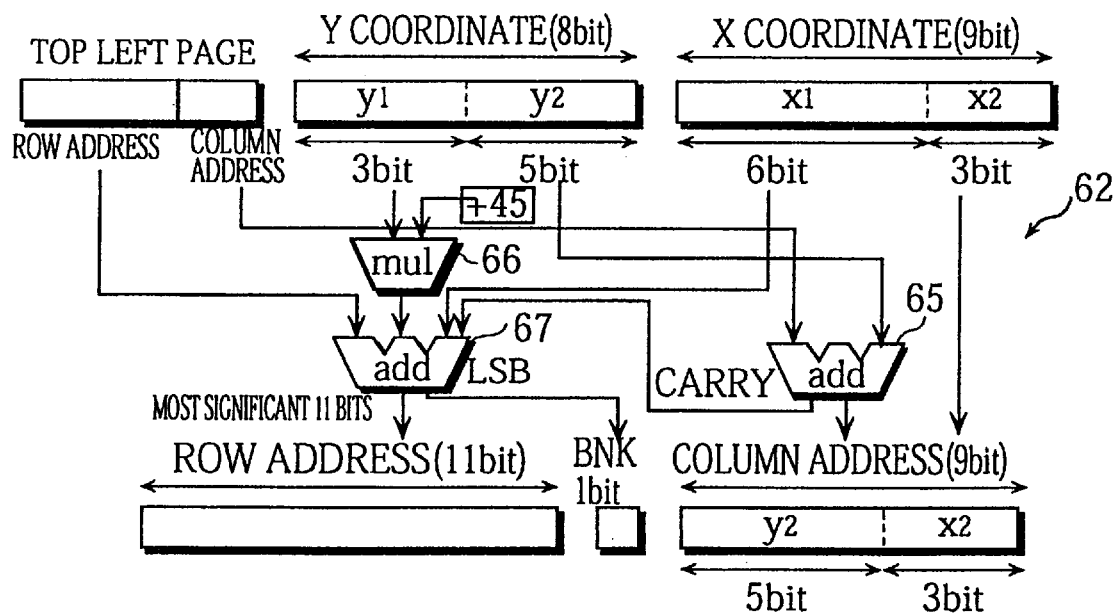
FIG. 30B shows the configuration of the chrominance address encoder 62 in the second embodiment.

In this second embodiment, since two luminance components or a pair of a blue chrominance component and a red chrominance component are stored in a region of one word length, the luminance address encoder 61 and the chrominance address encoder 62 are configured as shown in FIGS. 30A and 30B. As shown in FIG. 30A, the luminance address encoder 61 has been amended so that the column address is created using the three bits from the second bit to the fourth bit of the X coordinate.

As shown in FIG. 30B, the chrominance address encoder 62 has been amended so that the $0^{th}$ bit is no longer used to distinguish between blue chrominance components and red chrominance components and that the X coordinate of blue chrominance components and red chrominance components is expressed as the $0^{th}$ bit to 3rd bit.

The compensation control unit 10 is also amended in this second embodiment so that one of the following read areas is used depending on whether the coordinates for the top left vertex are an even number or an odd number.
(1) When the Processing is for Frame Units
(1-1) Top left vertex of the reference picture is an even number
   No half-pel interpolation in horizontal direction
     →16 horizontal pixels by 8 vertical pixels
   Half-pel interpolation performed in horizontal direction
     →18 horizontal pixels by 8 vertical pixels
(1-2) Top left vertex of the reference picture is an odd number
   No half-pel interpolation in horizontal direction
     →18 horizontal pixels by 8 vertical pixels
   Half-pel interpolation performed in horizontal direction
     →20 horizontal pixels by 8 vertical pixels
(2) When the Processing is for Field Units
(2-1) Top left vertex of the reference picture is an even number
   No half-pel interpolation in horizontal direction
     →8 horizontal pixels by 16 vertical pixels
   Half-pel interpolation performed in horizontal direction
     →10 horizontal pixels by 16 vertical pixels
(2-2) Top left vertex of the reference picture is an odd number
   No half-pel interpolation in horizontal direction
     →10 horizontal pixels by 8 vertical pixels
   Half-pel interpolation performed in horizontal direction
     →12 horizontal pixels by 8 vertical pixels When half-pel interpolation is performed in the horizontal direction in (1-1), the read area is set at 18 horizontal pixels by 8 vertical pixels since an extra column of luminance components is required in the half-pel interpolation. Here, while only one extra column of luminance components needs to be read, it is not possible in the second embodiment to read only one column of luminance components due to two luminance components being stored in a one-word region. As a result, two extra columns of luminance components are read. The reason the read region is two pixels (18-16) wider than when half-pel interpolation is not performed in the horizontal direction is that two extra pixels are read to enable half-pel interpolation to be performed.

In (1-2) the reason the read region is set as 18 horizontal pixels by 8 vertical pixels when the coordinates of the top left vertex are an odd number are as follows. When the coordinates of the top left vertex are an odd number and sixteen pixels are read starting from this top left vertex, the read start position needs to be set at the even number coordinates to the left of the top left vertex due to the way in which two pixels are stored in a one word region. Similarly, the read end position will end up as the even number coordinates to the right of the odd number coordinates of the top right vertex. When the read start position coordinates are set at the even number coordinates to the left of the top left vertex, the read area is increased by "1", and since the read end position coordinates are the even number coordinates to the right of the top right vertex, the read area is further increased by "1".

Since the read start position and the read end position both end up one pixel outside the reference picture, the read area will be 18 horizontal pixels by 8 vertical pixels.

In (1-2), since the coordinates of the top left vertex of the reference picture are odd and half-pel interpolation is required in the horizontal direction, the read area will be set at 20 horizontal pixels by 8 vertical pixels since it is necessary to perform a read for 19 horizontal pixels by 8 vertical pixels. The reason it is necessary to perform a read for 19 horizontal pixels by 8 vertical pixels is that the read start position and the read end position both end up one pixel outside the reference picture, which each cause an increase of "1" to the width of the read area, and that half-pel interpolation is required in the horizontal direction, meaning that a further increase of "1" is required for the width of the read area. While only 19 horizontal pixels by 8 vertical pixels need to be read, two luminance components are stored in a one-word region of the SDRAM in this second embodiment, so that the read area ends up being 20 horizontal pixels by 8 vertical pixels in size.

With this second embodiment, the word length of the SDRAM is set at two bytes and the luminance components, blue chrominance components, and red chrominance components are each one byte in length, so that two luminance components or a pair of a blue chrominance component and a red chrominance component can be stored in one word in the SDRAM.

INDUSTRIAL FIELD OF APPLICATION

The present invention can be favorably used in a reproduction apparatus that is used for the reproduction of compressed video data, such as a digital video disc player or a receiver for digital satellite broadcasts.

What is claimed is:
1. An image decoding apparatus equipped with an image memory that stores a one-screen image by dividing the one-screen image into a plurality of image blocks which are each m pixels wide by n pixels high (where m,n are integers that are equal to or greater than 1), the image memory having an array-like storage region storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the same row address and a second column address, and storing m*n luminance components that compose the same one of the image blocks in a second set of serial areas from a different start area specified by a different row address and a third column address to an end area are specified by the different row address and a fourth column address, the image decoding apparatus comprising:
  differential picture decoding means for decoding a stream inputted from outside to obtain a differential picture and motion vectors;
  memory access means for reading all of the first chrominance components and all of the second chrominance components that compose a reference picture that is to be blended with the differential picture from the first serial areas and for reading all of the luminance components from the second serial areas; and
  blending means for blending the first chrominance components, the second chrominance components, and the luminance components read from the serial areas with the differential picture.

2. The image decoding apparatus of claim 1,
wherein s*t first chrominance components that compose an image block are stored in even-numbered storage locations in the first serial area specified by the row address, and s*t second chrominance components that compose the same image block are stored in odd-numbered storage locations in the same first serial areas.

3. The image decoding apparatus of claim 2,
wherein each area in the plurality of serial areas in the array-like storage region are mapped into one of two bank addresses,
wherein the first chrominance component, the second chrominance component and the luminance component of a pixel block whose ordinal position on a screen is an even number are stored in serial areas that are mapped into a same one of the bank addresses,
and the first chrominance component, the second chrominance component and the luminance component of a pixel block whose ordinal position on the screen is an odd number are stored in serial areas that are mapped into another one of the bank addresses.

4. The image decoding apparatus of claim 3, further comprising:
  coordinate calculation means for calculating coordinates of the reference picture that is to be blended with the differential picture, based on the motion vectors,
  wherein the memory access means includes:
    a first determination means which, when the coordinates of the reference picture have been calculated, determines one of the sets of serial areas in the image memory as a read address, based on the coordinates of the reference picture on the screen; and
    a second determination means for determining a read length for the determined set of serial areas, based on dimensions of the reference picture,
    wherein the image memory includes an output unit which, when the read address and the read length have been determined by the first and second determination means, reads and outputs one of luminance components and chrominance components for the determined read length from a set of serial areas starting from the determined read address.

5. The image decoding apparatus of claim 4,
wherein the first determination means includes:
  a first generation unit for generating a column address, based on
    (1) a remainder of a division of an X coordinate of a vertex position of the reference picture by a number m of luminance components in a pixel block in a horizontal direction, and
    (2) a remainder of a division of a Y coordinate of the vertex position of the reference picture by a number n of luminance components in a pixel block in a vertical direction;
  a second generation unit for generating a row address and a bank address, based on
    (1) a quotient of a division of a Y coordinate of a vertex position of the reference picture by the number m of luminance components in a pixel block in the horizontal direction, and
    (2) a quotient of a division of a Y coordinate of the vertex position of the reference picture by the number n of luminance components in a pixel block in the vertical direction,
and wherein the column address, row address, and bank address generated by the first generation unit and second generation unit are used to determine the read address of a luminance component.

6. The image decoding apparatus of claim 5,
wherein the first determination means includes a third generation unit for generating a column address based on
  (1) a remainder of a division of an X coordinate of a vertex position of the reference picture by a number s of chrominance components in a pixel block in the horizontal direction, and
  (2) a remainder of a division of a Y coordinate of a vertex position of the reference picture by a number t of chrominance components in a pixel block in the vertical direction;
a fourth generation unit for generating a row address and a bank address, based on
  (1) a quotient of a division of an X coordinate of a vertex position of the reference picture by a number s of chrominance components in a pixel block in the horizontal direction, and
  (2) a quotient of a division of a Y coordinate of the vertex position of the reference picture by a number t of chrominance components in a pixel block in the vertical direction,
and wherein the column address, row address, and bank address generated by the third generation unit and fourth generation unit are used to determine the read address of the chrominance component.

7. The image decoding apparatus of claim 6,
wherein the coordinate calculation means includes:
  a first calculation unit for calculating a first read area which is a first half of a pixel block that corresponds to the reference picture;
  a second calculation unit for calculating a second read area that is a remaining half of the pixel block that corresponds to the reference picture,
and wherein the first determination means and the second determination means each determine a read address and a read length based on the first read area and the second read area whose sizes are calculated by the first calculation unit and the second calculation unit.

8. The image decoding apparatus of claim 7, further comprising processing unit judging means for judging whether the differential picture has been encoded in frame units or in field units, wherein the first calculation unit calculates the first read area so that the first read area corresponds to an upper half of the differential picture when the processing unit judging means has judged that the differential picture has been encoded in frame units, and calculates the first read area so that the first read area corresponds to a left half of the differential picture when the processing unit judging means has judged that the differential picture has been encoded in field units, and wherein the second calculation unit calculates the second read area so that the second read area corresponds to a lower half of the differential picture when the processing unit judging means has judged that the differential picture has been encoded in frame units, and calculates the second read area so that the second read area corresponds to a right half of the differential picture when the processing unit judging means has judged that the differential picture has been encoded in field units.

9. The image decoding apparatus of claim 8, wherein the coordinate calculation means includes:
  interpolation necessity judging means for judging whether half-pel interpolation is required in the vertical direction and whether half-pel interpolation is required in the horizontal direction;
  first expansion unit for expanding at least the first read area in the vertical direction when the interpolation necessity judging means has judged that half-pel interpolation is required in the vertical direction;
  second expansion unit for expanding at least the first read area in the horizontal direction when the interpolation necessity judging means has judged that half-pel interpolation is required in the horizontal direction;
  a third expansion unit for expanding at least the first read area in the vertical direction and expanding at least the first read area in the horizontal direction when the interpolation necessity judging unit has judged that half-pel interpolation is required in the vertical direction and in the horizontal direction, wherein the first determination means and the second determination means each determine a read address and a read length based on the first read area and the second read area, wherein the output unit in the image memory outputs the luminance components and the chrominance components for the first read area and the second read area in the reference picture, and wherein the image decoding apparatus further comprises:
    an image block buffer for storing the luminance components and the chrominance components that compose the reference picture outputted by the output unit of the image memory; and
    half-pel interpolation means for performing half-pel interpolation on the reference picture stored in the image block buffer in each direction judged necessary by the interpolation necessity judging unit.

10. The image decoding apparatus of claim 9, wherein when the luminance components and chrominance components included in the first read area have been outputted by the output unit of the image memory, the outputted luminance components and chrominance components are stored in the image block buffer, and wherein the half-pel interpolation means includes:
  a first read unit for reading the luminance components and chrominance components stored in the image block buffer one pixel at a time;
  a second read unit which, when half-pel interpolation in the vertical direction is necessary, reads the luminance component and chrominance component of a pixel positioned directly below a pixel whose luminance component and chrominance component were read by the first read unit;
  a third read unit which, when half-pel interpolation in the horizontal direction is necessary, reads the luminance component and chrominance component of a pixel positioned to a right of the pixel whose luminance component and chrominance component were read by the first read unit;
  a fourth read unit which, when half-pel interpolation in the horizontal direction and in the vertical direction is necessary, reads the luminance component and chrominance component of a pixel positioned below and to a right of the pixel whose luminance component and chrominance component were read by the first read unit; and
  a generation unit for generating a luminance component and a chrominance component for the pixel whose luminance component and chrominance component was read by the first read unit, using an average value of the luminance component and chrominance component read by the first read unit, and the luminance components and the chrominance components read by the second read unit, the third read unit and the fourth read unit.

11. The image decoding apparatus of claim 10, wherein when all of the luminance components in the image block buffer have been generated by the generation unit, the output unit outputs the luminance components in the second read area calculated by the second calculation unit, wherein the image block buffer includes an overwriting unit for overwriting, when luminance components and chrominance components of a pixel block have been outputted, the luminance components of the second read area into an area of the image block buffer that is occupied by the luminance components of the first read area so that only a final row of the luminance components in the first read area will be left in the image block buffer, and wherein the half-pel interpolation means performs half-pel interpolation for the luminance components in the second read area using the remaining final row of luminance components in the first area, in each direction judged necessary by the interpolation necessity judging unit.

12. The image decoding apparatus of claim 10, wherein when all of the luminance components in the image block buffer have been generated by the generation unit, the output unit outputs the luminance components in the second read area calculated by the second calculation unit, wherein the image block buffer includes an overwriting unit for overwriting, when luminance components and chrominance components of a pixel block have been outputted, the luminance components of the second read area into an area of the image block buffer that is occupied by the luminance components of the first read area so that only a final column of the luminance components in the first read area will be left in the image block buffer, and wherein the half-pel interpolation means performs half-pel interpolation for the luminance components in the second read area using the remaining final row of luminance components in the first area, in each direction judged necessary by the interpolation necessity judging unit.

13. The image decoding apparatus of claim 9, wherein a start region specified by a row address and one column address stores two luminance components for coordinates that are adjacent in a pixel block, wherein the image decoding apparatus further comprises:
coordinate value judging means for judging whether an X coordinate of a top left vertex of the reference picture is an odd-numbered coordinate; and
appending means for appending the first read area and the second read area with a margin when the coordinate value judging means has judged that the X coordinate of the top left vertex of the reference picture is an oddnumbered coordinate,
wherein the first determination means and the second determination means determine the read address and read length based on the first read area and the second read area which have been appended with a margin,
wherein the output unit in the image memory outputs the luminance components and the chrominance components for each of the first read area and the second read area of the reference picture, and
wherein the image block buffer stores the luminance components and the chrominance components that compose the reference picture and have been outputted by the output unit of the image memory.

14. The image decoding apparatus of claim 13, wherein when the first read area and the second read area have been expanded in the vertical direction and in the horizontal direction by the first, second and third expansion units, a margin is added to the first read area and to the second read area so that the respective read areas become a multiple of two.

15. The image decoding apparatus of claim 4, further comprising:

overlapping image block determining means for determining, based on vertex coordinates of the reference picture, all pixel blocks which overlap the reference picture when the reference picture overlaps a plurality of pixel blocks;

vertex coordinate calculation means for calculating vertex coordinates for each overlapping part of a pixel block and the reference image, when the reference picture overlaps a plurality of pixel blocks;

first generation control means for having the first determination means determine a read address based on the vertex coordinates of one of the overlapping parts calculated by the vertex coordinate calculation means; and second generation control means for having the second determination control means determine the read length based on an overlapping length of one of the overlapping parts calculated by the vertex coordinate calculation means.

16. The image decoding apparatus of claim 15, further comprising:

overlapping area judging means for judging whether a calculated read area for the reference picture overlaps a plurality of image blocks; and order determination means which, when the overlapping area judging means judges that the reference picture overlaps a plurality of pixel blocks, generates a read order for a plurality of sets of serial areas, based on bank addresses to which the sets of serial areas storing the luminance components and chrominance components of the overlapping parts belong.

17. The image decoding apparatus of claim 16, wherein when the read area of the reference picture overlaps two pixel blocks that are connected in the horizontal direction, the order determining unit determines the read order so that the overlapping part in a pixel block with a horizontally wider overlapping part is read first and an overlapping part in a pixel block with a horizontally narrower overlapping part is read later.

18. The image decoding apparatus of claim 17, wherein when the read area of the reference picture overlaps four pixel blocks, the order determining unit determines the read order so that an overlapping part in a pixel block with a horizontally narrowest but vertically longest overlapping part is read first and that an overlapping part in a pixel block with a horizontally narrowest and vertically shortest overlapping part is read last.

19. The image decoding apparatus of claim 18, further comprising:

read command issuing means which, when the reference picture has been calculated, issues a plurality of read commands for reading an overlapping part of the calculated reference picture from the plurality of serial areas;

precharge command issuing means which issues a precharge command for precharging serial areas that store a remaining overlapping part after the read command issuing means has issued a final read command for reading the luminance components of one overlapping part; and activate command issuing means which issues an activate command for activating the serial areas that store the remaining overlapping part after the read command issuing means has issued the final read command for reading the luminance components of one overlapping part.

20. The image decoding apparatus of claim 19, wherein when the read order has been determined so that a pixel block with a horizontally narrowest but vertically longest overlapping part is to be read first, the activate command issuing means issues an activate command for activating a plurality of bank addresses before a read command is issued for the image memory.

21. An image decoding apparatus equipped with an image memory that stores a one-screen image by dividing the one-screen image into a plurality of image blocks which are each m pixels wide by n pixels high (where m,n are integers that are equal to or greater than 1), the image memory having an array-like storage region storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the same row address and a second column address, and storing m*n luminance components that compose the same one of the image blocks in a second set of serial areas from a different start area specified by a different row address and a third column address to an end area specified by the different row address and a fourth column address, the image decoding apparatus comprising:
  differential picture decoding means for decoding a stream inputted from outside to obtain a differential picture and motion vectors;
  first read means for reading, from the image memory, luminance components composing half a pixel block that corresponds to a reference picture that is to be blended with the differential picture, and reading one row and/or one column of luminance components that are adjacent to the luminance components in the read half pixel block;
  an image block buffer for storing the read luminance components;
  half-pel interpolation means for performing half-pel interpolation on the luminance components of the stored half pixel block in each required direction;
  second read means for reading, from the image memory, all luminance components composing a remaining half of the pixel block that corresponds to the reference picture that is to be blended with the differential picture,
  wherein the image block buffer includes an overwriting unit for overwriting, when luminance components and chrominance components of a pixel block have been outputted, luminance components of a latter half of the pixel block into an area of the image block buffer that is occupied by previous luminance components so that only a final row and/or column of the luminance components that are adjacent will be left in the image block buffer, and
  wherein the half-pel interpolation means performs half-pel interpolation on the luminance components of the latter half of the pixel block in each required direction, using the final row and/or column of the luminance components that is left in the image block buffer.

22. An image decoding apparatus equipped with a plurality of memory arrays where an address is specified using a row address, a column address, and a bank address, each memory array storing a one-screen image by dividing the one-screen image into a plurality of image blocks which are each m pixels wide by n pixels high (where m,n are integers that are equal to or greater than 1), each memory array storing s*t first chrominance components (where s,t are integers that are equal to or greater than 1) that compose one of the image blocks and s*t second chrominance components that compose the same one of the image blocks in a first set of serial areas from a start area specified by a row address and a first column address to an end area specified by the row address and a second column address, and storing m*n luminance components that compose the same one of the image blocks in a second set of serial areas from a different start area specified by a different row address and a third column address to an end area specified by the different row address and a fourth column address, the image decoding apparatus comprising:
  differential picture decoding means for decoding a stream inputted from outside to obtain a differential picture and motion vectors;
  overlapping part determining means for calculating, when a reference picture to be blended with the differential picture overlaps a plurality of pixel blocks, vertex coordinates of an overlapping part in each pixel block;
  order determining means for determining a read order of the overlapping parts by comparing horizontal widths and vertical heights of the overlapping parts;
  memory access means for reading the luminance components and chrominance components of the overlapping parts from the serial areas in the memory arrays in accordance with the determined read order; and
  blend means for blending the first chrominance components, the second chrominance components and the luminance components read from the plurality of serial areas with the differential picture.

23. The image decoding apparatus of claim 22,
  wherein when the read area overlaps two pixel blocks that are connected in the horizontal direction, the order determining unit determines the read order so that the overlapping part in a pixel block with a horizontally wider overlapping part is read first and an overlapping part in a pixel block with a horizontally narrower overlapping part is read later.

24. The image decoding apparatus of claim 23,
  wherein when the read area overlaps four pixel blocks, the order determining unit determines the read order so that an overlapping part in a pixel block with a horizontally narrowest but vertically longest overlapping part is read first and that an overlapping part in a pixel block with a horizontally shortest and vertically shortest overlapping part is read last.

25. The image decoding apparatus of claim 24, further comprising:
  read command issuing means which, when the reference picture has been calculated, issues a plurality of read commands for reading an overlapping part of the calculated reference picture from a plurality of serial areas;
  precharge command issuing means which issues a precharge command for precharging serial areas that store a remaining overlapping part after the read command issuing means has issued a final read command for reading a content of one overlapping part; and
  activate command issuing means which issues an activate command for activating the serial areas that store the remaining overlapping part after the read command issuing means has issued the final read command for reading a content of one overlapping part.

26. The image decoding apparatus of claim 25,
  wherein, when the read order has been determined so that a pixel block with a horizontally narrowest but vertically longest overlapping part is to be first, the activate command issuing means issues an activate command for activating a plurality of bank addresses before a read command is issued for the image memory.

27. An image memory that stores a one-screen image by dividing the one-screen image into a plurality of image blocks which are each m pixels wide by n pixels high (where m,n are integers that are equal to or greater than 1), the image memory having an array-like storage region storing s*t first chrominance components (where s,t are integers that are equal to or greater than 1) that compose one of the image blocks and s*t second chrominance components that compose the same one of the image blocks in a first set of serial areas between a start area specified by a row address and a first column address and an end area specified by the same row address and a second column address, and storing m*n luminance components that compose the same one of the image blocks in a second set of serial areas between a different start area specified by a different row address and a third column address and an end area specified by the different row address and a fourth column address.

* * * * *